(12) United States Patent
Gibson et al.

(10) Patent No.: US 9,448,058 B2
(45) Date of Patent: Sep. 20, 2016

(54) ASSOCIATED INTERFEROMETERS USING MULTI-FIBER OPTIC DELAY LINES

(71) Applicant: Lumetrics, Inc., Rochester, NY (US)

(72) Inventors: Donald S. Gibson, West Henrietta, NY (US); Filipp V. Ignatovich, Rochester, NY (US); Michael A. Marcus, Honeoye Falls, NY (US)

(73) Assignee: Lumetrics, Inc., Rochester, NY (US)

( * ) Notice: Subject to any disclaimer, the term of this patent is extended or adjusted under 35 U.S.C. 154(b) by 0 days.

(21) Appl. No.: 14/529,263

(22) Filed: Oct. 31, 2014

(65) Prior Publication Data

US 2016/0123716 A1    May 5, 2016

(51) Int. Cl.
*G01B 9/02* (2006.01)

(52) U.S. Cl.
CPC ......... *G01B 9/0209* (2013.01); *G01B 9/02015* (2013.01); *G01B 9/02028* (2013.01)

(58) Field of Classification Search
CPC .............. G01B 9/0209; G01B 9/0205; G01B 9/02027; G01B 9/02028
See application file for complete search history.

(56) References Cited

U.S. PATENT DOCUMENTS

| | | |
|---|---|---|
| 5,596,409 A | 1/1997 | Marcus et al. |
| 5,659,392 A | 8/1997 | Marcus et al. |
| 5,835,642 A | 11/1998 | Gelikonov et al. |
| 5,867,268 A | 2/1999 | Gelikonov et al. |
| 6,724,487 B2 | 4/2004 | Marcus et al. |
| 6,847,453 B2 * | 1/2005 | Bush ............... G01B 11/0675 356/479 |
| 7,206,076 B2 | 4/2007 | Blalock et al. |
| 7,382,962 B1 | 6/2008 | Yao |
| 2003/0227632 A1 * | 12/2003 | Marcus ............... G01B 11/303 356/497 |
| 2007/0171425 A1 * | 7/2007 | De Groot ............ G03F 7/70775 356/478 |
| 2012/0013913 A1 * | 1/2012 | Ignatovich ......... G01B 9/02007 356/479 |
| 2014/0253907 A1 | 9/2014 | Ignatovich et al. |

OTHER PUBLICATIONS

Tearney et al., "Rapid acquisition of a in vivo biological images by use of optical coherence tomography," Optics Letters, vol. 21, pp. 1408-1410 (1996). EFS file name 20150130_14-529263_IDS_NPL_Cite1.
Bush et al., "All-Fiber Optic Coherence Domain Interferometric Techniques", Proc. SPIE, vol. 4204, pp. 71-80 (2001). EFS file name 20150130_14-529263_IDS_NPL_Cite2.

* cited by examiner

*Primary Examiner* — Kara E Geisel
*Assistant Examiner* — Dominic J Bologna
(74) *Attorney, Agent, or Firm* — John M. Hammond; Patent Innovations LLC

(57) ABSTRACT

An interferometer apparatus which include two or more coupled fiber optic Michelson interferometers using fiber optic stretches which stretch two or more optical fibers wound around the perimeter of the optical fiber stretchers by the same amount is disclosed. Preferably a pair of reference and sample fiber optic stretches are utilized which run in a push-pull mode of operation. When one of the interferometers is a coherent light interferometer it can be used as a reference distance scale for all of the remaining low coherence light interferometer. A method for measuring a physical property of a device under test is also disclosed using the apparatus of the present invention.

28 Claims, 22 Drawing Sheets

ASSOCIATED INTERFEROMETERS USING MULTI-FIBER OPTIC DELAY LINES

CROSS-REFERENCE TO RELATED APPLICATIONS

Reference is made to commonly-assigned co-pending U.S. patent application Ser. No. 13/794,577 which has a filing date of Mar. 11, 2013, the disclosure of which is incorporated herein by reference.

BACKGROUND

1. Technical Field

This invention relates to fiber optic interferometers that incorporate optical fiber stretchers, and more particularly to fiber optic interferometers that incorporate optical fiber stretchers which stretch two or more fibers wound around them by the same amount.

2. Description of the Related Art

Optical fiber can be used to generate variable optical delays by controlling the length of a fiber loop. For example, multiple turns of optical fiber can be wound around a cylindrical piezo-electric (PZT) actuator under a sufficient tension which assures that the optical fiber never goes limp during operation. This forms a fiber optical delay device when an electrical voltage is applied to the cylindrical PZT actuator to cause the diameter of the cylindrical PZT actuator to change. This change leads to a change in the circumference of the cylindrical PZT actuator and thus changes the extent of stretching on the fiber loop, and thus the length of the optical fiber wound around the actuator. This design of an optical fiber stretcher can be used to achieve fast delay variations as was described by Tearney et al. in an article entitled "Rapid acquisition of a in vivo biological images by use of optical coherence tomography," Optics Letters, Vol. 21, pp. 1408-1410 (1996). The response speed of such a PZT-based fiber delay device can be fast, e.g., on the order of kHz or tens of kHz. Applications of these types of optical fiber stretchers are described in Bush et al. in an article entitled "All-fiber optic coherence domain interferometric techniques", Proc. SPIE, Vol. 4204, pp. 71-80 (2001).

Other examples of fiber optic delay lines are described in U.S. Pat. No. 5,835,642 by V. M. Gelikonov et al. entitled "Optical Fiber Interferometer and Piezoelectric Modulator" issued on Nov. 10, 1998, which describes a variable fiber optic delay line formed of a piezoelectric plate with electrodes on both of its surfaces. ("Gelikonov '642" subsequently herein.) In this delay line an optical fiber is coiled as a spiral and adhered to the piezoelectric plate on one or both surfaces of the plate. Applying an electric field to the piezoelectric plate results in a change in the diameter of the plate and hence the length of the optical fiber adhered to the plate. U.S. Pat. No. 5,867,268 by V. M. Gelikonov et al. entitled "Optical Fiber Interferometer With PZT Scanning of Interferometer Arm Optical Length" issued on Feb. 2, 1999 describes interferometer configurations using the Piezoelectric Modulators which are described in Gelikonov '642.

U.S. Pat. No. 7,382,962 by S. Y. Xiaotian entitled "Fiber stretcher apparatus" issued on Jun. 3, 2008 describes various designs of fiber stretchers utilizing one or more linear actuators to stretch fiber loops to create variable optical delay lines ("Xiaotian '962" subsequently herein). The fiber stretcher device described by Xiaotian '962 includes a stretcher frame that has a frame slot with a slot opening at one end to separate the frame into two parts that are connected at the other end of the frame slot. A linear actuator that expands or contracts along a straight line in response to a control signal produces a linear change in the dimension of the actuator along the straight line, and can be positioned across the frame slot with one end fixed to one frame part and the other end fixed to the other frame part. The linear expansion or contraction of the linear actuator exerts a force across the frame slot causing the frame slot to expand or contract, acting like a spring. This design transforms a linear expansion or contraction of the actuator into a change in the circumferential length of the stretch frame which can be shaped in various shapes having smooth surfaces including circles, ellipses, squares, and rectangles with rounded corners and racetrack shapes. This mechanism can be used to stretch a fiber loop formed by winding optical fiber around the exterior surface of the stretcher frame multiple times under tension. U.S. Pat. No. 7,206,076 by T. Blalock issued on Apr. 17, 2007 entitled "Thickness Measurement of Moving Webs and Seal Integrity System Using Dual Interferometer" ("Blalock '076" subsequently herein) also describes various designs of fiber optic stretchers.

Applications using optical fiber stretchers as fiber delay lines include low coherence interferometry (LCI) and optical coherence tomography (OCT). LCI and OCT have applications in many fields from medical imaging to glass manufacturing. LCI and OCT have been adapted to the non-contact measurement of physical properties of various materials including thickness, index of refraction measurement, surface profiles, and index of refraction profiles. LCI and OCT can also be used to measure distances between optical surfaces of a test structure. The LCI technique is based on using a light source with a short coherence length. The light is split between two arms or branches of an interferometer and then recombined and directed onto a detector. Interference occurs when the path lengths of light reflecting off of objects located in the two branches of the interferometer are equal to within the coherence length of the light from the source.

There are numerous known configurations of such interferometers, such as the Michelson, Mach-Zehnder, and Fizeau interferometers, and others described in the text, *Principles of Optics: Electromagnetic Theory Of Propagation, Interference and Diffraction of Light*, M. Born and E. Wolf, Cambridge University Press, Cambridge; New York, 1999, 7th ed. Another example of such an interferometer is described in U.S. Pat. No. 6,724,487 of M. A. Marcus et al. issued on Apr. 20, 2004 entitled, "Apparatus and method for measuring digital imager, package and wafer bow and deviation from flatness," the disclosure of which is incorporated herein by reference. ("Marcus '487" subsequently herein.)

The interferometer disclosed therein by Marcus '487 as shown in FIG. 9 of Marcus '487 is based on the use of piezo fiber stretching technology as the means of changing the optical path-length in the two arms of the interferometer. A narrow beam of low-coherence light is directed onto the surface of the device under test. It is common to focus the beam inside or in proximity to the device under test. The reflected light from all of the optical interfaces of the device under test, which the beam traverses, is then combined with light from a coherent light source of a distinct wavelength using a wavelength division multiplexer (WDM). The combined light passes through a 50/50 fiber coupler into a pair of single mode optical fibers that are coiled around a pair of piezoelectric cylinders which make up the two arms of the fiber Michelson interferometer. Voltages are applied to the piezoelectric cylinders in a push-pull mode to alternately change the optical path length of light being transmitted along the optical fibers wound around the cylinders. Reflectors are located at the ends of the optical fibers after the coils to send the light back through the fiber coils. Interfering light returning from the interferometer arms is sent to separate low coherence and coherent light detectors. The coherent light interferometer provides a built in distance scale and is used to trigger data acquisition from the low coherence source at constant distance intervals. The low coherence interferometer is used to determine the optical distances between the interfaces in the device under test. The physical distances are obtained by dividing the optical distances by the group refractive indices of the material which makes up the space between the interfaces.

Other designs of dual interferometers in which a coherent light source is used together with a low coherence light source are described in U.S. Pat. No. 5,596,409 issued on Jan. 21, 1997 entitled "Associated Dual Interferometric Measurement Method for Determining a Physical property of an Object" by M. A. Marcus and S. Gross ("Marcus '409" subsequently herein), U.S. Pat. No. 5,659,392 issued on Aug. 19, 1997 entitled "Associated Dual Interferometric Measurement Apparatus for Determining a Physical property of an Object" by M. A. Marcus et al. ("Marcus '392" subsequently herein), "Blalock '076," and U.S. Pat. No. 6,847,453 issued on Jan. 25, 2005 entitled "All Fiber Autocorrelator" by I. J. Bush. "Marcus '409" and "Marcus '392" describe how to use the coherent light interferometer as a distance scale by sampling at zero crossings of the coherent light interferogram and using the zero crossings to sample the low coherence light interferogram at constant distance intervals. This approach is called distance based sampling as opposed to the traditional approach of time based sampling.

In previous designs of dual interferometers using optical fiber stretchers as optical delay lines, the coherence source and the low coherence source operate at different wavelengths. The coherent light and low coherence light are combined using a WDM and are sent down a single fiber which changes path length while being transmitted along the fiber delay line. Optical fibers undergo dispersion effects when stressed and strained and different wavelengths of light have different coefficients of dispersion as a function of temperature and stress. This can cause changes in the calibration of the distance scale of the interferometer as a function of optical fiber stretcher temperature which can result in measurement errors.

Cost of components in building interferometers is also an important parameter to manufacturers of such instruments. Anything that can be done to reduce the cost of manufacturing by eliminating expensive optical components is desirable.

The disclosures of all of the aforementioned patents are incorporated herein by reference. The disclosures of these patents notwithstanding, there remains an unmet need for a more precisely controlled fiber delay line measurement apparatus and method that eliminates temperature dependent differential dispersion effects to provide a more precise calibration. There is also a need for a more precisely controlled low coherence interferometer to provide improved measurement reproducibility on measurements of physical parameters of test objects at a lower cost.

SUMMARY

The present invention meets this need by providing an apparatus which includes one or two optical fiber stretchers which simultaneously vary the length of two or more optical fibers which are wound together around the outer surface of the optical fiber stretcher by the same amount. These optical fiber stretchers are then incorporated into coupled interferometers which share the common optical fiber stretchers. When light of the same wavelength distribution is sent through each of two or more optical fibers which are wound together around the outer surface of the optical fiber stretcher each of the interferometers will have the same optical path length differences when the optical fiber stretchers are actuated.

In a first embodiment of this invention an interferometer apparatus is provided comprising a reference optical fiber stretcher comprising a reference outer surface defining a reference perimeter having first and second reference delay optical fibers wound around the reference outer surface, and a reference actuator configured to temporally vary the reference perimeter of the reference outer surface. The interferometer apparatus also comprises a sample optical fiber stretcher comprising a sample outer surface defining a sample perimeter having first and second sample delay optical fibers wound around the sample outer surface, and a sample actuator configured to temporally vary the sample perimeter of the sample outer surface. The interferometer apparatus also comprises a first fiber optic coupler which receives coherent light of wavelength $\lambda_c$ from a coherent light source and transmits a first portion of the coherent light into an input end of the first reference delay optical fiber and transmits a second portion of the coherent light into an input end of the first sample delay optical fiber. The interferometer apparatus further comprises a second fiber optic coupler which receives first low coherence light of center wavelength $\lambda_1$ from a first low coherence light source and transmits a first portion of the first low coherence light into an input end of the second reference delay optical fiber and transmits a second portion of the first low coherence light into an input end of the second sample delay optical fiber. The interferometer apparatus also comprises a first reference reflector coupled to an output end of the first reference delay optical fiber which reflects coherent light back through the first reference delay optical fiber, and back through the first fiber optic coupler into a coherent light detector; and a first sample reflector coupled to an output end of the first sample delay optical fiber which reflects coherent light back through the first sample delay optical fiber, and back through the first fiber optic coupler and into the coherent light detector. The interferometer also comprises a second reference reflector coupled to an output end of the second reference delay optical fiber which reflects first low coherence light back through the second reference delay optical fiber, and back through the second fiber optic coupler into a first low coherence light detector. The interferometer apparatus further comprises a first optical probe coupled to the output end of the second sample delay optical fiber and is configured to transmit first low coherence light to a first location on an object comprising at least one optical interface, and receive first low coherence light reflected back from the at least one optical interface, and transmit the reflected first low coherence light back through the first optical probe, back through the second sample delay optical fiber, and back through the second fiber optic coupler and into the first low coherence light detector.

In a second embodiment of this invention an apparatus is provided comprising m associated interferometers where m is an integer greater than 1, where each of the m associated interferometers have a reference branch and a sample branch and each of the m associated interferometers further comprise a common reference optical fiber stretcher comprising a reference outer surface defining a reference perimeter, m reference delay optical fibers wound around the reference outer surface, and a reference actuator configured to temporally vary the perimeter of the reference outer surface. Each of the m associated interferometers also comprise a common sample optical fiber stretcher comprising a sample outer surface defining a sample perimeter, m sample delay optical fibers wound around the sample outer surface, and a sample actuator configured to temporally vary the perimeter of the sample outer surface. Each of the m associated interferometers also comprise a fiber optic coupler which receives coherent or low coherence light from a coherent or low coherence light source and transmits a first portion of the coherent or low coherence light into an input end of a distinct one of the m reference delay optical fibers and transmits a second portion of the coherent or low coherence light into an input end of a distinct one of the m sample delay optical fibers. In particular the $j^{th}$ fiber optic coupler, where j is an integer with 1≤j≤m, receives coherent light of wavelength $\lambda_c$ from a coherent light source and transmits a first portion of the coherent light into an input end of the $j^{th}$ reference delay optical fiber and transmits a second portion of the coherent light into an input end of the $j^{th}$ sample delay optical fiber, and the remaining m−1 fiber optic couplers receive low coherence light from a low coherence light source and transmit a first portion of the low coherence light into an input end of the corresponding remaining one of the m−1 reference delay optical fibers and transmit a second portion of the low coherence light into an input end of the corresponding remaining one of the m−1 sample delay optical fiber. Each of the m associated interferometers also comprise a reference reflector coupled to an output end of each of the distinct one of the m reference delay optical fibers which reflects coherent or low coherence light back through the distinct one of the m reference delay optical fibers and back through the corresponding distinct one of the m fiber optic couplers and into a corresponding detector. A sample reflector is coupled to the output end of the $j^{th}$ sample delay optical fiber which reflects coherent light back through the $j^{th}$ sample delay optical fiber and back through the $j^{th}$ fiber optic coupler and into the $j^{th}$ detector. An optical probe is coupled to the output end of each of the distinct one of the remaining m−1 sample delay optical fibers, and is configured to transmit low coherence light to a location on an object comprising at least one optical interface, and to receive low coherence light reflected back from the at least one optical interface, and transmit the reflected low coherence light back through the optical probe, back through the distinct one of the remaining m−1 sample delay optical fibers, and back through the corresponding distinct one of the m−1 fiber optic couplers and into the corresponding detector.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The present disclosure will be provided with reference to the following drawings, in which like numerals refer to like elements, and in which.

Figure 1A:
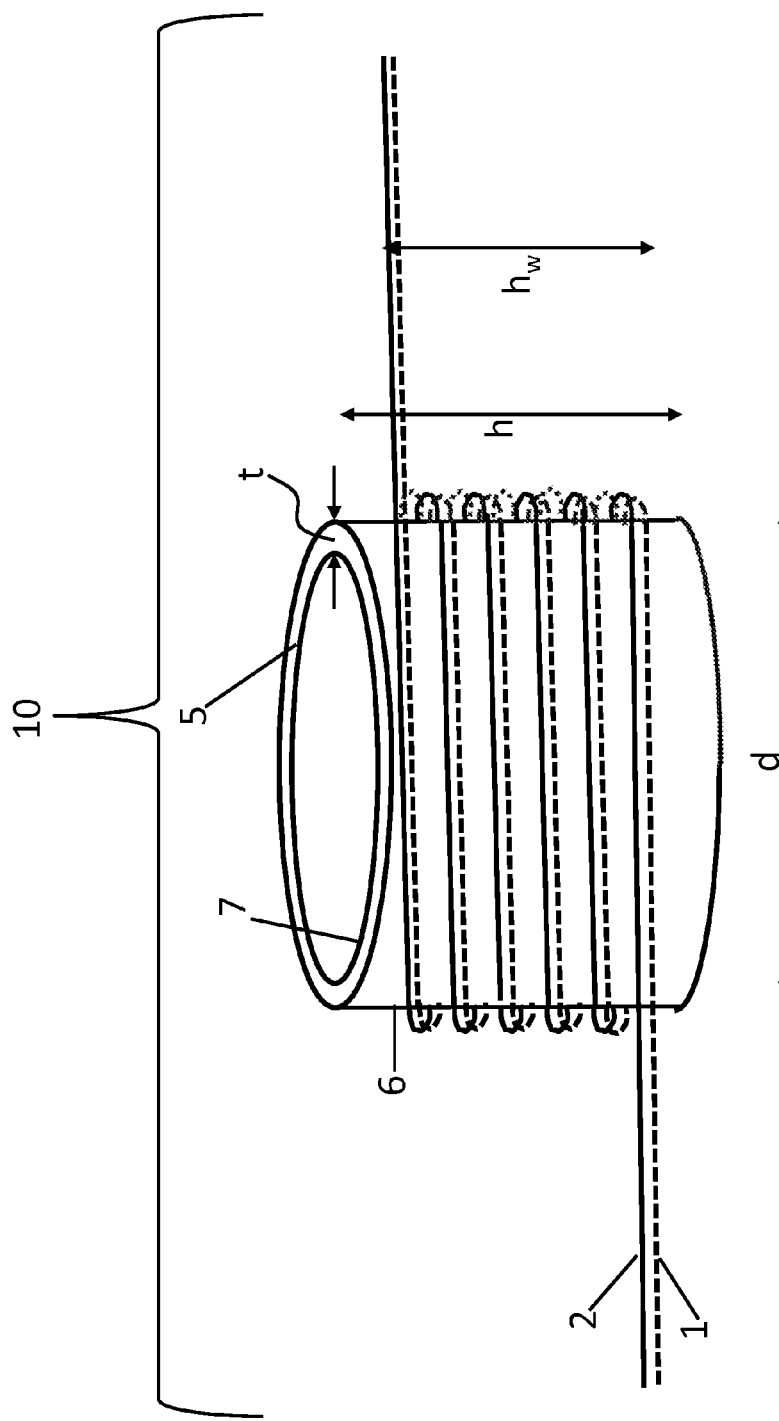
FIG. 1A shows a schematic of a first embodiment of an optical fiber stretcher used to stretch two optical fibers by the same amount.

The present invention will be described in connection with preferred embodiments; however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

The present description is directed in particular to elements forming part of, or cooperating more directly with, apparatus in accordance to the invention. For a general understanding of the present invention, reference is made to the drawings. It is to be understood that elements not specifically shown or described may take various forms well known to those skilled in the art. In the following description and drawings, identical reference numerals have been used, where possible, to designate identical elements.

The example embodiments of the present invention are illustrated schematically in order to illustrate key principles of operation of the present invention and are not drawn with intent to show actual size or scale. Some exaggeration, i.e., variation in size or scale may be necessary in order to emphasize relative spatial relationships or principles of operation. One of ordinary skill in the art will be able to readily determine the specific size and interconnections of the elements of the example embodiments of the present invention.

In the following disclosure, the present invention is described in the context of its use as a variable multiple fiber optical delay line and as an interferometer to measure one or more physical properties of a device under test which incorporates one or two of the variable multiple fiber optical delay lines. In the context of the present disclosure, a device under test is considered to be an object which comprises at least one optical interface that is measured at one or more measurement locations. Additionally, this description may identify certain components with the adjectives "top," "upper," "bottom," "lower," "left," "right," "horizontal", "vertical", inner", "outer" etc. These adjectives are provided in the context of use of the apparatus as a measurement device, and in the context of the orientation of the drawings, which is arbitrary. The description is not to be construed as limiting the apparatus to use in a particular spatial orientation. The instant apparatus may be used in orientations other than those shown and described herein.

The present invention is also described in terms of optical fiber components being coupled together. In the context of the present invention the words "coupled to" imply that light travels from one component to the other, either via an optical fiber or through air. Other components not specifically called out can also be interposed between components that are coupled together without changing the fact that the components described are coupled components. As an example, the description of a component (A) being coupled to a second component (B) is not to be construed as limiting the apparatus to have the components (A) and (B) being directly coupled to each other. Component (A) may be coupled to another component (C) which is not called out in the description and then component (C) may be coupled to component (B). Multiple uncited components may also be added between coupled components and not change the fact that the original two components are still coupled together.

Figure 1B:
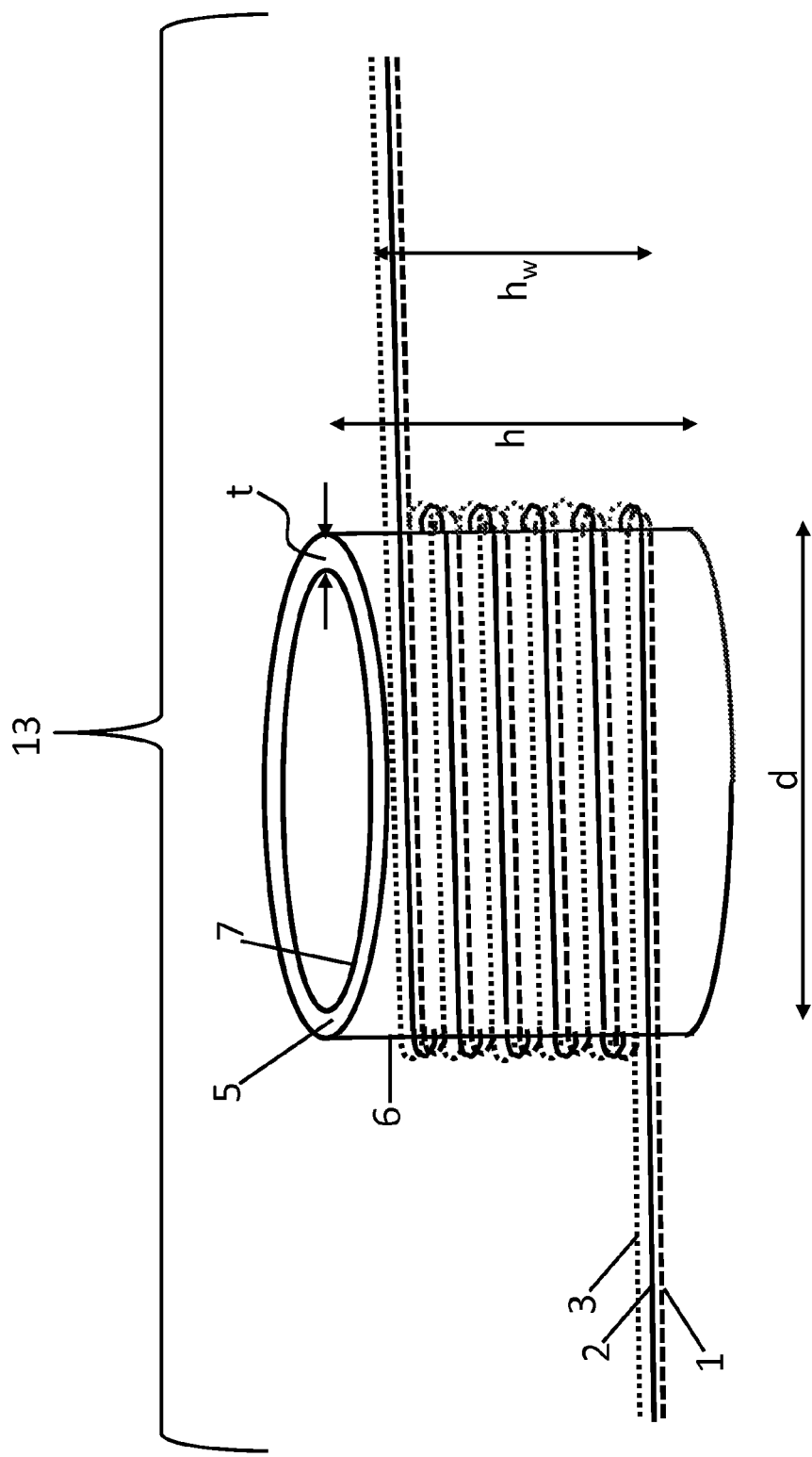
FIG. 1B shows a schematic of an embodiment of an optical fiber stretcher used to stretch three optical fibers by the same amount.
Figure 1C:
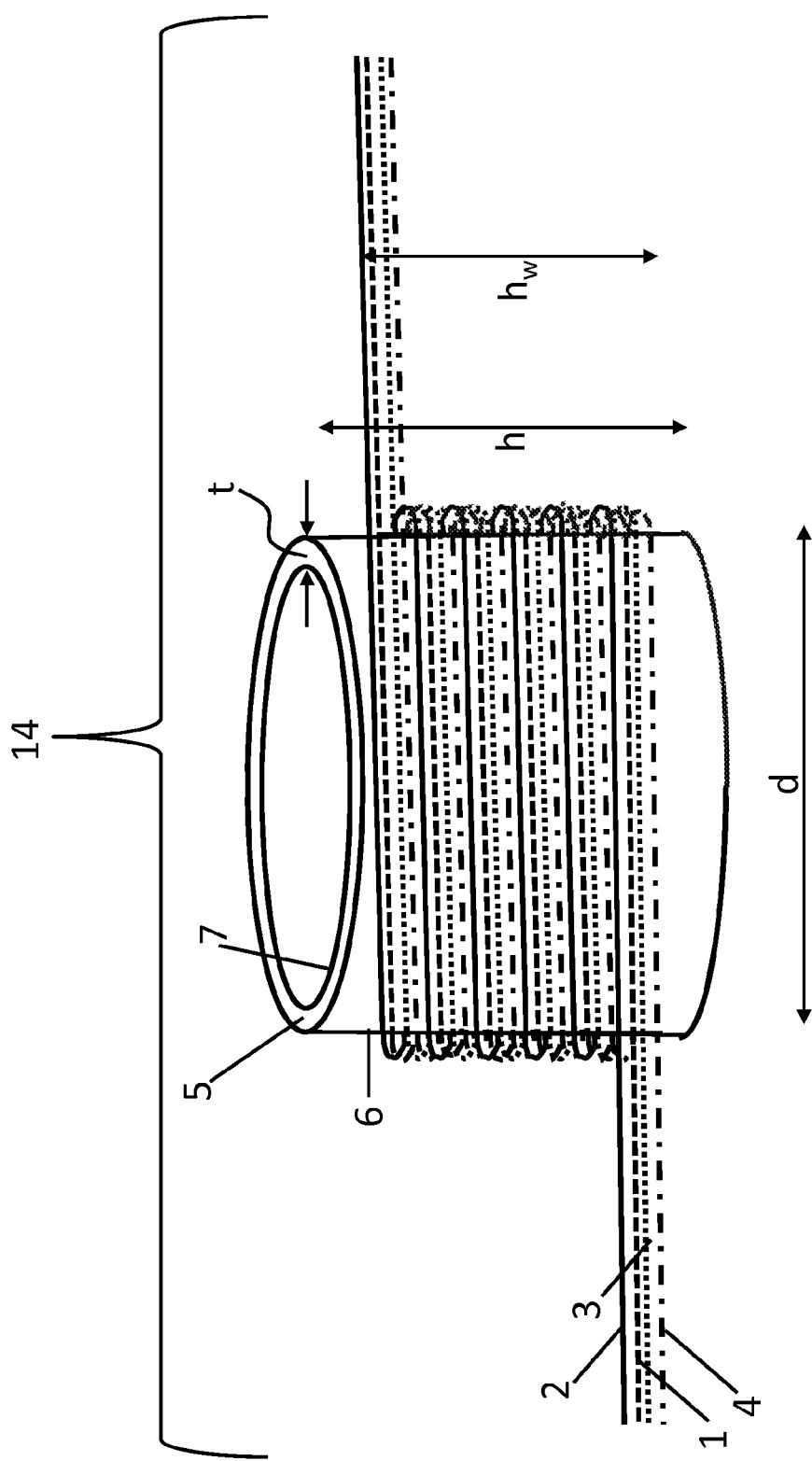
FIG. 1C shows a schematic of an embodiment of an optical fiber stretcher used to stretch four optical fibers by the same amount.

Various embodiments of multi-optical fiber variable optical delay lines, also called optical fiber stretchers or fiber optic stretchers of the present invention for simultaneously varying the length of two or more optical fibers by a fixed proportion are shown in FIG. 1A-FIG. 1C. The main components of the optical fiber stretching apparatuses are the optical fiber stretcher, an actuator and two or more optical fibers wrapped or wound around the perimeter of the optical fiber stretcher. When single mode optical fibers are utilized, the optical path length for light propagating or being transmitted along an individual optical fiber is directly proportional to the length of that individual optical fiber. Throughout this disclosure, the notation "delay optical fiber" will denote an optical fiber that is wound around the perimeter of an optical fiber stretcher. In a delay optical fiber, the optical path of light transmitted along the delay optical fiber will change as the perimeter of the optical fiber stretcher is varied with time.

FIG. 1A shows a first embodiment of an optical fiber stretcher 10 having a uniform outer surface defining a uniform perimeter comprising two delay optical fibers being wound around the uniform outer surface of the optical fiber stretcher 10. It is preferred that the lengths of the two optical fibers in contact with the perimeter of the optical fiber stretcher are the same and that they are wound together onto the optical fiber stretcher in a single layer so that they will stretch by the same amount as the perimeter of the optical fiber stretcher is temporally varied. The optical fiber stretcher also includes an actuator configured to temporally vary the perimeter of the optical fiber stretcher. In the embodiment shown, the optical fiber stretcher 10 is shown as a piezoelectric cylinder 5 having an outer diameter d, height h and wall thickness t with an inner surface 7 and an outer surface 6. The piezoelectric cylinder serves as both the stretching frame and the actuator. An important property of a cylinder is that it has a uniform circumference defined as $\pi d$. The term circumference is defined as the perimeter of a circle and perimeter is defined as the length of a closed curve enclosing an area. Since the perimeter of a circular or cylindrical object is the same as circumference, the more general term perimeter is used throughout this disclosure since the fiber optic stretcher may not be cylindrical in shape. First delay optical fiber 1 (dashed line) and second delay optical fiber 2 (solid line) are shown wound continuously around the piezoelectric cylinder's outer surface 6 in a single layer. The optical fibers 1 and 2 are called delay optical fibers since they are the optical fibers which form the fiber optic delay line when they are stretched. The total height of the optical fibers wound around the piezoelectric cylinder is defined as $h_w$ as shown in FIG. 1A.

The optical fiber stretcher 10 is preferably designed to simultaneously vary the length of first and second delay optical fibers 1 and 2 by the same amount. The optical fiber stretcher 10 has a uniform outer surface defining a uniform perimeter and the first and second delay optical fibers 1 and 2 are wound together around the outer surface 6 of the optical fiber stretcher 10 in a single layer. The optical fiber stretcher 10 also comprises an actuator configured to temporally uniformly vary the perimeter of the optical fiber stretcher. This insures that each loop of optical fiber wound around the perimeter of the fiber optic stretcher will stretch by the same amount. In a preferred embodiment of the optical fiber stretcher 10, delay optical fibers 1 and 2 are interleaved with each other which creates an interleaved arrangement also called an interleave pattern (see Table 1 below) as they are wound around the piezoelectric cylinder's outer surface 6 in a single layer. It is also preferred that the lengths of the sections of the delay optical fibers 1 and 2 being interleaved and wound together around the outer surface 6 of the sample optical fiber stretcher 10 in a single layer are the same. When light of the same wavelength is transmitted along delay optical fibers 1 and 2, they will undergo the same optical path length change as the perimeter of the optical fiber stretcher is varied as a function of time. Furthermore, it is also preferred that all adjacent interleaved delay optical fibers are in contact with each other when they are wound together around the outer surface 6 of the sample optical fiber stretcher 10 in a single layer. This maximizes the amount of optical fiber that can be wound around the optical fiber stretcher 10 in a single layer.

FIG. 1B shows a second embodiment of an optical fiber stretcher 13 having a uniform outer surface 6 defining a uniform perimeter comprising three delay optical fibers being wound together around the outer surface 6 of the optical fiber stretcher 13 in a single layer for simultaneously changing the length of three delay optical fibers by a fixed proportion. The optical fiber stretcher 13 shown in FIG. 1B includes all of the components shown in FIG. 1A, with the addition of a third delay optical fiber 3 (dotted lines) being interleaved together with first and second delay optical fibers 1 and 2 during winding. In the preferred embodiment the length of all three delay optical fibers 1, 2, and 3 wound continuously around the piezoelectric cylinder's outer surface are the same, and all adjacent interleaved delay optical fibers are in contact with each other.

FIG. 1C shows a third embodiment of an optical fiber stretcher 14 having a uniform outer surface 6 defining a uniform perimeter comprising four delay optical fibers being wound together around the outer surface of the optical fiber stretcher 14 in a single layer for simultaneously changing the length of four delay optical fibers by a fixed proportion. The optical fiber stretcher 14 shown in FIG. 1C includes all of the components shown in FIG. 1B with the addition of a fourth delay optical fiber 4 (dot-dashed lines) being interleaved together with delay optical fibers 1, 2, and 3 during winding. In the preferred embodiment, the length of all four delay optical fibers 1, 2, 3, and 4 wound continuously around the piezoelectric cylinder's outer surface are the same, and all adjacent interleaved delay optical fibers are in contact with each other.

More delay optical fibers may also be wound together around a single optical fiber stretcher as required for the particular application. Table I shows the interleaved arrangement also called the interleave pattern used versus the number of fibers being interleaved together in order to have all of the fibers that are wound together around a single optical fiber stretcher to have substantially the same length. The first column shows the number of fibers being wound together around the uniform perimeter of the optical fiber stretcher and the second column shows the interleaved arrangement. Letters A, B, C, D, E and F refer to delay optical fibers 1, 2, 3, 4, 5, and 6 respectively. The last row shows the interleaved arrangement for an optical fiber stretcher having m delay optical fibers where m is an integer greater than or equal to 2.

During winding around the piezoelectric cylinder 5, the delay optical fibers 1 to m are preferably wound together in an interleaved arrangement while under constant tension during the winding process. The delay optical fibers are also preferably wound in a single layer. It is also preferred that each delay optical fiber be in contact with each adjacent delay optical fiber during winding. When adjacent interleaved fibers are in contact with each other, the distance between the centers of adjacent fibers is equal to the outer diameter of the optical fibers. The delay optical fibers are usually communication grade optical fibers having a core, cladding and a buffer coating. For communication grade optical fibers the outer surface of the optical fiber would be the outer surface of the buffer coating. Having the outer surfaces of adjacent delay optical fibers be in contact with each other maximizes the total length of optical fiber that can be wound around the cylinder 5 in a single layer and helps ensure that the tension is uniform across the entire optical fiber stretcher surface 6. This results in having the total lengths of all of the delay optical fibers wound around the cylinders being substantially the same length. After winding, the delay optical fibers are bonded to the piezoelectric cylinder with a thin layer of adhesive, typically an epoxy adhesive. Bonding of the delay optical fibers to the piezoelectric cylinder has a negligible effect on the stretching and relaxation of the optical fiber during actuation of the piezoelectric cylinder The inner surface 7 and outer surface 6 of the piezoelectric cylinder 5 are both electroded. When a voltage V is applied across the electrode surfaces of piezoelectric cylinder 5 having a diameter d much larger than its thickness t, the diameter d of the piezoelectric cylinder 5 changes as a function of applied voltage by the relationship $$\Delta d = d_{31} d \frac{V}{t}$$

where $d_{31}$ is the appropriate piezoelectric strain coefficient of the piezoelectric material in the 31 direction, i.e., the induced strain in direction 1 per unit electric field applied in direction 3, where directions 1, 2, and 3 are defined using standard x-y-z right-handed coordinate axes. (Direction 1 is the x axis, and direction 3 is the z axis). Applying a voltage across the electrode surfaces of the piezoelectric cylinder 5 thus introduces strain on the delay optical fibers wound around the piezoelectric cylinder which causes the diameter of the delay optical fibers to change as a function of applied voltage. The position of the center of the core of the optical fiber is used as the reference for defining the location of the optical fiber. The effective diameter of a single loop of optical fiber wound around the outer surface of the piezo-

TABLE I

Interleaved Arrangement vs Number of Delay Optical Fibers Wound Together

| # fibers | Interleave Pattern |
|---|---|
| 2 | ABABABABABABABABABABABAB . . . ABABABABABABABABABAB |
| 3 | ABCABCABCABCABCABCABCABC . . . ABCABCABCABCABCABC |
| 4 | ABCDABCDABCDABCDABCDABCD . . . ABCDABCDABCDABCD |
| 5 | ABCDEABCDEABCDEABCDEABCDE . . . ABCDEABCDEABCDEABCDE |
| 6 | ABCDEFABCDEFABCDEFABCDEF. . . ABCDEFABCDEFABCDEF |
| m | AB . . . mAB . . . mAB . . . mAB . . . mAB . . . m . . . AB . . . mAB . . . mAB . . . mAB . . . m | electric cylinder is thus given by d+$d_f$ and the length of delay optical fiber $L_f$ that can be wound around a piezoelectric cylinder having an outer diameter d is given by the relationship $$L_f = \pi(d + d_f)\frac{h_w}{d_f}$$

where $d_f$ is the outer diameter of the delay optical fiber. The total change in optical path length (ΔOPL) of the total amount of delay optical fiber being wound around the piezoelectric cylinder in a single layer when a voltage V is applied to the piezoelectric cylinder is given by the relationship $$\Delta OPL = n_c \pi \Delta d \frac{h_w}{d_f}$$

where $n_c$ is the index of refraction of the core of the delay optical fiber at the wavelength of the light being transmitted along the delay optical fiber. When m delay optical fibers having outer diameter $d_f$ are interleaved and wound together around a single piezoelectric cylinder of diameter d so that the outer surface of each delay optical fiber is in contact with the outer surface of each adjacent interleaved optical fiber, the change in optical path of each individual fiber ($\Delta OPL_f$) is given by $$\Delta OPL_f = \frac{\Delta OPL}{m}.$$

In the preferred embodiments it is desired that the lengths of all of the delay optical fibers wound around the piezoelectric cylinder are the same and that all of the delay optical fibers are made of the same material having the same form factor. In this case the length of all of the delay optical fibers will change by the same amount as the perimeter of the optical fiber stretcher is varied uniformly. In preferred embodiments the delay optical fibers are single mode optical fibers or polarization maintaining optical fibers.

Although the optical fiber stretchers shown in FIG. 1A-FIG. 1C are piezoelectric cylinders, it is possible to replace the piezoelectric cylinder stretchers with other types of stretching elements or stretcher frames having uniform perimeters. Other example stretcher frames include the race track oval type stretcher frame described in Xiaotian '962, or the various designs described in Blalock '076.

The multi-optical fiber variable optical delay lines described in FIG. 1A-1C can be used to create variable optical path delay elements in interferometers as described below. FIG. 2A-FIG. 7B show schematics of various associated multiple optical fiber interferometer embodiments of the present invention. These various embodiments are used to measure one or more physical properties of a device under test also called an object a 42 in the Figures.

The term physical properties as used in this application refer to both optical properties (for example index of refraction) and the physical dimensions (such as thickness and surface shape) as well as combinations of the two (such as optical thickness) of a test object. Physical properties of the object (also called device under test) may also include optical distances between adjacent layers of the object. Distances between a reference surface and the object can also be considered to be physical properties of the object. Throughout this disclosure, we use the word object to mean a test object comprising at least one optical interface. Surface and thickness profiles of the object can be obtained by using transport stages coupled to the optical probe or the object. Other physical properties of the object can be measured by varying a property of the environment such as pressure or temperature. As an example the coefficient of thermal expansion of the object can be measured by determining the physical thickness as a function of temperature.

All of the interferometer embodiments of the present invention include at least two optical fiber interferometers which are associated together by sharing one or two common optical fiber stretching elements which are used to change the path lengths of the respective branches of the at least two interferometers by the same proportion and preferably by the same amount. In FIG. 2A-FIG. 7B, optical fibers which couple adjacent components together are shown as having various line types including dashed lines, solid lines, dotted lines, or dotted-dashed lines. All components shown as being coupled together by optical fibers having the same line type are components of the same interferometer.

In FIG. 2A-FIG. 7B, suffixes on component names (-1, -2, -3, -j, -m) indicate which of the individual associated interferometers (1, 2, 3, j, m) that the component is a part of. The embodiments of the present invention shown in FIG. 2A-FIG. 6B and FIG. 7B combine a laser interferometer which is used as a reference distance scale with at least one low coherence interferometers. The combination of a laser interferometer with a low coherence interferometer is called a dual interferometer as disclosed in "Marcus '392" and "Marcus '487". In the Figures, the associated coherent light interferometer is configured in the standard mode Michelson interferometer configuration. The associated low coherence interferometers are configured in either the standard mode Michelson configuration or in the autocorrelation mode in which the device under test is located at the input to a standard Michelson interferometer.

By convention, in a standard mode Michelson interferometer, a reflector is located in the first branch of the Michelson interferometer, and the sample or device under test, which we also call the object, is located in the second branch of the Michelson interferometer. In an autocorrelation mode Michelson interferometer, light that is sent to the device under test is reflected back from optical interfaces of the device under test into a Michelson interferometer having reflectors in both the first second branches of the interferometer. Throughout the disclosure of the present invention we will use the prefixes "reference" and "sample" on component names to define which branch of the interferometer that the component is located in. The prefix "reference" in a component name indicates that the component is in the first branch of the interferometer and the prefix "sample" indicates that the component is in the second branch of the interferometer. In the case of the autocorrelator mode the use of the term "sample branch" does not imply that the device under test is located in that branch.

When referring to optical fiber stretchers throughout this disclosure we will use the term reference optical fiber stretcher and sample optical fiber stretcher to denote the optical fiber stretchers located in the reference and sample branches of the interferometer respectively. In the embodiments of this invention, the reference and sample optical fiber stretchers have outer surfaces with uniform perimeters which we refer to as the reference outer surface and the sample outer surface respectively. Thus, throughout this disclosure the term reference outer surface defines a reference perimeter which is the uniform perimeter of the reference outer surface, and the term sample outer surface defines a sample perimeter which is the uniform perimeter of the sample outer surface.

FIG. 2A-FIG. 3B show schematics of various configurations of low coherence standard mode Michelson interferometer embodiments of this invention while FIG. 4A-FIG. 5B show various configurations of low coherence autocorrelation mode Michelson interferometer embodiments of this invention. FIG. 6A and FIG. 6B show schematics of various configurations of hybrid low coherence interferometer embodiments of this invention which include at least one low coherence standard mode Michelson interferometer and at least one low coherence autocorrelation mode Michelson interferometer associated together.

When using the autocorrelator mode Michelson interferometer configurations shown in FIG. 4A-FIG. 6B, a reference reflection may be added inside the optical probe that is coupled to the device under test. The reference reflector is set up at a known distance from the optical probe focal depth on the device under test and the zero voltage optical path difference of the two branches of the Michelson interferometer are offset by an amount close to this known distance. This allows the interferogram obtained as a function of scan depth to appear the same as in the standard mode interferometer.

In FIG. 2A-FIG. 7B optical fibers are indicated by dashed lines (interferometer 1), solid lines (interferometer 2), dotted lines (interferometer 3) and dotted—dashed lines (interferometer m). The individual fibers which connect components are not all labelled individually, but it is to be understood that optical fibers couple light from the input component into the output component. The input and output ends of the components are indicated by solid circles. Light is coupled into the optical fibers from the component at the input end and is transmitted along the optical fiber and is then coupled into the component at the output end. When light is reflected from a downstream component, light will propagate back down the optical fiber in the opposite direction. Also, the solid circles at the input and output ends of the components do not imply that there is a fiber termination located at each component end as the various components may contain fiber pigtails or exposed optical fibers at both ends. Optical fiber stretchers 10R, 10S, 13R, 13S, 16R and 16S are examples of components which may contain fiber pigtails and exposed optical fibers at both ends. The optical fibers may also contain splices or optical fiber connectors between the various components which are not shown in the figures. Other components including filters, polarizers, couplers, wavelength division multiplexers (coupled to other light sources) and attenuators may also be added between components that are shown in the Figures.

All of the interferometer embodiments of this invention contain various light sources and detectors. The light sources may be coherent or low coherence light sources and may operate at a variety of wavelengths. The detectors are used to detect interferograms arising from interference between two beams of light produced by the interferometer. The detector may be any kind of suitable detector including a photodiode, avalanche photodiode, or a balanced detector. The same detector may be used to detect coherent light and low coherence light.

In the standard mode Michelson interferometers shown in FIG. 2A-FIG. 3B and FIG. 7A-FIG. 7B, the object 42 is located in the sample branch of the interferometers while in the autocorrelation mode interferometers shown in FIG. 4A-FIG. 5B the light is incident on the device under test and reflected light coming from the optical interfaces in the device under test is input into the reference and sample branches of the Michelson interferometers. The various optical fiber stretchers 10R, 10S, 13R, 13S, 16R, and 16S are common to each of the associated Michelson interferometers shown in each of the respective figures and are used to vary the optical path length of light of the same wavelength be transmitted through all of the optical fibers located in the branches of each of the Michelson interferometers by the same amount. Capital bold letter R and S indicate the reference and sample branches of the interferometer. R and S suffixes on component numbers are used to differentiate components which occur in both branches of the interferometer and indicate that the component is located in the reference branch or the sample branch respectively. The numbers used to represent optical fibers in the optical fiber stretchers (1R, 1S, 2R, 2S, 3R, 3S, mR, mS) making up the optical fiber delay lines are also the same as the distinct associated interferometer number in the figures.

In FIG. 2A-FIG. 3B, all of the components connected together by dashed lines form a coherent light Michelson interferometer in the standard mode configuration; all of the components connected together by solid lines form a first low coherence Michelson interferometer in the standard mode configuration; and all of the components coupled together by dotted lines form a second low coherence Michelson interferometer in a standard mode configuration. In FIG. 4A-FIG. 6B, all of the components coupled together by dashed lines form a coherent light Michelson interferometer in a standard mode configuration, and all of the components coupled together by solid lines form a first low coherence interferometer operating in an autocorrelation mode. In FIG. 4A-FIG. 5B, all of the components coupled together by dotted lines form a second low coherence interferometer operating in an autocorrelation mode. However in FIG. 6A-FIG. 6B, all of the components coupled together by dotted lines form a second low coherence Michelson interferometer configured in the standard mode. The interferometer configurations shown in FIG. 6A-FIG. 6B are considered hybrid configurations since there are two separate associated low coherence interferometers which operate in different modes of operation, but still share common optical fiber stretchers.

Figure 2A:
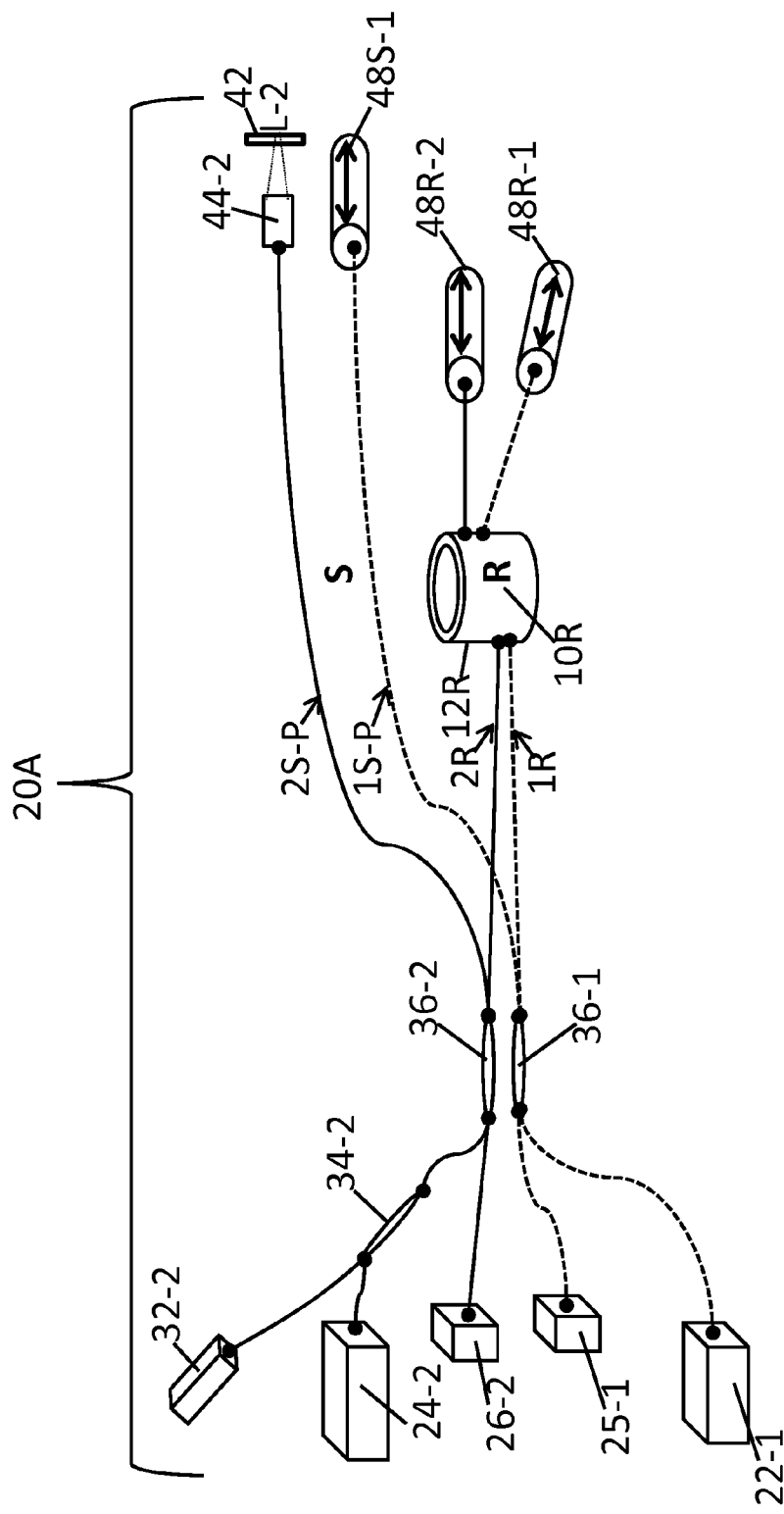
FIG. 2A shows a schematic of a first associated two optical fiber interferometer embodiment of the present invention.

FIG. 2A shows a schematic of a first associated two optical fiber interferometer 20A embodiment of the present invention. The first associated two optical fiber interferometer 20A incorporates a reference optical fiber stretcher 10R having an outer surface with a uniform perimeter called a reference outer surface 12R defining a reference perimeter and first and second reference delay optical fibers 1R (dashed lines) and 2R (solid lines) respectively being wound around the reference outer surface 12R of the reference optical fiber stretcher 10R as shown in FIG. 1A. The reference optical fiber stretcher 10R also comprises a reference actuator configured to temporally vary the reference perimeter of the reference outer surface 12R of optical fiber stretcher 10R. In the preferred embodiment the reference optical fiber stretcher 10R is comprised of a piezoelectric cylinder which functions as the reference actuator. Also, the first and second reference delay optical fibers 1R and 2R are interleaved with each other forming an interleaved arrangement as they are wound together around the reference outer surface 12R of the reference optical fiber stretcher 10R and the lengths of the portions of the first and second reference delay optical fibers 1R and 2R which are interleaved and wound together around the reference outer surface 12R of the reference optical fiber stretcher are the same. It is also preferred that the first and second reference delay optical fibers 1R and 2R are wound together around the reference outer surface 12R of the reference optical fiber stretcher 10R in a single layer, and that adjacent interleaved delay optical fibers are in contact with each other when wound around the reference perimeter of the reference optical fiber stretcher 10R.

During operation, the optical path length of light of the same wavelength being transmitted along the first reference delay optical fiber 1R and the second reference delay optical fiber 2R of the reference optical fiber stretcher 10R are simultaneously varied by the same amount. The reference optical fiber stretcher 10R is located in the reference branch R of the first associated two optical fiber interferometer 20A. The input ends of the first reference delay optical fiber 1R, of the second reference delay optical fiber 2R and of the reference optical fiber stretcher 10R are defined as being on the left side of the reference optical fiber stretcher 10R; and the output ends of the first reference delay optical fiber 1R, of the second reference delay optical fiber 2R and of the reference optical fiber stretcher 10R are defined as being on the right side in FIG. 2A and subsequent figures.

Coherent light having wavelength $\lambda_c$ from a coherent light source 22-1 is coupled into a first fiber optic coupler 36-1 which divides the coherent light into reference and sample coherent light portions. The reference and sample coherent light portions are transmitted along two separate optical fibers which together make up part of the two branches of a coherent light Michelson interferometer (parts are indicated with suffix -1 and dashed lines). The first fiber optic coupler 36-1 is preferably a 2 by 2 coupler having a 50/50 power splitting ratio so that half of the light intensity is transmitted along each branch of the coherent light Michelson interferometer. Thus, the first fiber optic coupler 36-1 receives coherent light of wavelength $\lambda_c$ from coherent light source 22-1 and transmits a first portion of the coherent light into an input end of the first reference delay optical fiber 1R and transmits a second portion of the coherent light into an input end of an optical fiber in the sample branch of the interferometer. In this embodiment the optical fiber in the sample branch of the interferometer is called a first sample path matching optical fiber 1S-P which has about the same length as reference delay fiber 1R.

In the reference branch of the coherent light Michelson interferometer, the reference coherent light portion is coupled to the first reference delay optical fiber 1R at the input end of the reference optical fiber stretcher 10R and is then incident onto a first reference reflector 48R-1 which is coupled to the output end of the first reference delay optical fiber 1R of the reference optical fiber stretcher 10R. A portion of the reference coherent light portion is then reflected back from first reference reflector 48R-1 back through the first reference delay optical fiber 1R of the reference optical fiber stretcher 10R and then back through the first fiber optic coupler 36-1 and a portion of this reflected light is incident on a coherent light detector 25-1. Thus, the first reference reflector 48R-1 coupled to the output end of the first reference delay optical fiber 1R reflects coherent light back through the first reference delay optical fiber 1R, and back through the first fiber optic coupler 36-1 into the coherent light detector 25-1.

The sample coherent light portion is coupled to the first sample path matching optical fiber 2S-P located in the sample branch S of the coherent light Michelson interferometer through the first fiber optic coupler 36-1 and is incident on a first sample reflector 48S-1 as shown in FIG. 2A. A portion of the second coherent light portion reaching first sample reflector 48S-1 is reflected back through the first 2 by 2 fiber optic coupler 36-1 and a portion of this reflected light and is also incident on the coherent light detector 25-1. Thus, the first sample reflector coupled to an output end of the first sample path matching optical fiber 2S-P reflects coherent light back through the first sample path matching optical fiber 2S-P, and back through the first fiber optic coupler 36-1 and into the coherent light detector 25-1.

As the optical path of the reference fiber 1R is monotonically changed, a coherent light interference signal will be induced in the coherent light detector 25-1 as reflected coherent light coming from the sample and reference branches of the coherent light Michelson interferometer recombine at the first fiber optic coupler 36-1. The interference signal observed as a function of time or optical delay distance is called an interferogram. Since the light is coherent, the interference pattern is sinusoidal with a period of $\lambda_c/2$ where $\lambda_c$ is the wavelength of the coherent light source 22-1. The coherent light signal incident on the coherent light detector 25-1 is thus a sinusoidal interference pattern having a period of $\lambda_c/2$. Typically the zero crossings of the coherent light interferometer signal or a subset of them are used as a constant distance interval distance scale for sampling of the low coherence interferometer signal.

Reflectors used in the various embodiments labelled 48R-1-48R-m (in the reference branch) and 48S-1-48S-m (in the sample branch) may be mirrors or they may be mirrors which also include Faraday rotators. Faraday rotators function to rotate the polarization of the beam to compensate for the changes in phase of light which occur when light reflects from a surface. The reflectors may also be adjustable in distance so that they can be moved to a location which matches the path lengths in the two arms of the Michelson interferometer and then locked into place at an appropriate distance.

The first associated two optical fiber interferometer embodiment shown in FIG. 2A also includes a first low coherence Michelson Interferometer having parts indicated with suffix -2 and solid lines. First low coherence light from a first low coherence light source 24-2 having center wavelength $\lambda_1$ is coupled into an optional first wavelength division multiplexer 34-2 and then into a second fiber optic coupler 36-2. (If the optional first wavelength division multiplexer 34-2 were not present the first low coherence light would be directly coupled into the second fiber optic coupler 36-2). The other input branch of the optional first wavelength division multiplexer 34-2 is coupled to an optional first visible light source 32-2 which is used to identify the location being measured (L-2) on an object 42. The second fiber optic coupler 36-2 divides the first low coherence light into first reference and first sample low coherence light portions which are transmitted along two separate optical fibers which together make u part of the two branches of a first low coherence light Michelson interferometer. The 2 by 2 fiber optic coupler 36-2 also transmits a portion of the optional first visible light from the optional visible light source 32-2. The second fiber optic coupler 36-2 is preferably a 2 by 2 fiber optic coupler having a 50/50 power splitting ratio so that half of the light intensity is transmitted along each branch of the first low coherence light Michelson interferometer. Thus, the second fiber optic coupler 36-2 receives first low coherence light of center wavelength $\lambda$ from the first low coherence light source 24-2 and transmits a first portion of the first low coherence light into an input end of the second reference delay optical fiber 2R and transmits a second portion of the first low coherence light into an input end of the second sample path matching optical fiber 2P.

In the reference branch of the first low coherence light Michelson interferometer, the first reference low coherence light portion is coupled to the input end of the second reference delay optical fiber 2R at the input end of the reference optical fiber stretcher 10R and is then incident onto a second reference reflector 48R-2 located at the output end of the second reference delay optical fiber 2R of the reference optical fiber stretcher 10R. A portion of the first reference low coherence light portion that is incident on the second reference reflector 48R-2 is then reflected back through the second reference delay optical fiber 2R of the reference optical fiber stretcher 10R and then back through the second fiber optic coupler 36-2 and a portion of this reflected light is incident on a first low coherence light detector 26-2. Thus, the second reference reflector 48R-2 coupled to an output end of the second reference delay optical fiber 2R reflects first low coherence light back through the second reference delay optical fiber 2R, and back through the second fiber optic coupler 36-2 into the first low coherence light detector 26-2.

In the sample branch S of the first low coherence light Michelson interferometer, the first sample low coherence light portion is coupled to the input end of the second sample path matching optical fiber 2S-P. The output end of the second sample path matching optical fiber of the first low coherence light Michelson interferometer is coupled to a first optical probe 44-2 which focusses or collimates light on the object 42 at a first measurement location L-2 as shown in FIG. 2A. The first optical probe 44-2 usually includes lenses in order to focus the low coherence light onto the first measurement location L-2 on the object 42. The first optical probe 44-2 may optionally collimate the light which provides infinite depth of focus (which is still considered focusing). The dotted lines emanating from the output end of optical probe 44-2 show the light being focused onto the object 42 at the first measurement location L-2. Some visible light from optional first visible light source 32-2 will also illuminate the first measurement location L-2 with visible light. A portion of the sample low coherence light portion from first low coherence light source 24-2 reaching the object 42 at the first measurement location (referred to as first location) L-2 is reflected back from one or more of the optical interfaces of the object 42 back through the first optical probe 44-2, back through the second sample path matching optical fiber 2S-P and then back through the second fiber optic coupler 36-2 and is also incident into the first low coherence light detector 26-2. Thus, the first optical probe 44-2 coupled to the output end of the second sample path matching optical fiber 2S-P is configured to transmit first low coherence light to the first location L-2 on the object 42 comprising at least one optical interface, and to receive first low coherence light reflected back from the at least one optical interface, and transmit the reflected first low coherence light back through the first optical probe 44-2, back through the second sample path matching optical fiber 2S-P, and back through the second fiber optic coupler 36-2 and into the first low coherence light detector 26-2.

The low coherence light reflected from each of the optical interfaces of the object 42 at first measurement location L-2 located in the sample branch of the first low coherence Michelson interferometer can be made to interfere with the low coherence light returning along the reference branch of the first low coherence light Michelson interferometer which is reflected from the second reference reflector 48R-2. Constructive interference will occur when the optical path lengths of the light being transmitted along the reference and sample branches of the low coherence interferometer are equal and when they differ by optical distances between the various optical interfaces of the device under test. The constructive interference at each optical interface will persist for a distance equal to a few coherence lengths of the low coherence light source. In order to ensure that constructive interference can occur, the length of the second sample path matching optical fiber 2S-P must be about the same length as reference delay fiber 2R.

During operation the location of the second reference reflector 48R-2 in the reference branch of the low coherence interferometer can be pre-adjusted and set up to a fixed distance in which the optical paths from the second fiber optic coupler 36-2 to the object 42 and the distance from the second fiber optic coupler 36-2 to the adjustable distance reflector 48R-2 closely match each other. A periodic reference waveform (voltage ramp) is applied to the electrodes of the reference actuator of the reference optical fiber stretcher 10R in order to cause the optical path length of the reference branch of the first low coherence light interferometer to cyclically vary from a distance less than the optical path length of the sample branch to the first optical interface of the object 42 at measurement location L-2 to a distance greater than the optical path length of the sample branch to the last optical interface of the object 42 at measurement location L-2. As the voltage applied to the reference optical fiber stretcher 10R is varied, constructive interference will occur in the low coherence interferometer when the path length of the sample and reference branches of the low coherence interferometer are equal and when they differ by an amount equal to distances between optical interfaces in the object 42 at measurement location L-2. This interference is observed in the first low coherence light detector 26-2 and is analyzed in real time.

As described above with respect to FIG. 1A-FIG. 1C, when the lengths of the first and second reference delay optical fibers 1R and 2R that are interleaved and wound together around the reference outer surface of the reference optical fiber stretcher 10R are the same, the length of the first and second reference delay optical fibers 1R and 2R will change by the same amount as the reference perimeter of the reference optical fiber stretcher is uniformly varied. In communication grade optical fibers, the index of refraction of the optical fiber is a function of the wavelength of light and dispersion is a function of temperature.

Light of different wavelengths transmitted along optical fibers will also exhibit differential dispersion effects with temperature. The associated two optical fiber interferometer 20A (as compared to using a device with two single fiber interferometers) offers the advantage that the wavelength $\lambda_c$ of the coherent light source 22-1 and the center wavelength $\lambda_1$ of the low coherence light source 24-2 transmitted along the first and second reference delay optical fibers 1R and 2R can be made to be equal to each other. This causes light of the same wavelength transmitted along the first and second reference delay optical fibers 1R and 2R to undergo the same optical path length change as the reference optical fiber stretcher 10R changes diameter during operation since the wavelengths are equal, the indices of refraction of the two delay optical fibers are equal, and thus the optical path length changes are equal. Using coherent and low coherence light sources that have the same center wavelength also helps minimize temperature dependent dispersion effects in the optical fibers.

Figure 2B:
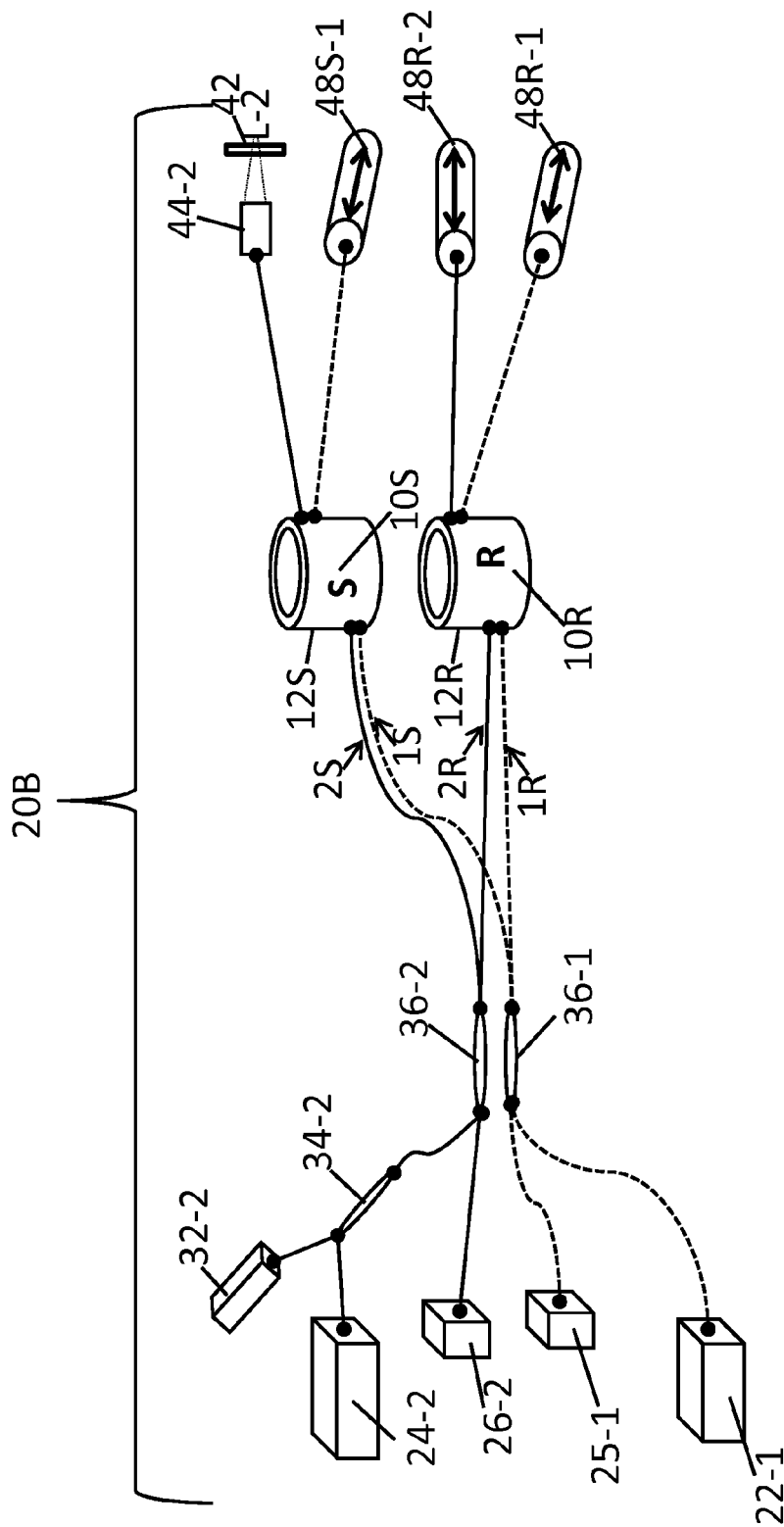
FIG. 2B shows a schematic of a second associated two optical fiber interferometer embodiment of the present invention.

FIG. 2B shows a schematic of a second associated two optical fiber interferometer 20B embodiment of the present invention. Only additional components and changes from the apparatus shown in FIG. 2A will be described in the pursuing discussion. In addition to all of the components in the first associated two optical fiber interferometer embodiment 20A shown in FIG. 2A which all have the same functions, the second associated two optical fiber interferometer 20B incorporates a second optical fiber stretcher called the sample optical fiber stretcher 10S. The sample optical fiber stretcher 10S comprises a sample outer surface 12S defining a sample perimeter and two delay optical fibers 1S (dashed lines) and 2S (solid lines) called the first sample delay optical fiber 1S and the second sample delay optical fiber 2S respectively wound together around the sample outer surface 12S of the sample optical fiber stretcher 10S in a single layer (as described and shown in FIG. 1A), and the sample optical fiber stretcher 10S is located in the sample branch of each of the respective coherent and low coherence interferometers. The sample optical fiber stretcher 10S further comprises a sample actuator configured to temporally vary the sample perimeter of the sample outer surface 12S. In the preferred embodiment the sample optical fiber stretcher 10R is comprised of a piezoelectric cylinder having the same perimeter as the reference actuator. Also in the preferred embodiment, the first and second sample delay optical fibers 1S and 2S are interleaved with each other as they are wound together around the sample outer surface 12S of the sample optical fiber stretcher 10S forming an interleaved arrangement. Also, the lengths of the portions of the first and second sample delay optical fibers 1S and 2S which are interleaved and wound together around the reference outer surface of the reference optical fiber stretcher are the same. It is also preferred that all adjacent interleaved delay optical fibers are in contact with each other during winding around the sample perimeter of the sample optical fiber stretcher 10S.

The sample coherent light portion of the coherent light from coherent light source 22-1 transmitted along the sample branch of the coherent light Michelson interferometer from the first fiber optic coupler 36-1 is coupled to the input end of the first sample delay optical fiber 1S of the sample optical fiber stretcher 10S and is then incident onto a first sample reflector 48S-1 located past the output end of sample optical fiber stretcher 10S. A portion of the sample coherent light reaching the first sample reflector 48S-1 is then reflected back through first sample delay optical fiber 1S of the sample optical fiber stretcher 10S and then back through the first fiber optic coupler 36-1 and a portion of this reflected light is incident on coherent light detector 25-1. Thus, the first sample reflector 48-1 coupled to the output end of the first sample delay optical fiber 1S reflects coherent light back through the first sample delay optical fiber 1S, and back through the first fiber optic coupler 36-1 and into the coherent light detector 25-1.

Low coherence light from first low coherence light source 24-2 transmitted along the sample branch of the first low coherence light Michelson interferometer transmitted through the second fiber optic coupler 36-2 called the sample low coherence light portion is coupled into the second sample delay optical fiber 2S of the sample optical fiber stretcher 10S and is then incident on the first optical probe 44-2 located past the output end of the sample optical fiber stretcher 10S. As described before, the optical probe 44-2 focusses or collimates light on the object 42 at measurement location L-2. A portion of the low coherence light from first low coherence light source 24-2 reaching the object 42 is reflected back from each of the optical interfaces of the object 42 at measurement location L-2 back through the first optical probe 44-2, the second sample delay optical fiber 2S of the sample optical fiber stretcher 10S, and the second fiber optic coupler 36-2, and is incident onto the first low coherence light detector 26-2 as described above with respect to the first two fiber interferometer 20A shown in FIG. 2A. Thus, the second fiber optic coupler 36-2 receives first low coherence light of center wavelength $\lambda_1$ from the first low coherence light source 24-2 and transmits a first portion of the first low coherence light into the input end of the second reference delay optical fiber 2R and transmits a second portion of the first low coherence light into the input end of the second sample delay optical fiber 2S. The first optical probe 44-2 coupled to the output end of the second sample delay optical fiber 2S is configured to transmit first low coherence light to a first location L-2 on an object 42 comprising at least one optical interface, and receive first low coherence light reflected back from the at least one optical interface, and transmit the reflected first low coherence light back through the first optical probe 44-2, back through the second sample delay optical fiber 2S, and back through the second fiber optic coupler 36-2 and into the first low coherence light detector 26-2.

Figure 9:
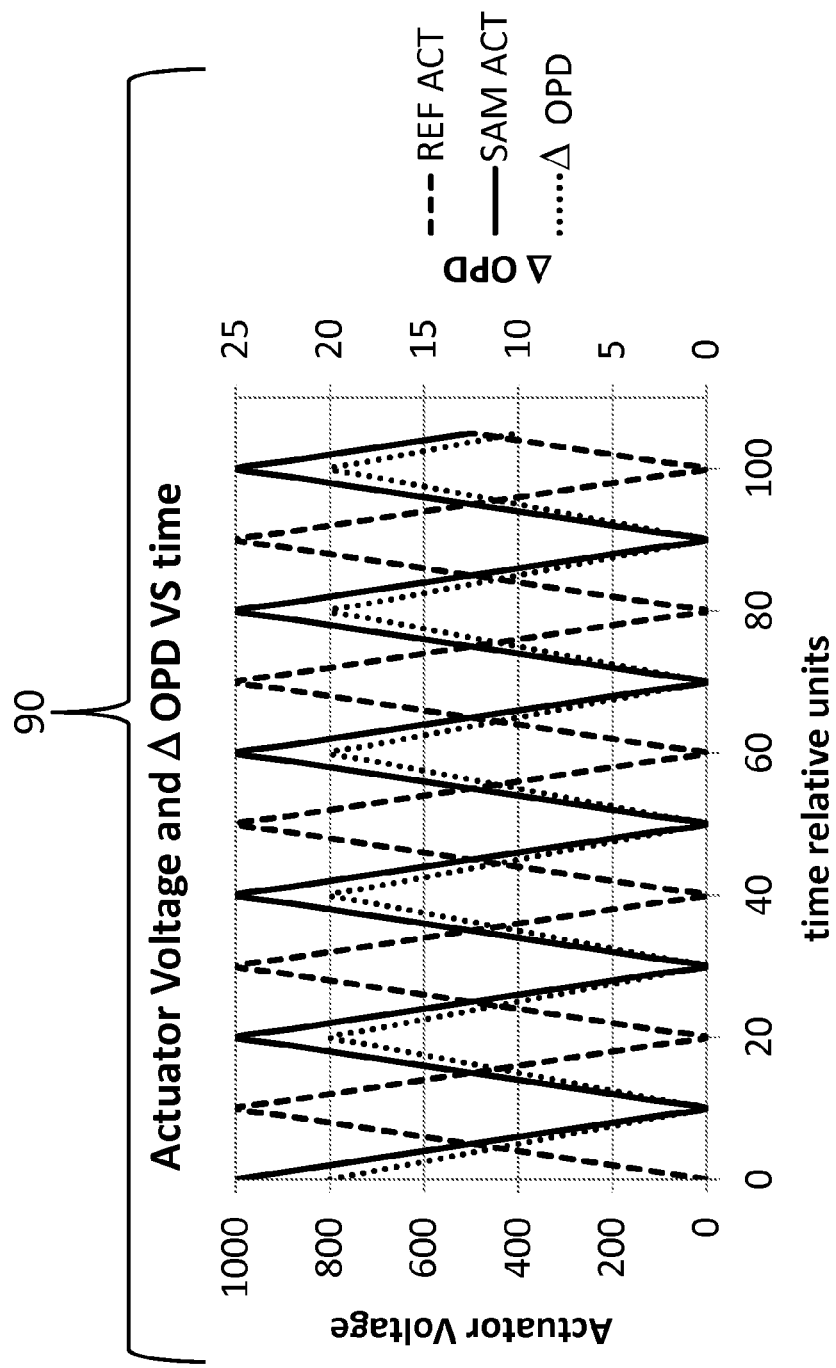
FIG. 9 shows a graph of piezoelectric actuator voltage waveform versus time and the change in optical path difference versus time for reference and sample actuators of a Michelson interferometer operating in a push-pull mode.

During operation of the second associated two optical fiber interferometer 20B shown in FIG. 2B, the pair of reference and sample optical fiber stretchers 10R and 10S respectively are preferably operated in a push-pull mode. When operating in the push-pull mode, the reference actuator and the sample actuator are driven with respective reference and sample waveforms that monotonically increase the reference perimeter the reference optical fiber stretcher while monotonically decreasing the sample perimeter of the sample optical fiber stretcher respectively and vice versa. Thus, the fiber optic path lengths of the first and second reference delay optical fibers are increasing while the fiber optic path lengths of the first and second sample delay optical fibers are decreasing and vice versa. In the case of a piezoelectric actuator, the waveform is the voltage applied to the piezoelectric coil actuator as a function of time and the waveform is preferred to be periodic and continuous. When operating in the push-pull mode the voltage waveforms applied to the reference optical fiber stretcher 10R and the sample optical fiber stretcher 10S are ramped in opposite directions as a function of time as shown in FIG. 9. This results in the second two fiber interferometer 20B having double the maximum fiber optic path length change that can be obtained in the first 2 fiber interferometer 20A shown in FIG. 2A. The preferred voltage waveform applied to the piezoelectric cylinders is a triangle wave as shown in FIG. 9. In the preferred embodiment, the lengths of the first reference delay optical fiber 1R, the second reference delay optical fiber 2R, the first sample delay optical fiber 1S, and the second sample delay optical fiber 2S wound around the individual two optical fiber stretchers are all the same.

The reference and sample optical fiber stretchers 10R and 10S are piezoelectric cylinders having the same diameter in the preferred embodiment. FIG. 9 shows an actuator voltage versus time graph 90 showing the reference and sample waveforms applied to the reference and sample piezoelectric actuators as a function of time for the push-pull mode of operation. The reference and sample waveforms are periodic with respect to time and are shown as the voltages applied to the piezoelectric cylinder actuators in volts as a function of time. FIG. 9 also shows the change in optical path difference between the sample and reference branches of the associated optical fiber interferometers in mm versus time for a pair of reference and sample piezoelectric cylinder actuators of a Michelson interferometer operating in the push-pull mode. The dashed line waveform ( - - - ) shows the voltage applied to the reference actuator of the reference optical fiber stretcher 10R on the vertical axis versus time on the horizontal axis. The solid line waveform (-) shows the voltage applied to the sample actuator of the sample optical fiber stretcher 10S on the vertical axis also versus time on the horizontal axis. The dotted line curve ( . . . ) labeled Δ OPD shows the difference in the optical path length between the sample and reference branches of the coupled interferometers as a function of time. The optical path difference between the reference and sample branches are also periodic in time with the same period (20 relative time units in FIG. 9) as the periodic drive voltages on the individual piezoelectric coils. During operation, the coherent light interferometer and the first low coherence light interferometer both exhibit the same optical path difference as a function of time.

As in the case of the first associated two optical fiber interferometer 20A, the low coherence light reflected from each of the optical interfaces of the object 42 located in the sample branch of the first low coherence Michelson interferometer of the second 2 fiber interferometer 20B can be made to interfere with the low coherence light returning along the reference branch of the first low coherence light Michelson interferometer, which is reflected back from reference reflector 48R-2. As described before constructive interference will occur when the optical path lengths of the light being transmitted along the two branches of the low coherence interferometer are equal and when they differ by an amount equal to distances between optical interfaces in the object 42 at measurement location L-2.

Using a pair of optical fiber stretchers having the same length of optical fiber in both branches of the associated interferometers makes it easier to match path lengths in the two branches of each of the associated interferometers. As in the case of the first associated two optical fiber interferometer 20A, the location of the reference reflector 48R-2 in the reference branch of the first low coherence interferometer of the second associated two optical fiber interferometer 20B is pre-adjusted and set to a fixed distance in which the optical paths from the second 2 by 2 fiber optic coupler 36-2 to the object 42 and the distance from the second 2 by 2 fiber optic coupler 36-2 to the reference reflector 48R-2 closely match each other. In discussions of all subsequent interferometer configurations of the present invention, the path lengths of the reference and sample branches of each low coherence interferometer are matched so that interference will occur over the scan distance of the optical fiber stretchers.

Figure 2C:
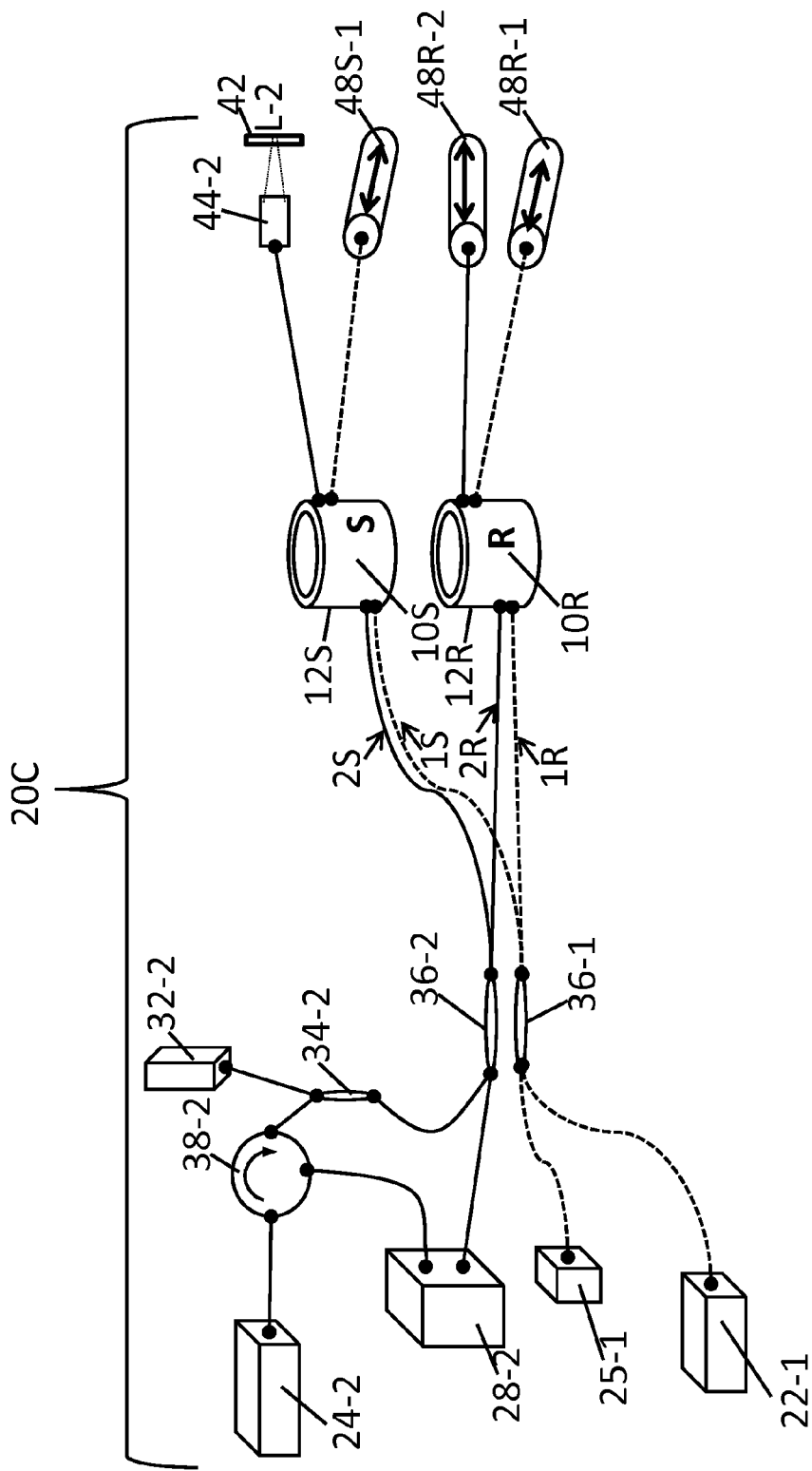
FIG. 2C shows a schematic of a third associated two optical fiber interferometer embodiment of the present invention.

FIG. 2C shows a schematic of a third associated two optical fiber interferometer 20C embodiment of the present invention. Most of the components in the third associated two optical fiber interferometer 20C are the same as in the second associated two optical fiber interferometer embodiment 20B shown in FIG. 2B and all of the same components have the same functions. In the third associated two optical fiber interferometer 20C embodiment the first low coherence light detector 26-2 is a first balanced detector 28-2. In a balanced detector, the detector includes a second input so that the two input signals can be subtracted from each in order to remove common mode noise between the two inputs of the balanced detector. A first optical circulator which we refer to as circulator 38-2 is also placed between the first low coherence light source 24-2 and the second fiber optic coupler 36-2 and its operation is described below.

Circulators are three port devices that function as optical isolators which allow light to propagate in one direction being from the first port to the second port of the circulator and from the second port to the third port of the circulator, but not in the reverse direction. The clockwise arrow inside first circulator 38-2 indicates the direction in which light propagates inside the circulator. In FIG. 2C, the first or input port of circulator 38-2 is coupled to the first low coherence light source 24-2, the second port is coupled to the optional first wavelength division multiplexer 34-2 and the third port is coupled to one of the inputs of the balanced detector 28-2. (In the schematics of FIGS. 2C and 3B-6B, circulators are represented by open circles and the three ports are indicated by small solid circles overlapping the open circle. The curved arrow shown inside the circulator indicates the direction of light propagation and the back end of the arrow is near the first port of the circulator.)

In the third associated two optical fiber interferometer 20C embodiment of the present invention the first low coherence light detector 26-2 of interferometers 20A (FIG. 2A) and 20B (FIG. 2B) is a first balanced detector 28-2, and a first circulator 38-2 is placed between the first low coherence light source 24-2 and the optional first wavelength division multiplexer 34-2. When the optional first wavelength division multiplexer 34-2 is not present, the second port of the first circulator 38-2 is coupled into the input end of the second fiber optic coupler 36-2.

The second fiber optic coupler 36-2 receives reflected light coming back from the second reference reflector 48R-2 that interferes with the low coherence light reflected from each of the optical interfaces of the object 42 at measurement location L-2. A portion of this interfering reflected light is also incident on port 2 of the first circulator 38-2. This interfering reflected light is then transmitted to port 3 of the first circulator 38-2 and is incident on the first input of balanced detector 38-2. A second portion of the interfering reflected light is input directly to the second input of balanced detector 28-2. The associated two optical fiber interferometer 20A shown in FIG. 2A may also be modified to include the first circulator 38-2 and the first balanced detector 28-2 instead of detector 26-2. Thus in the third associated two optical fiber interferometer 20C, the first low coherence light detector is a first balanced detector 28-2, and the interferometer apparatus also comprises a first circulator 38-2 comprised of a first port coupled to the first low coherence light source 24-2, a second port coupled to the second fiber optic coupler 36-2, and a third port coupled to the first input port of the first balanced detector 28-2. The second input port of the first balanced detector is configured to receive the first low coherence light reflected back from the at least one optical interface at the first location L-2 on the object 42 combined with the light reflected back from the second reference reflector 48R-2 and passing back through the second fiber optic coupler 36-2.

Figure 3A:
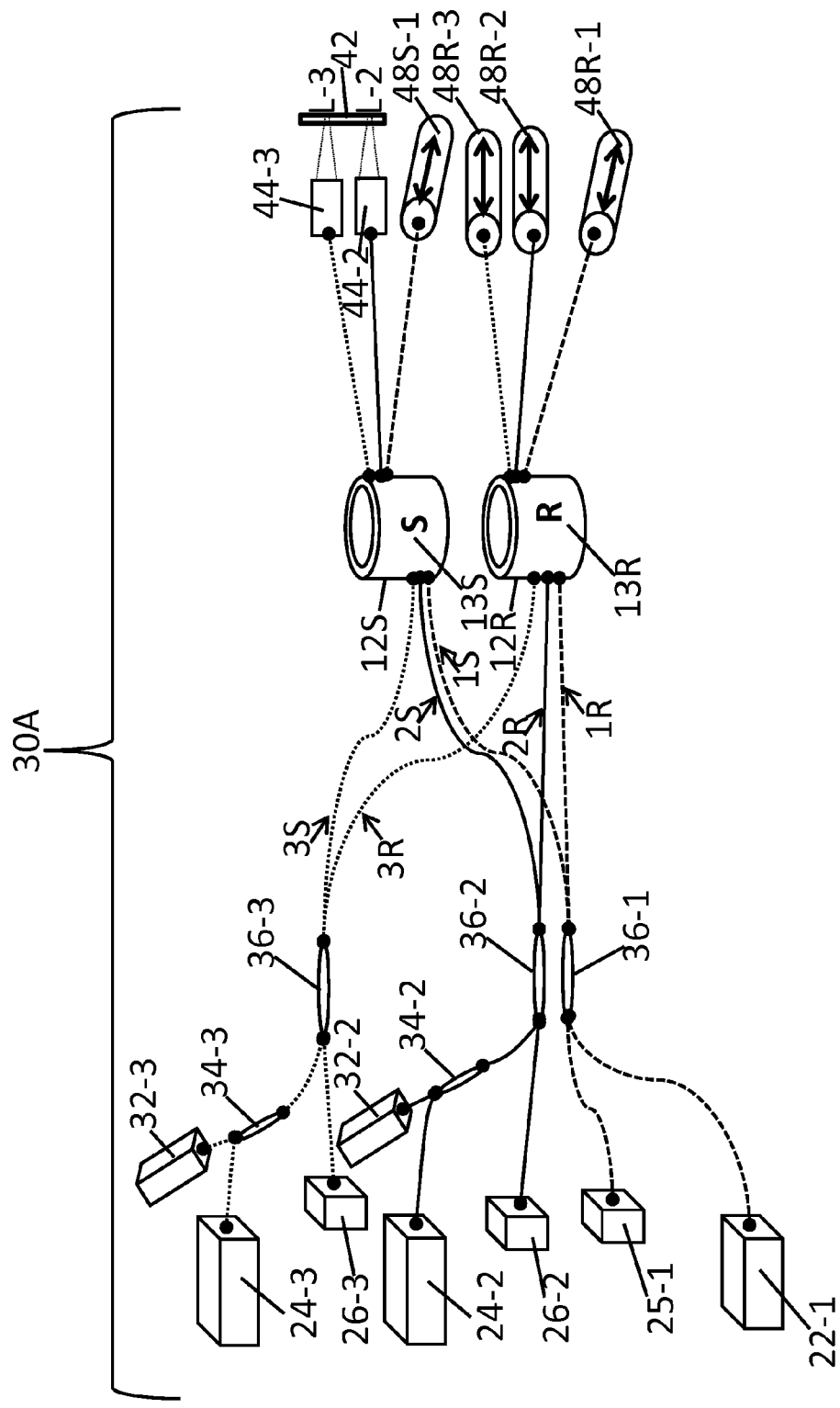
FIG. 3A shows a schematic of a first associated three optical fiber interferometer embodiment of the present invention.

FIG. 3A shows a schematic of a first associated three optical fiber interferometer 30A embodiment of the present invention. Most of the components in the first associated three optical fiber interferometer 20C are the same as in the second associated two optical fiber interferometer embodiment 20B shown in FIG. 2B and all of the common components have the same functions. Comparing the embodiment 20B shown in FIG. 2B to the embodiment 30A shown in FIG. 3A, the reference optical fiber stretcher 13R further comprises a third reference delay optical fiber 3R wound around the reference outer surface 12R, and the sample optical fiber stretcher 13S further comprises a third sample delay optical fiber 3S wound around the sample outer surface. The pair of optical fiber stretchers have outer surfaces having uniform perimeters (a reference optical fiber stretcher 13R and a sample optical fiber stretcher 13S), with the three fibers each being 1R (dashed lines), 2R (solid lines) and 3R (dotted lines) and 1S (dashed lines), 2S (solid lines) and 3S (dotted lines) respectively wound around them in the two branches of the coherent light and low coherence light Michelson interferometers. The first, second and third reference delay optical fibers 1R, 2R and 3R of the reference optical fiber stretcher 13R are wound together around the reference outer surface of the reference optical fiber stretcher preferably in a single layer. The first, second and third sample delay optical fibers 1S, 2S, and 3S of the sample optical fiber stretcher 13S are also wound together around the sample outer surface of the sample optical fiber stretcher 13S preferably in a single layer. The reference optical fiber stretcher 13R and the sample optical fiber stretcher 13S further comprise reference and sample actuators for temporally varying the reference and sample perimeters of the reference and sample optical fiber stretchers 13R and 13S respectively.

In a preferred embodiment the reference and sample optical fiber stretchers 13R and 13S are comprised of piezoelectric cylinders having the same perimeter which function as the respective reference and sample actuators. Also in this embodiment the first, second, and third reference delay optical fibers 1R, 2R, and 3R are preferably interleaved with each other as they are wound together around the reference outer surface 12R of the reference optical fiber stretcher 13R forming an interleaved arrangement and the first, second, and third sample delay optical fibers 1S, 2S, and 3S are interleaved with each other as they are wound together around the sample outer surface 12S of the sample optical fiber stretcher 13S forming an interleaved arrangement. Also the lengths of the first, second, and third reference delay optical fibers 1R, 2R, and 3R which are interleaved and wound together around the reference outer surface 12R of the reference optical fiber stretcher 13R and the lengths of the first, second and third sample delay optical fibers 1S, 2S and 3S being interleaved and wound together around the sample outer surface 12S of the sample optical fiber stretcher 13S are preferably the same. It is also preferred that all adjacent interleaved reference delay optical fibers 1R, 2R, and 3R and all adjacent interleaved sample delay optical fibers 1S, 2S, and 3S are in contact with each other during winding around the reference and sample perimeters of the reference and sample optical fiber stretchers 13R and 13S respectively.

The first associated three optical fiber interferometer 30A also includes a second low coherence Michelson interferometer (parts are indicated with suffix -3 and dotted lines), which is coupled to the third reference delay optical fiber 3R and the third sample delay optical fiber 3S which are wound around the reference optical fiber stretcher 13R and the sample optical fiber stretcher 13S which operate in the push-pull mode as described above with reference to the discussion of FIG. 2B. Second low coherence light from a second low coherence light source 24-3 having wavelength $\lambda_2$ is coupled into an optional second wavelength division multiplexer 34-3 and then into a third fiber optic coupler 36-3. (If the optional second wavelength division multiplexer 34-3 were not present, the first low coherence light would be directly coupled into the third fiber optic coupler 36-3). The other input arm of the optional second wavelength division multiplexer 34-3 is coupled to an optional second visible light source 32-3 which is used to identify the location being measured L-3 on the object 42.

The third fiber optic coupler 36-3 splits the low coherence light from the second low coherence light source 24-3 into second reference and second sample low coherence light portions which propagate through the two branches of a second low coherence light Michelson interferometer. The second reference and second sample low coherence light portions are coupled to the input ends of the third reference delay optical fiber 3R and the third sample delay optical fiber 3S, which are wound around the optical fiber stretchers 13R and 13S respectively. Thus, the third fiber optic coupler 36-3 receives second low coherence light of center wavelength $\lambda_2$ from a second low coherence light source 24-3 and transmits a first portion of the second low coherence light into an input end of the third reference delay optical fiber 3R and transmits a second portion of the second low coherence light into an input end of the third sample delay optical fiber 3S. The third fiber optic coupler 36-3 may have any splitting ratio but it is preferably a 50/50 coupler so that half of the light intensity is transmitted along each branch of the first low coherence light Michelson interferometer. In the reference branch of the second low coherence light Michelson interferometer, a portion of the low coherence light from the second low coherence light source 24-3 passing through the third fiber optic coupler 36-3 is coupled to the third reference fiber 3R of the three optical fiber stretcher 13R and is then incident onto a third reference reflector 48R-3. The location of the third reference reflector 48R-3 is pre-adjusted and set up to a fixed distance in the same way as the second reference reflector 48R-2 as described above in the discussion of FIG. 2A. A portion of the second low coherence light from second low coherence light source 24-3 that reaches the third reference reflector 48R-3 is reflected back through the third reference delay optical fiber 3R of the reference optical fiber stretcher 13R and then back through the third fiber optic coupler 36-3, and a portion of the second low coherence reflected light is incident on a second low coherence light detector 26-3. Thus, the third reference reflector coupled to the output end of the third reference delay optical fiber 3R reflects second low coherence light back through the third reference optical fiber 3R, and back through the third fiber optic coupler 36-3 and into a second low coherence light detector 26-3.

A portion of the second low coherence light from the second low coherence light source 24-3 transmitted along the sample branch of the second low coherence light Michelson interferometer from the third fiber coupler 36-3 is coupled into the third sample delay optical fiber 3S of the sample optical fiber stretcher 13S, and is then incident on a second optical probe 44-3 which focusses or collimates light on the object 42 having at least one optical interface at measurement location L-3 as shown in FIG. 3A. A portion of the low coherence light from the second low coherence light source 24-3 reaching the object 42 at measurement location L-3 is reflected back from each of the optical interfaces of the object 42 back through the second optical probe 44-3, back through the third sample delay optical fiber 3S of the sample optical fiber stretcher 10S and back through the third fiber optic coupler 36-3 and is also incident onto the second low coherence light detector 26-3. Thus, the second optical probe 44-3 coupled to the output end of the third sample delay optical fiber 3S is configured to transmit second low coherence light to a second location L-3 on the object 42 and receive second low coherence light reflected back from the at least one optical interface, and transmit the reflected second low coherence light back through the second optical probe 44-3, back through the third sample delay optical fiber 3S and back through the third fiber optic coupler 36-3 and into the second low coherence light detector 26-3. As in the case of the second low coherence interferometer shown in FIG. 2B, constructive interference will occur between the reference R and sample S branches of the second low coherence interferometer when the path lengths of the reference and sample branches are the same and when they differ by an amount equal to distances between optical interfaces in the object 42 at the measurement location now at L-3.

Figure 3B:
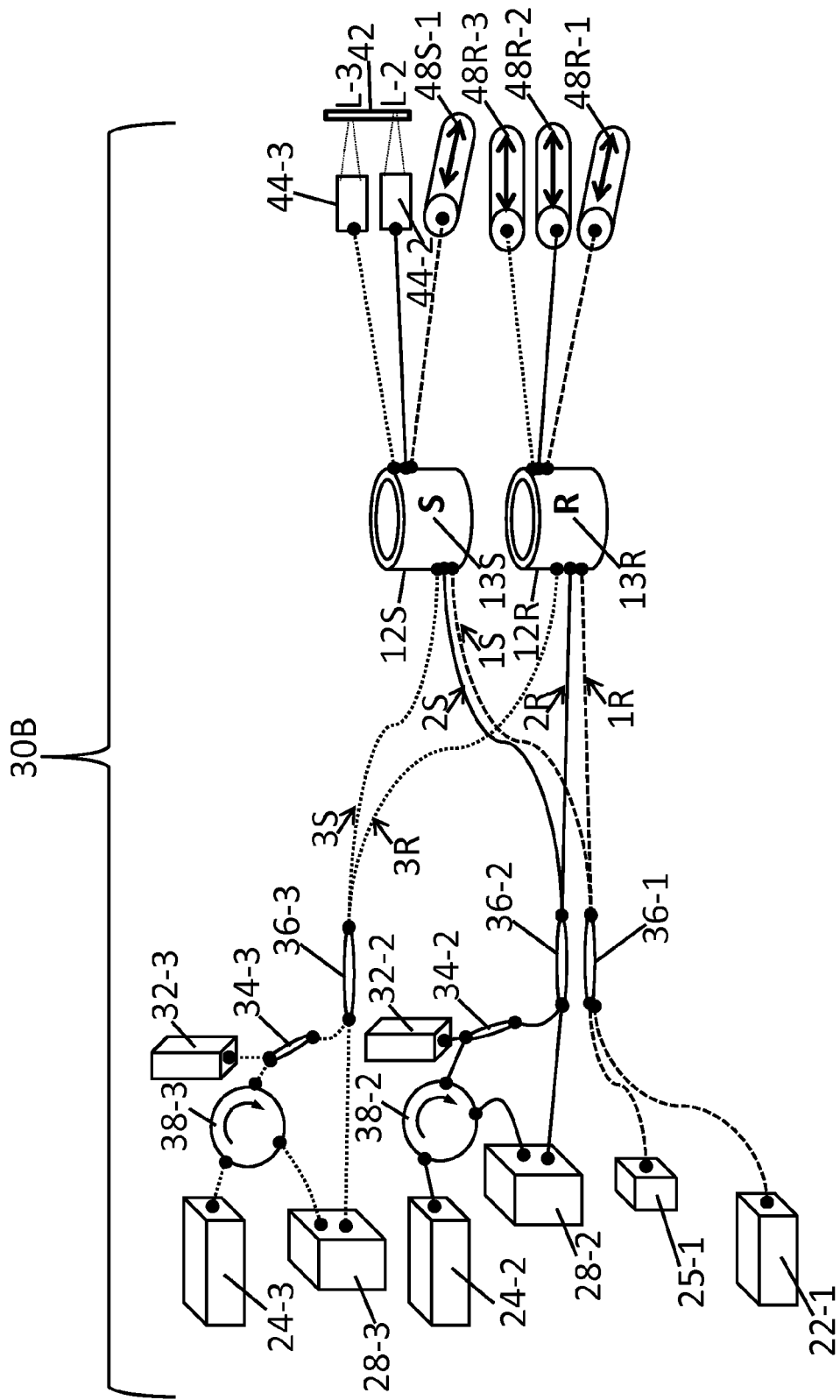
FIG. 3B shows a schematic of a second associated three optical fiber interferometer embodiment of the present invention.

FIG. 3B shows a schematic of a second associated three optical fiber interferometer 30B embodiment of the present invention. Most of the components in the second associated three optical fiber interferometer 30B are the same as in the first associated three optical fiber interferometer embodiment 30A shown in FIG. 3A and all of the same components have the same functions. As in the third associated two optical fiber interferometer 20C, the first low coherence light detector 26-2 is a first balanced detector 28-2, and a first circulator 38-2 is placed between the first low coherence light source 24-2 and the optional first wavelength division multiplexer 34-2. The first port of the first circulator 38-2 is coupled to the first low coherence light source 24-2, the second port is coupled to the optional first wavelength division multiplexer 34-2, and the third port is coupled to one of the inputs of the first balanced detector 28-2. The other input of the balanced detector 28-2 is coupled to the second 2 by 2 fiber optic coupler 36-2, which receives a portion of the reflected light coming from the second reference reflector 48R-2 that interferes with the low coherence light reflected from each of the optical interfaces of the object 42 at measurement location L-2.

Also in the second three fiber interferometer 30B, the second low coherence light detector 26-3 is a second balanced detector 28-3, and a second circulator 38-3 is placed between the second low coherence light source 24-3 and the second optional wavelength division multiplexer 34-3. The first or input port of circulator 38-3 is coupled to the second low coherence light source 24-3, the second port is coupled to the second optional wavelength division multiplexer 34-3 and the third port is coupled to one of the inputs of the second balanced detector 28-3. When the optional second wavelength division multiplexer 34-3 is not present, the second port of the second circulator 38-3 is coupled into the input end of third fiber optic coupler 36-3. The third fiber optic coupler 36-3, receives reflected light coming back from the third reference reflector 48R-3 that interferes with the second low coherence light portion being reflected from each of the optical interfaces of the object 42 at measurement location L-3. A portion of this interfering reflected light is also incident on port 2 of the second circulator 38-3. This interfering reflected light is then transmitted to port 3 of the second circulator 38-3 and is incident on the first input of the second balanced detector 28-3. A second portion of the interfering reflected light is input directly to the second input of the second balanced detector 28-3. In summary, in the second associated three optical fiber interferometer 30B embodiment of the present invention, the detector is a second balanced detector 28-3. The interferometer apparatus 30B further comprises a second circulator 38-3 comprised of a first port coupled to the second low coherence light source 24-3, a second port coupled to the third fiber optic coupler 36-3, and a third port coupled to a first input port of the second balanced detector 28-3, a second input port of the second balanced detector 28-3 configured to receive the second low coherence light reflected back from the at least one optical interface at the second location L-3 on the object 42 combined with the light reflected back from the third reference reflector 48R-3 and passing back through the third fiber optic coupler 36-3.

Although the associated three optical fiber interferometer configurations shown in FIGS. 3A-3B show configurations having a matched pair of reference and sample optical fiber stretchers 13R and 13S respectively having three delay optical fibers each in the reference and sample branches of each of the three associated interferometers, it is possible to build an associated three optical fiber interferometer having a single common optical fiber stretcher containing three delay optical fibers. In such a configuration, the single common optical fiber stretcher simultaneously varies the optical path length of light transmitted along the three optical fibers by the same amount. In this case, the three optical fibers would be located only in the reference branch of each of the three associated optical fiber interferometers similar to the configuration shown in FIG. 2A.

In preferred embodiments of the associated three optical fiber interferometers shown in FIG. 3A-3B, $\lambda_c$, $\lambda_1$, and $\lambda_2$ are equal. The first and second low coherence light sources 26-2 and 26-3 may be made from the same light source and may share a common emitter. As an example, they may be fiber coupled and split into two light sources with an optical fiber coupler.

FIG. 4A-FIG. 6B show schematics of various associated autocorrelator embodiments of the present invention. In all of these embodiments, the coherent light interferometer is in a standard Michelson configuration and has the identical components to those described in FIG. 2B-FIG. 3C. In all of these embodiments, at least one of the associated low coherence light interferometers is configured as an autocorrelator where the sample is at the input to the Michelson interferometer.

Figure 4A:
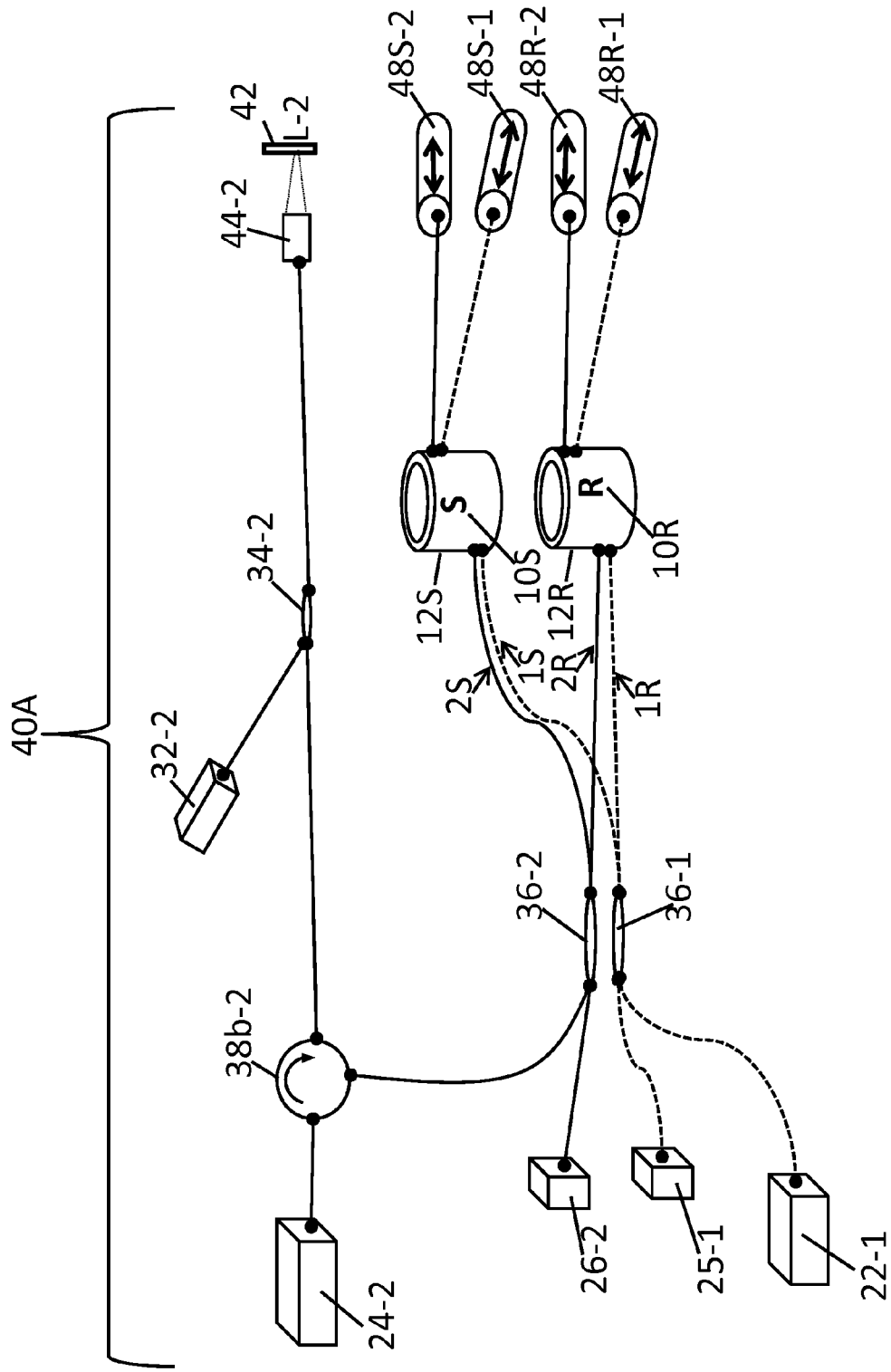
FIG. 4A shows a schematic of a first associated two optical fiber autocorrelator embodiment of the present invention.

FIG. 4A shows a first associated two optical fiber autocorrelator 40A embodiment of the present invention. First low coherence light from light from first low coherence light source 24-2 is coupled into the first port of a first primary circulator 38b-2, which sends light through an optional first wavelength division multiplexer 34-2 and through the first optical probe 44-2, which focusses or collimates light on the object 42 at measurement location L-2. (We use the primary designation on a circulator to indicate that light from a light source is coupled to the object before being split into two paths.) The other input branch of the first optional wavelength division multiplexer 34-2 is coupled to an optional first visible light source 32-2 which is used to illuminate the location being measured (L-2) on the object 42 with visible light. A portion of the first low coherence light from first low coherence light source 24-2 reaching the object 42 at measurement location L-2 is reflected back from one or more of the optical interfaces of the object 42 back through the first optical probe 44-2 and then back through port 2 of the first primary circulator 38b-2 and then through port 3 of the first primary circulator 38b-2 and is input into the second fiber optic coupler 36-2.

A portion of the first low coherence light that is reflected off of the one or more optical interfaces of the object 42 at measurement location L-2 is then split into reference and sample branches of a first low coherence Michelson interferometer at the output end of second fiber optic coupler 36-2 (parts indicated with suffix -2). The low coherence light transmitted along the reference and sample branches of the first low coherence Michelson interferometer is coupled into second reference delay optical fiber 2R of reference optical fiber stretcher 10R and second sample delay optical fiber 2S of sample optical fiber stretcher 10S respectively, and is then incident on second reference reflector 48R-2 and second sample reference reflector 48S-2 respectively. A first reference portion of the first low coherence light that was reflected off of the one or more optical interfaces of the object 42 at measurement location L-2, which are coupled into the reference branch of the interferometer, is reflected back from the second reference reflector 48R-2, back through the second reference delay optical fiber 2R of the reference optical fiber stretcher 10R and back through the second fiber optic coupler 36-2 and into the first low coherence light detector 26-2. Similarly, a first sample portion of the first low coherence light that was reflected off of the one or more optical interfaces of the object 42 at measurement location L-2, which are coupled into the sample branch of the interferometer, is reflected back from the second sample reflector 48S-2, back through the second sample delay optical fiber 2S of the sample optical fiber stretcher 10S and back through the second fiber optic coupler 36-2 and into the first low coherence light detector 26-2. The first reference portion and the first sample portion of the reflected low coherence light are recombined at the fiber optic coupler 36-2 where they interfere with each other. The interfering light is then incident on the first low coherence light detector 26-2 where the signal is amplified and processed.

As described with reference to the second associated two optical fiber interferometer 20B shown in FIG. 2B, the reference and sample optical fiber stretchers 10R and 10S in the first associated two optical fiber autocorrelator 40A shown in FIG. 4A are operated in the push-pull mode. Constructive interference will occur in first low coherence light detector 26-2 when the optical path lengths of the reference and sample branches of the interferometer are equal and when they differ by the distance between different optical interfaces in the object 42 at the measurement location L-2.

Figure 4B:
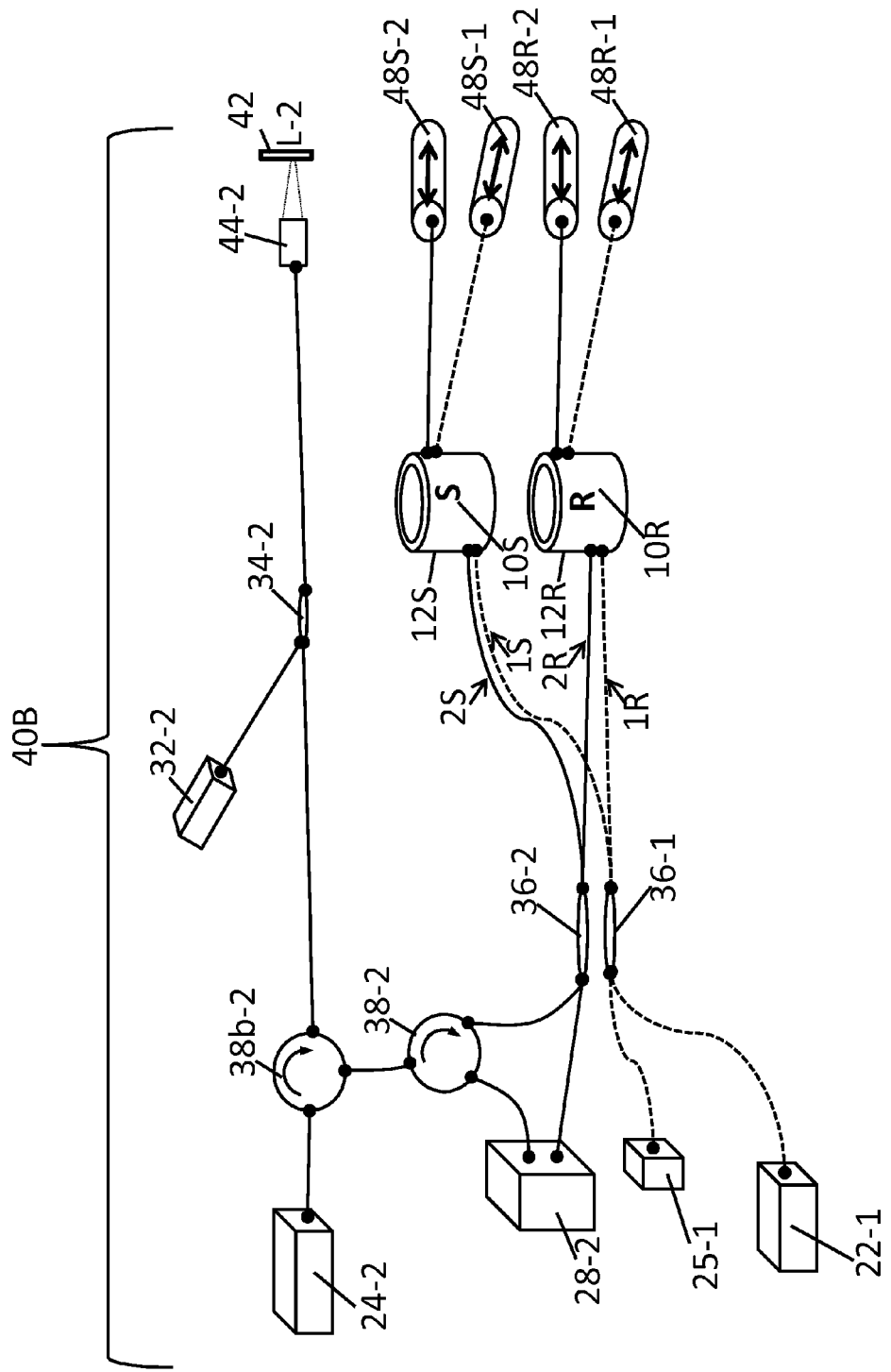
FIG. 4B shows a schematic of a second associated two optical fiber autocorrelator embodiment of the present invention.

FIG. 4B shows a schematic of a second associated two optical fiber autocorrelator 40B embodiment of the present invention. Most of the components in the second associated two optical fiber autocorrelator 40B are the same as in the first associated two optical fiber autocorrelator embodiment 40A shown in FIG. 4A, and all of the same components have the same functions. The first low coherence light detector 26-2 is a first balanced detector 28-2, and a first circulator 38-2 is placed between the first primary circulator 38*b*-2 and the second fiber optic coupler 36-2. The first port of the first circulator 38-2 is coupled to the third port of the first primary circulator 38*b*-2 which carries first low coherence light that is reflected off the of one or more optical interfaces of the object at location L-2, the second port of first circulator 38-2 is coupled to the input port of second fiber optic coupler 36-2, and the third port is coupled to one of the inputs of the first balanced detector 28-2. The other input of the first balanced detector 28-2 is coupled to the second fiber optic coupler 36-2, which receives combined interfering light being reflected from second reference reflector 48R-2 and second sample reflector 48S-2 as described, which reference to the discussion of the configuration shown in FIG. 4A.

Figure 5A:
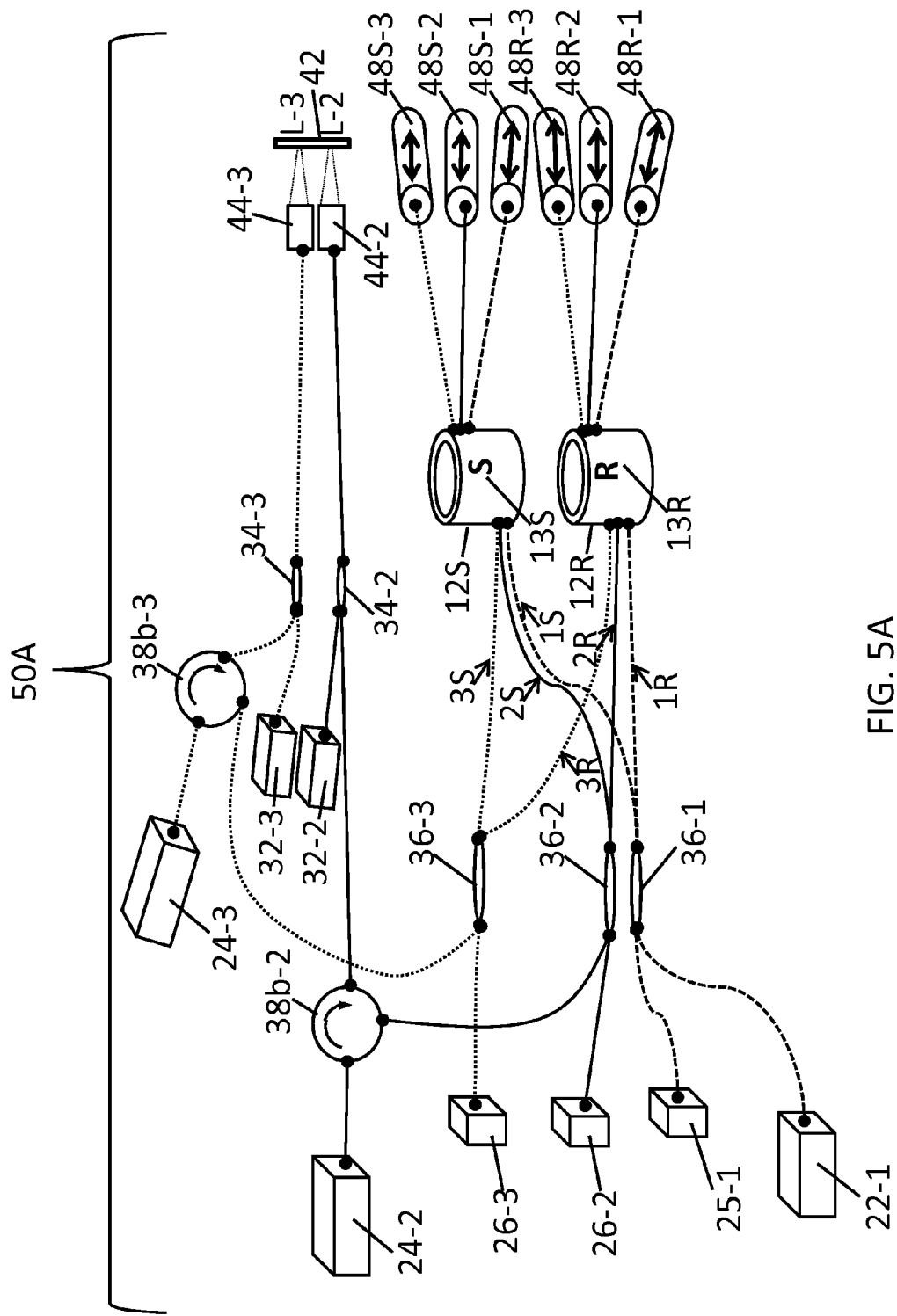
FIG. 5A shows a schematic of a first associated three optical fiber autocorrelator embodiment of the present invention.
Figure 6A:
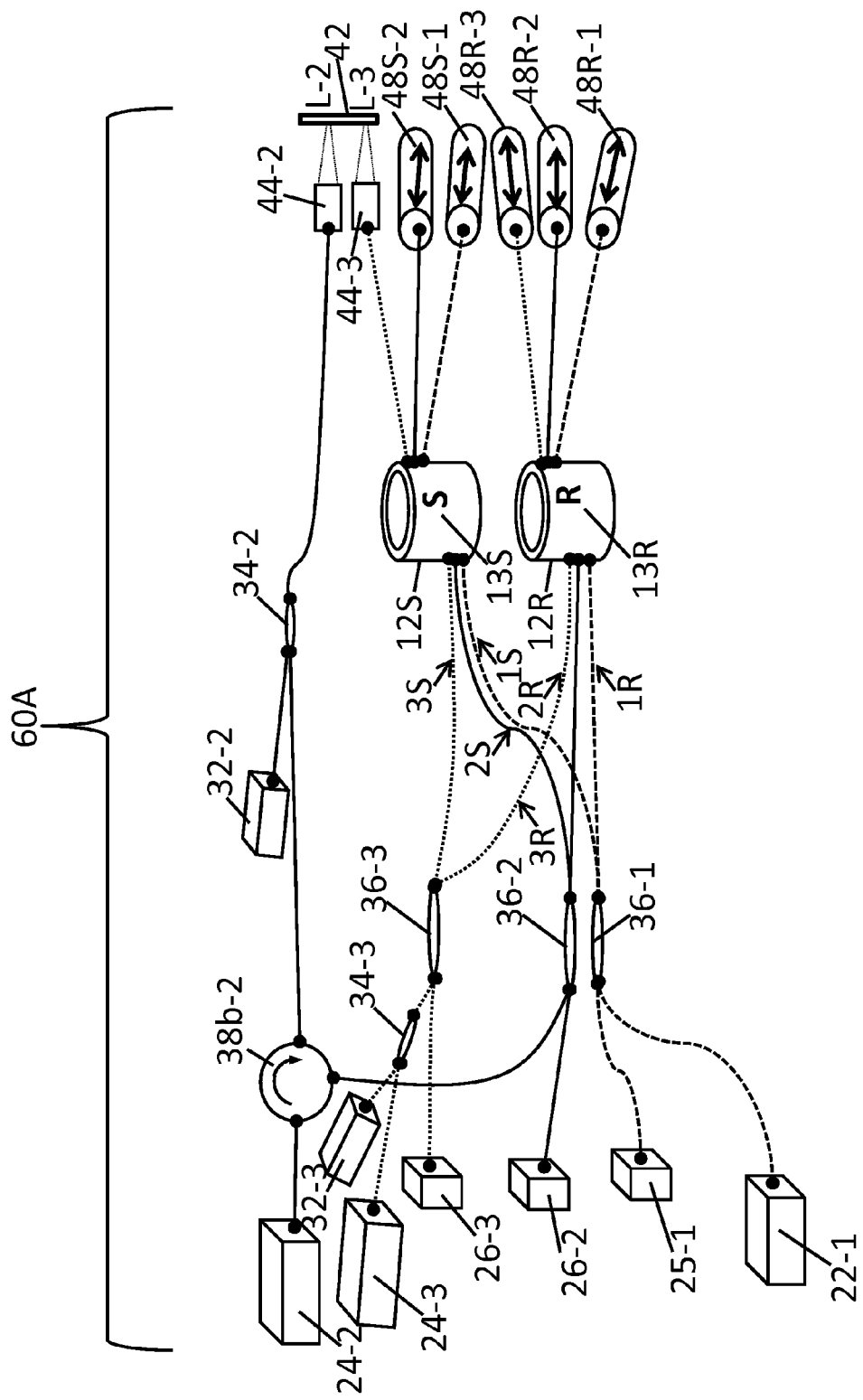
FIG. 6A shows a schematic of a first associated three optical fiber hybrid interferometer embodiment of the present invention.
Figure 6B:
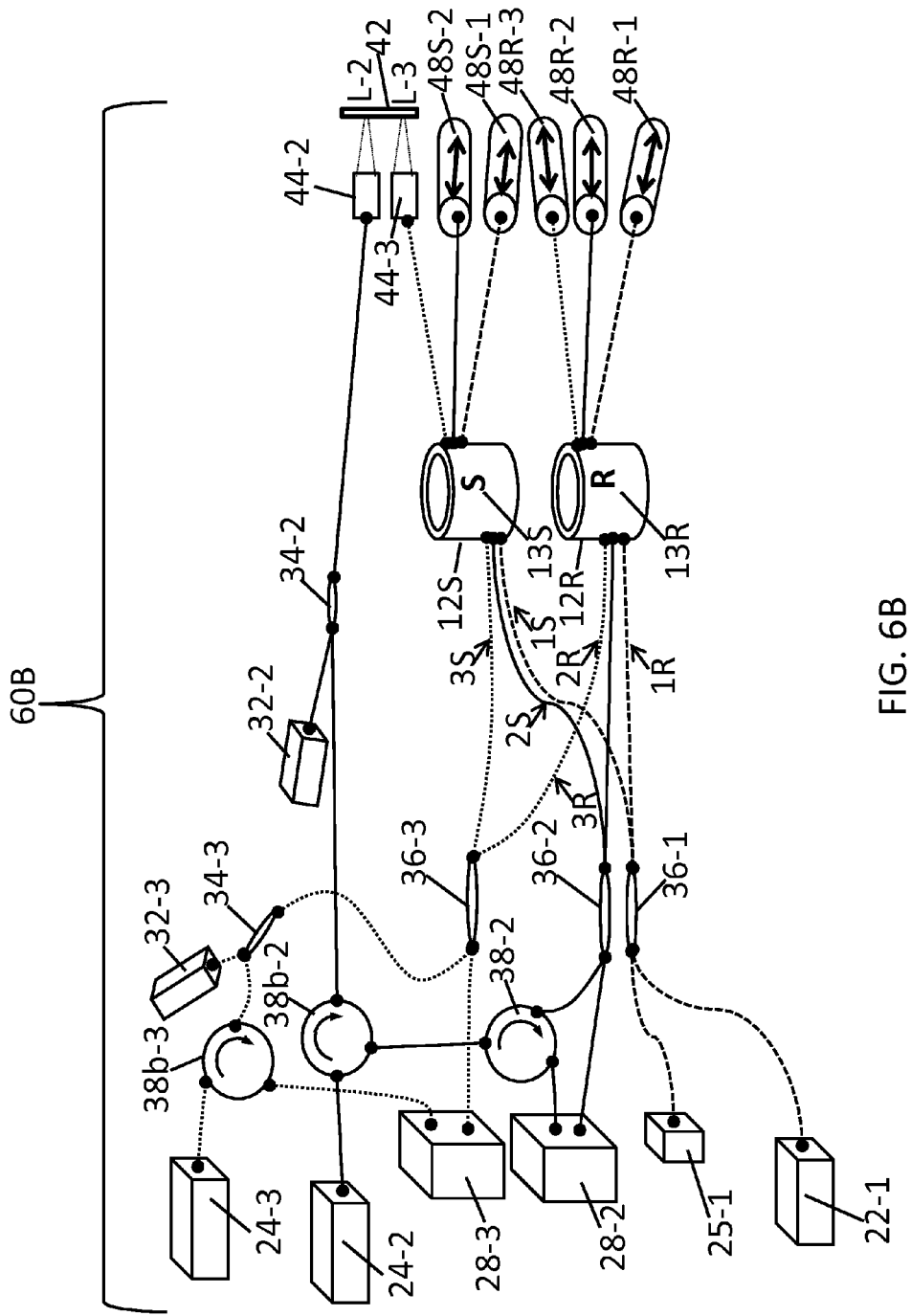
FIG. 6B shows a schematic of a second associated three optical fiber hybrid interferometer embodiment of the present invention.

FIG. 5A shows a schematic of a first associated three optical fiber autocorrelator 50A embodiment of the present invention. Most of the components in the first associated three optical fiber autocorrelator 50A are the same as in the first associated two optical fiber autocorrelator embodiment 40A shown in FIG. 4A and all of the common components have the same functions. In the first associated three optical fiber autocorrelator 50A of FIG. 5A, a pair of optical fiber stretchers, a reference optical fiber stretcher 13R and a sample optical fiber stretcher 13S, having three fibers each, 1R (dashed lines), 2R (solid lines) and 3R (dotted lines) and 1S (dashed lines), 2S (solid lines) and 3S (dotted lines) respectively, which are interleaved and wound together around them as described with reference to the discussion of FIG. 3A above, replace the reference and sample fiber stretchers 10R and 10S in the two branches of the coherent light and low coherence light interferometers shown in FIG. 4A. The first associated three optical fiber autocorrelator 50A also includes a second low coherence light autocorrelator (parts are indicated with suffix -3 and dotted lines), which is coupled to the third reference delay optical fiber 3R and the third sample delay optical fiber 3S that are wound around the reference optical fiber stretcher 13R and the sample optical fiber stretcher 13S, which operate in the push-pull mode as described above with reference to the discussion of FIG. 3A.

The first associated three optical fiber autocorrelator 50A also includes a second low coherence light source 24-3. Low coherence light from the second low coherence light source 24-3 is coupled into the first port of a second primary circulator 38*b*-3, which sends light through an optional second wavelength division multiplexer 34-3 and through a second optical probe 44-3, which focusses or collimates light on the object 42 at measurement location L-3. The other input branch of the optional second wavelength division multiplexer 34-3 is coupled to an optional second visible light source 32-3, which is used to illuminate the location being measured (L-3) on the object 42 with visible light. A portion of the second low coherence light from second low coherence light source 24-3 reaching the object 42 at measurement location L-3 is reflected back from one or more of the optical interfaces of the object 42 at measurement location L-3 back through the optical probe 44-3, and then back through port 2 of the second primary circulator 38*b*-3, and then through port 3 of the second primary circulator 38*b*-3, and is input into the third fiber optic coupler 36-3. A portion of the second low coherence light that is reflected off of the one or more optical interfaces of the object 42 at measurement location L-3 is then split into reference and sample branches of a second low coherence Michelson interferometer and coupled into the third reference delay optical fiber 3R of the reference optical fiber stretcher 13R and the third sample delay optical fiber 3S of the sample optical fiber stretcher 13S respectively, and is then incident on third reference reflector 48-3 and third sample reflector 48S-3 respectively. A reference portion of the second low coherence light that is reflected off of the one or more optical interfaces of the object 42 at measurement location L-3 is coupled into the reference branch of the second low coherence interferometer and is reflected back from the third reference reflector 48R-3, back through the third reference delay optical fiber 3R of the reference optical fiber stretcher 13R, and back through the third fiber optic coupler 36-3, and into the second low coherence light detector 26-3. Similarly, a sample portion of the second low coherence light that is reflected off of the one or more optical interfaces of the object 42 at measurement location L-3 is coupled into the sample branch of the second low coherence interferometer, and is reflected back from the third sample reflector 48S-3, back through the third sample delay optical fiber 3S of the sample optical fiber stretcher 13S, and back through the third fiber optic coupler 36-3 and into the second low coherence light detector 26-3. The reference portion and the sample portion of the reflected second low coherence light are recombined at the third fiber optic coupler 36-3 where they interfere with each other. This interfering light is then incident on the second low coherence light detector 26-3 where the signal is amplified and processed. As described with reference to the first associated three optical fiber interferometer 30A shown in FIG. 3A, the pair of optical fiber stretchers, (reference optical fiber stretcher 13R and the sample optical fiber stretcher 13S having three optical fibers each) are operated in the push-pull mode in the first three fiber autocorrelator 50A shown in FIG. 5A. Constructive interference will occur at the second low coherence light detector 26-3 when the optical path lengths of the two arms of the interferometer are equal and when they differ by the distance between different optical interfaces in the object 42 at the measurement location L-3.

Figure 5B:
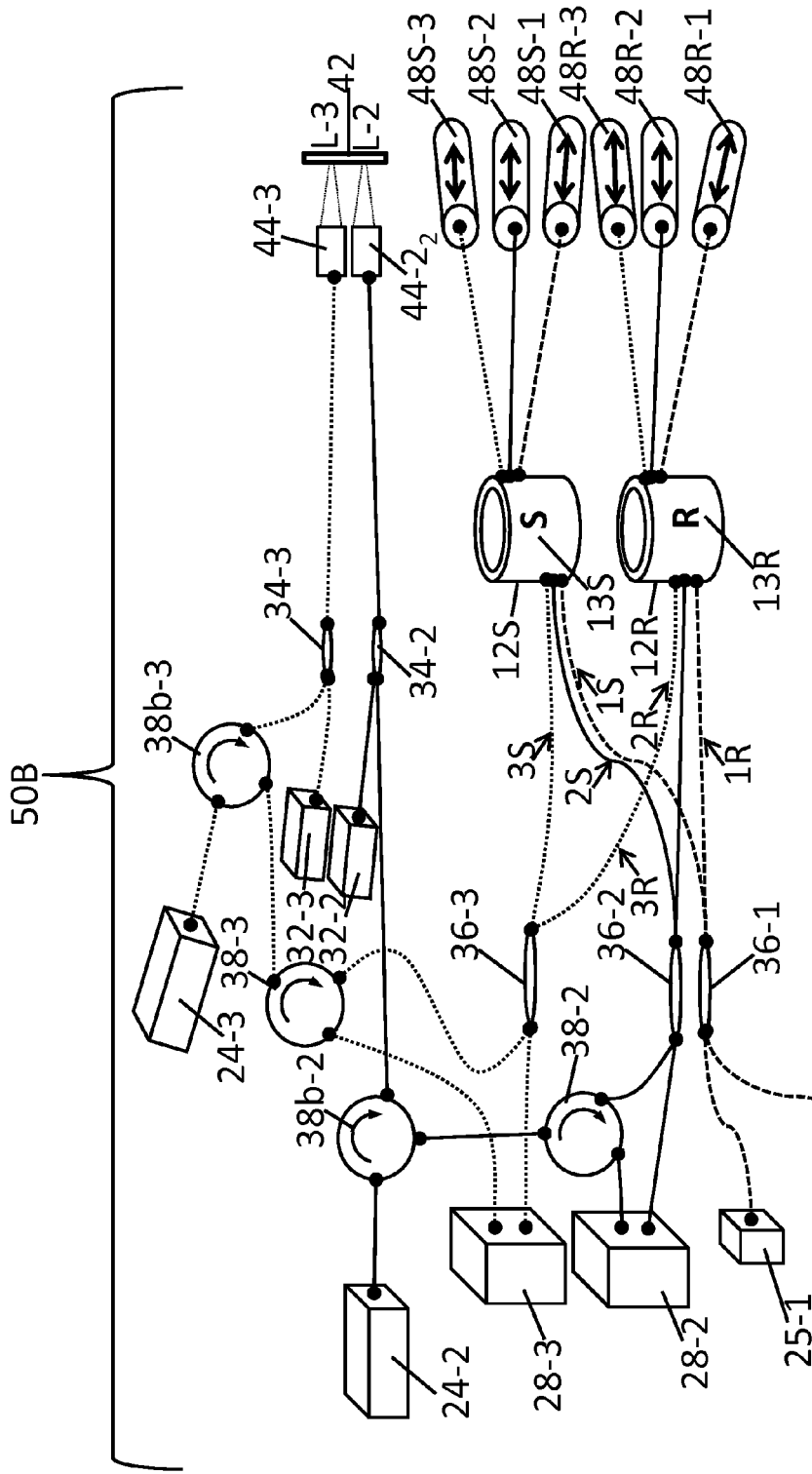
FIG. 5B shows a schematic of a second associated three optical fiber autocorrelator embodiment of the present invention.

FIG. 5B shows a schematic of a second associated three optical fiber autocorrelator 50B embodiment of the present invention. Most of the components in the second associated three optical fiber autocorrelator 50B are the same as in the first associated three optical fiber autocorrelator embodiment 50A shown in FIG. 5A, and all of the same components have the same functions. As in the second associated two optical fiber autocorrelator 40B, the first low coherence light detector 26-2 is a first balanced detector 28-2, and a first circulator 38-2 is placed between the first primary circulator 38b-2 and the second fiber optic coupler 36-2. The first port of the first circulator 38-2 is coupled to the third port of the first primary circulator 38b-2, which carries first low coherence light that is reflected off of one or more optical interfaces of the object at location L-2, the second port of circulator 38-2 is coupled to the input port of the second fiber optic coupler 36-2, and the third port of circulator 38-2 is coupled to one of the inputs of the first balanced detector 28-2. The other input of the first balanced detector 28-2 is coupled to the second fiber optic coupler 36-2, which receives combined interfering light being reflected from the second reference reflector 48R-2 and the second sample reflector 48S-2 as described which reference to the configuration shown in FIG. 5A. Also in the second three fiber autocorrelator 50B, the second low coherence light detector 26-3 is a second balanced detector 28-3, and a second circulator 38-3 is placed between the second primary circulator 38b-3 and the third fiber optic coupler 36-3. The first port of the circulator 38-3 is coupled to the third port of the second primary circulator 38b-3, which carries low coherence light that is reflected off of one or more optical interfaces of the object at location L-3, the second port of the second circulator 38-2 is coupled to the input port of the third fiber optic coupler 36-3, and the third port of the second circulator 38-3 is coupled to one of the inputs of the second balanced detector 28-3. The other input of the second balanced detector 28-3 is coupled to the third fiber optic coupler 36-3, which receives combined interfering light being reflected from the third reference reflector 48R-3 and the third sample reflector 48S-3, as described with reference to the configuration shown in FIG. 5A.

FIG. 6A and FIG. 6B show schematics of first and second associated three optical fiber hybrid interferometers 60A and 60B which combine a coherent standard mode Michelson interferometer with a standard mode low coherence Michelson interferometer and a low coherence autocorrelator interferometer using a pair of optical fiber stretchers having three fibers each, and being the reference optical fiber stretcher 13R and the sample optical fiber stretcher 13S. The first associated three optical fiber hybrid interferometer 60A includes a standard mode coherent light interferometer having parts labelled with suffix -1 with optical fibers having dashed lines, and a standard mode low coherence light interferometer having parts labelled with suffix -3 with optical fibers having dotted lines, which have the same components and function as the standard mode interferometers having suffixes -1 and -3 respectively shown in FIG. 3A. The first associated three optical fiber hybrid interferometer 60A also includes a low coherence light interferometer in the autocorrelator configuration having parts labeled with suffix -2 with optical fibers having solid lines, which has the same components and function as the low coherence light autocorrelator having suffix -2 shown in FIG. 5A. The second associated three optical fiber hybrid interferometer 60B also includes a standard mode coherent light interferometer having parts labelled with suffix -1 with optical fibers having dashed lines, and a standard mode low coherence light interferometer labelled with suffix -3 with optical fibers having dotted lines, which have the same components and function as the standard mode low coherence interferometer having suffix -2 shown in FIG. 3B. The second associated three optical fiber hybrid interferometer 60B also includes a low coherence light interferometer in the autocorrelator configuration labeled with suffix -2, which have the same components and function as the low coherence light autocorrelator having suffix -2 shown in FIG. 5B.

The hybrid interferometer offers the advantage that optical probes coupled to the autocorrelator probe do not have to be matched in path length to the path length of a reference arm. It is also to be understood that the autocorrelator in the hybrid interferometers shown in FIG. 6A and FIG. 6B may be located in any one of the three fiber interferometers with suffixes 1-3.

In FIG. 2A-FIG. 3B, the optional first wavelength division multiplexer 34-2 for combining optional first visible light from the optional first visible light source 32-2 with first low coherence light from low coherence light source 24-2 is shown as being on the input side of the second fiber optic coupler 36-2. Since the purpose of the first visible light source 32-2 is to provide a visible indicator on the object 42 at the measurement location L-2, the optional first wavelength division multiplexer 34-2 together with the first visible light source 32-2 being directly coupled to it may be instead placed at many other locations in the various multiple interferometer configurations. The other locations include: 1) between the second 2 by 2 fiber optic couplers 36-2 and first optical probe 44-2 (in FIG. 2A); 2) between the second 2 by 2 fiber optic couplers 36-2 and the sample optical fiber stretcher 10S or 13S (in FIG. 2B-FIG. 3B); or 3) between the sampled optical fiber stretcher 10S or 13S (in FIG. 2B-FIG. 3B) and the first optical probe 44-2. The same arguments can be made for the optional second wavelength division multiplexer 34-3 together with the second visible light source 32-2 as they may also be located at different locations along the second low coherence interferometer. In all cases, the purpose of the second visible light source 32-3 is to provide a visible indicator on the object 42 of the measurement location L-3.

Although FIG. 2A-FIG. 6B describe embodiments showing two and three associated interferometers that share either a common reference optical fiber stretcher or both common reference and common sample optical fiber stretchers which simultaneously vary the optical path length of light transmitted along the 2 or 3 optical fibers located in the reference branch or the reference branch and the sample branch of each of the two or three associated interferometers by the same amount, it is to be understood that there could be m associated optical fiber interferometers where m is an integer greater than 1. We call this configuration an associated m optical fiber interferometer apparatus.

Figure 7A:
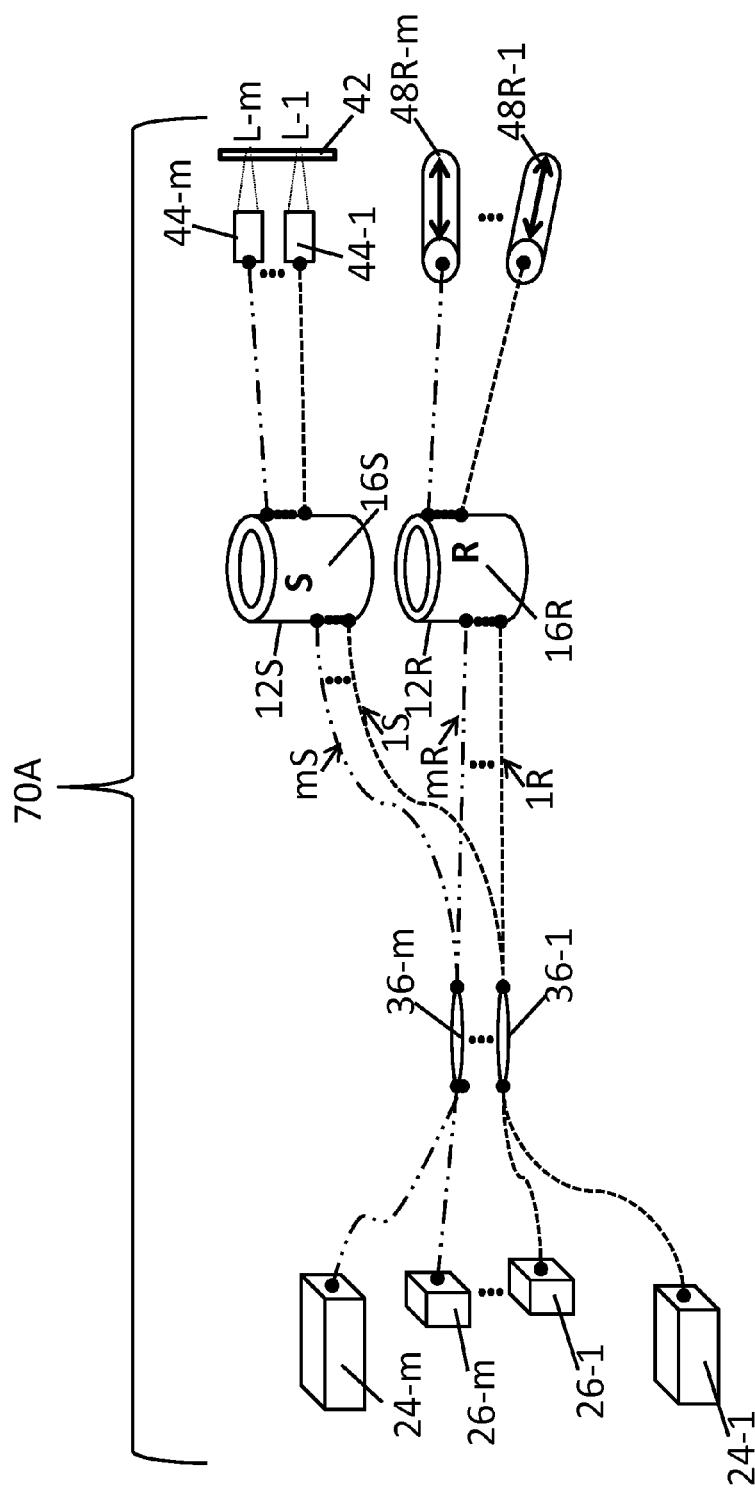
FIG. 7A shows a schematic of a first associated m optical fiber interferometer embodiment of the present invention.

FIG. 7A shows a first associated m optical fiber interferometer embodiment 70A of the present invention containing m associated standard mode fiber Michelson interferometers which include common reference and common sample optical fiber stretchers 16R and 16S respectively having m optical fibers each and reference and sample outer surfaces 12R and 12S with uniform reference and sample perimeters located in the reference and sample branches of the associated m optical fiber interferometer 70A respectively. The m reference delay optical fibers (1R . . . mR) in the reference optical fiber stretcher 16R and the m sample delay optical fibers (1S . . . mS) in the sample optical fiber stretcher 16S are wound together around their respective reference and sample outer surface 12R and 12S of their respective m reference and sample optical fiber stretchers 16R and 16S preferably in a single layer. The reference optical fiber stretcher 16R and the sample optical fiber stretcher 16S further comprise reference and sample actuators for temporally varying the reference and sample perimeters of the reference and sample optical fiber stretchers 16R and 16S respectively. During operation, the common reference optical fiber stretcher 16R varies the optical path length of light of the same wavelength transmitted along the m reference delay optical fibers by the same amount and the common sample optical fiber stretcher 16S varies the optical path length of light of the same wavelength transmitted along the m sample delay optical fibers by the same amount. In a preferred embodiment, the reference and sample optical fiber stretchers 16R and 16S are comprised of piezoelectric cylinders having the same perimeter which function as the respective reference and sample actuators. Also in this embodiment, the m reference delay optical fibers (1R . . . mR) are interleaved with each other as they are wound together around the reference outer surface of the reference optical fiber stretcher 16R in a single layer, and the m sample delay optical fibers (1S . . . mS) are interleaved with each other as they are wound together around the sample outer surface of the sample optical fiber stretcher 16S in a single layer. Also the lengths of all of the m reference delay optical fibers (1R . . . mR) which are interleaved and wound together around the reference outer surface of the reference optical fiber stretcher 16R and the lengths of the all of the m sample delay optical fibers (1S . . . mS) which are interleaved and wound together around the sample outer surface of the sample optical fiber stretcher 16S are preferably the same. It is also preferred that all adjacent interleaved reference delay optical fibers (1R . . . mR) and all adjacent interleaved sample delay optical fibers (1S . . . mS) are in contact with each other during winding around the reference and sample perimeters of the reference and delay optical fiber stretchers 16R and 16S respectively. It is also preferred that the reference optical fiber stretcher 16R and the sample optical fiber stretcher 16S operate in the push-pull mode as described above with respect to the discussion of FIG. 9.

The first associated m optical fiber interferometer embodiment 70A of the present invention shown in FIG. 7A shows only the components in the $1^{st}$ and $m^{th}$ interferometers shown having suffixes -1 and -m and delay optical fibers 1R, 1S, mR and mS. Each of the m associated interferometers also includes a light source (24-1 . . . 24-m) which provides light to a respective 2 by 2 fiber optic coupler (36-1 . . . 36-m). Each of the m fiber optic couplers (36-1 . . . 36-m) divides the light from the respective light source (24-1 . . . 24-m) into $m^{th}$ respective reference and sample light portions which propagate through the reference and sample branches of the $m^{th}$ respective Michelson interferometer. The m respective reference light portions are coupled into m respective reference delay optical fibers (1R . . . mR) wound around the reference optical fiber stretcher 16R, and the m respective sample light portions are coupled into m respective delay optical fibers (1S . . . mS) wound around the sample optical fiber stretcher 16S. As discussed above with reference to FIG. 2A-FIG. 6B, the fiber optic couplers (36-1 . . . 36-m) may have any splitting ratio but are preferable 50/50 couplers. In the reference branch of each of the respective m Michelson interferometers, a portion of the light transmitted along reference delay optical fibers (1R . . . mR) is incident on a respective reference reflector (48R-1 . . . 48R-m). The locations of reflectors (48R-1 . . . 48R-m) may be pre-adjusted and set up at a distance to match path lengths of the reference and sample branches of each of the m interferometers. A portion of the light reaching each of the respective reference reflectors (48R-1 . . . 48R-m) is reflected back through the respective reference delay optical fiber (1R . . . mR) of the m reference optical fiber stretcher 16R and then back through the respective fiber optic coupler (36-1 . . . 36-m) and is incident on a respective detector (26-1 . . . 26-m).

In the sample branch of each of the respective m Michelson interferometers of the first associated m optical fiber Interferometer embodiment 70A shown in FIG. 7A, a portion of the sample light portion transmitted through sample delay optical fibers (1S . . . mS) is incident on a respective optical probe (44-1 . . . 44-m) which focusses or collimates light on the object 42 at respective measurement locations (L-1 . . . L-m). A portion of the light from each of the respective light sources (24-1 . . . 24-m) reaching the object 42 at respective measurement locations (L-1 . . . L-m) is reflected back from each of the optical interfaces of the object 42 back through the respective optical probes (44-1 . . . 44-m), the respective delay optical fiber (1S . . . mS) of the m sample optical fiber stretcher 16S, and the respective fiber optic coupler (36-1 . . . 36-m), and is also incident onto the respective detector (26-1 . . . 26-m). Constructive interference will occur between the two branches of each of the respective interferometers when the path lengths of the reference R and sample S branches are the same and when they differ by an amount equal to distances between optical interfaces in the object 42 at each of the respective measurement locations (L-1 . . . L-m).

To summarize, each of the light sources (24-1 . . . 24-m) provide light to a corresponding fiber optic coupler which divides the light into reference and sample light portions, the reference light portion being coupled to the input ends of a distinct one of the m reference delay optical fibers of the reference optical fiber stretcher 16R, and the sample light portion being coupled to the input ends of the same distinct one of the m sample delay optical fibers of the sample optical fiber stretcher 16S. A reference reflector is coupled to the output end of each of the distinct m reference delay optical fibers of the reference optical fiber stretcher 16R, where a portion of the reference light portion is reflected back through the distinct one of the m reference delay optical fibers of the reference optical fiber stretcher, and back through the fiber optic coupler and into a detector. An optical probe is coupled to the output end of a distinct one of the m sample delay optical fibers; the optical probe focusses the sample light portion onto a measurement location of an object, a portion of the sample light portion being reflected back from one or more optical interfaces of the object 42, back through the optical probe, back through the distinct one of the m sample delay optical fibers, and back through the fiber optic coupler and into the detector where interference is observed.

The first associated m optical fiber interferometer shown in FIG. 7A does not explicitly include a coherent light interferometer which is shown as the interferometers with suffix -1 shown in FIG. 2A-FIG. 6B. Any of the light sources (24-1 . . . 24-*m*) shown in FIG. 7A may be a coherent or a low coherence light source. Usually only one coherent light source will be necessary to function with a built in real time calibration and the coherent light source may be coupled to any one of the m interferometers. Also the detectors (26-1 . . . 26-*m*) may be used to detect either coherent or low coherence light, and they are not distinguished in the schematic of FIG. 7A. If the $j^{th}$ interferometer where j is and integer and $1 \leq j \leq m$ has a coherent light source 24-*j* at its input, then detector 26-*j* would detect the coherent light and the $j^{th}$ interferometer would be used as the reference interferometer. In order to properly use the jth interferometer as a coherent light reference interferometer, the jth optical probe 44-*j* and the jth measurement location L-j would be replaced with a reflector 48S-j (not shown) in FIG. 7A.

Figure 7B:
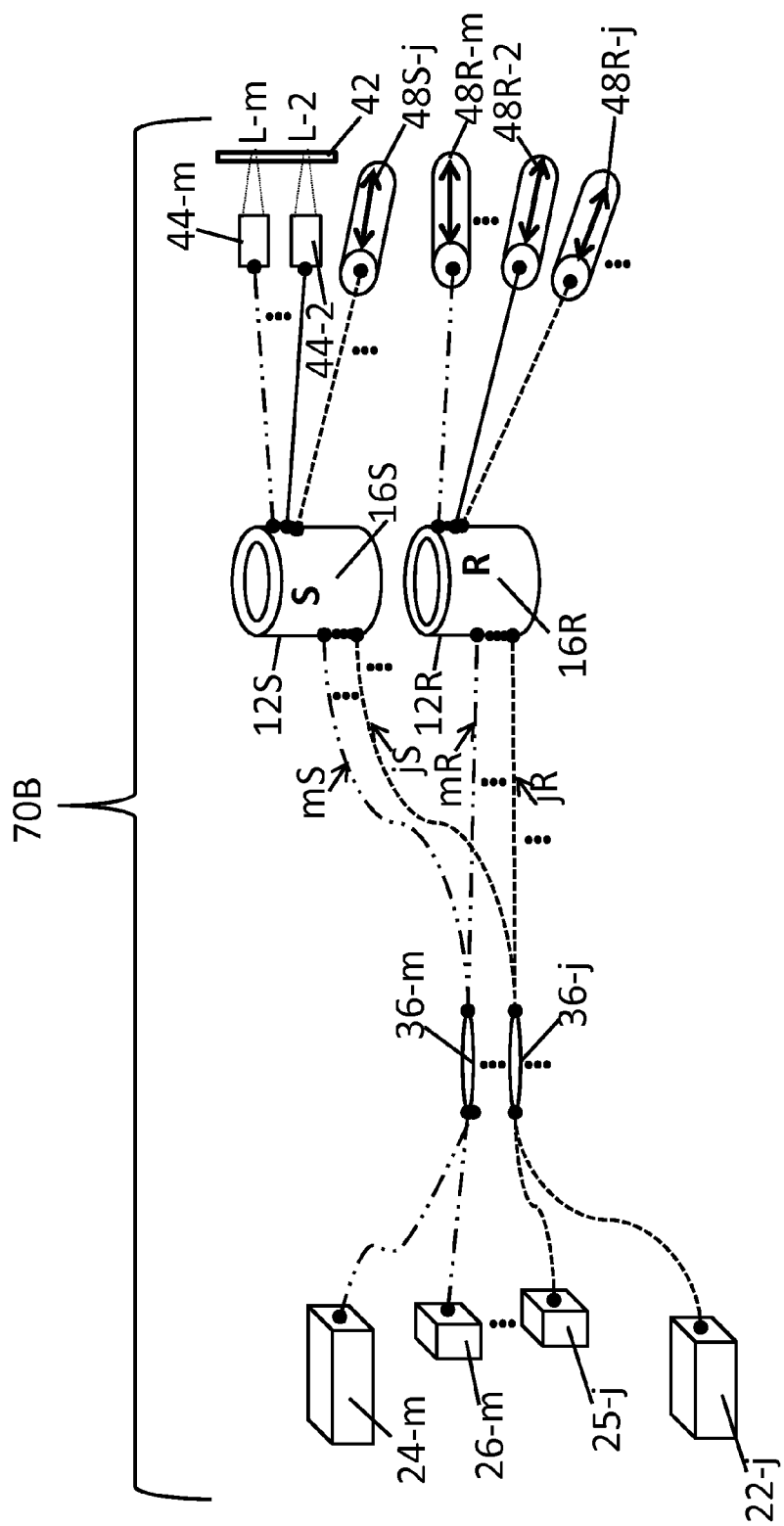
FIG. 7B shows a schematic of a second associated m optical fiber interferometer embodiment of the present invention.

An example of an associated m optical fiber interferometer incorporating a coherent light reference interferometer is shown in FIG. 7B. The second associated m coupled fiber interferometer 70B shown in FIG. 7B incorporates a coherent light interferometer which acts as a built in reference distance scale. Only the jth and mth interferometers are shown in FIG. 7B. The coherent light interferometer is shown as being the Michelson interferometer having the suffix -j, where j is an integer with $1 \leq j \leq m$. Comparing the second associated m optical fiber interferometer embodiment 70B to the first associated m optical fiber interferometer embodiment 70A, light source 24-*j* has been replaced by coherent light source 22-*j*, and detector 26-*j* has been replaced by coherent light detector 25-*j* in the input side of fiber optic coupler 36-*j*. In the sample branch, optical probe 44-*j* has been replaced by sample reflector 48S-j. With the exception of the jth light source, all the other m−1 light sources are preferably low coherence light sources as shown in the schematic shown in FIG. 7B.

In general in the associated m optical fiber interferometers, each of the light sources provide coherent or low coherence light to a corresponding fiber optic coupler which divides the provided coherent or low coherence light into reference and sample coherent or low coherence light portions, which are coupled into the input ends of the corresponding distinct one of the m reference delay and sample delay optical fibers of the reference and sample delay optical fiber stretchers respectively.

In the preferred configuration, the jth light source, where j is an integer with $1 \leq j \leq m$, is a coherent light source, and provides coherent light of wavelength $\lambda_c$ to the jth fiber optic coupler, where the coherent light is divided into reference and sample coherent light portions which are coupled to the input ends of the jth reference delay optical fiber and the jth sample delay optical fiber respectively. The remaining m−1 light sources are low coherence light sources providing low coherence light to the corresponding remaining m−1 fiber optic couplers which divide the low coherence light into m−1 reference and sample low coherence light portions being coupled to the input ends of the corresponding reference delay and sample delay optical fibers respectively. A sample reflector is also coupled to the output end of the jth sample delay optical fiber where a portion of the sample coherent light portion is reflected back through the jth sample delay optical fiber and back through the jth fiber optic coupler and into the jth detector. Also, an optical probe is coupled to the output ends of each of the remaining m−1 sample delay optical fibers. The optical probes focus the sample light portion onto a measurement location of the object, where a portion of the sample light portion being reflected back from the one or more optical interfaces of the object reflects back through the optical probe, back through the distinct one of the remaining m−1 sample delay optical fibers, and back through the fiber optic coupler and into the corresponding detector.

The apparatus 70B shown in FIG. 7B thus comprises m associated interferometers where m is an integer greater than 1 with each of the m associated interferometers having a reference branch and a sample branch. Each of the m associated interferometers further comprise a common reference optical fiber stretcher 16R comprising a reference outer surface 12R defining a reference perimeter, m reference delay optical fibers (1R . . . mR) wound around the reference outer surface 12R, and a reference actuator configured to temporally vary the perimeter of the reference outer surface 12R, and a common sample optical fiber stretcher 16S comprising a sample outer surface 12S defining a sample perimeter, m sample delay optical fibers (1S . . . mS) wound around the sample outer surface 12S, and a sample actuator configured to temporally vary the perimeter of the sample outer surface 23S. Each of the m associated interferometers also comprise a fiber optic coupler (36-1 . . . 36*m*) receiving coherent or low coherence light from a coherent or low coherence light source and transmitting a first portion of the coherent or low coherence light into an input end of a distinct one of the m reference delay optical fibers (1R . . . mR) and transmitting a second portion of the coherent or low coherence light into an input end of a distinct one of the m sample delay optical fibers (1S . . . mS); wherein the $j^{th}$ fiber optic coupler 36-*j*, where j is an integer with $1 \leq j \leq m$, receives coherent light of wavelength $\lambda_c$ from the coherent light source 22-*j* and transmits a first portion of the coherent light into an input end of the $j^{th}$ reference delay optical fiber jR and transmits a second portion of the coherent light into an input end of the $j^{th}$ sample delay optical fiber jS. The remaining m−1 fiber optic couplers receive low coherence light from a low coherence light source and transmit a first portion of the low coherence light into an input end of the corresponding remaining one of the m−1 reference delay optical fibers and transmit a second portion of the low coherence light into an input end of the corresponding remaining one of the m−1 sample delay optical fibers. A reference reflector (48R-1 . . . 48R-m) is coupled to the output end of each of the distinct one of the m reference delay optical fibers (1R . . . mR) which reflects coherent or low coherence light back through the distinct one of the m reference delay optical fibers (1R . . . mR) and back through the corresponding distinct one of the m fiber optic couplers (36-1 . . . 36-*m*) and into a corresponding detector. A sample reflector 48R-j is also coupled to the output end of the $j^{th}$ sample delay optical fiber jR which reflects coherent light back through the $j^{th}$ sample delay optical fiber jS and back through the $j^{th}$ fiber optic coupler 36-*j* and into the $j^{th}$ detector 25-*j*. An optical probe is also coupled to the output end of each of the distinct one of the remaining m−1 sample delay optical fibers, and configured to transmit low coherence light to a location on an object 42 comprising at least one optical interface, and receive low coherence light reflected back from the at least one optical interface, and transmit the reflected low coherence light back through the optical probe, back through the distinct one of the remaining m−1 sample delay optical fibers, and back through the corresponding distinct one of the m−1 fiber optic couplers and into the corresponding detector.

We now consider the case of the m associated optical fiber interferometer shown FIG. 7B where m=4 and j=2 as an example. In this example, the common reference optical fiber stretcher 16R has four reference delay optical fibers (1R, 2R, 3R and 4R) wound around its reference outer surface 12R. The common sample optical fiber stretcher 16S has four sample delay optical fibers (1S, 2S, 3S and 4S) wound around its sample outer surface 12S. Fiber optic couplers 36-1, 36-3, and 36-4 receive low coherence light from corresponding low coherence light sources 24-1, 24-3, and 24-4 respectively, and fiber optic coupler 36-2 receives coherent light form coherent light source 22-2. Fiber optic coupler 36-2 transmits a first portion of the coherent light into the input end of reference delay optical fiber 2R and a second portion of the coherent light into the input end of sample delay optical fiber 2S. The fiber optic couplers 26-1, 26-3, and 26-4 transmit a first portion of the low coherence light into the input end of reference delay optical fibers 1R, 3R, and 4R respectively, and transmit a second portion of the low coherence light into the input end of sampled delay optical fibers 1S, 3S, and 4S respectively. Reference reflectors 48R-1, 48R-2, 48R-3, and 48R-4 are coupled to the output ends of reference delay optical fibers 1R, 2R, 3R, and 4R respectively. A sample reflector 48S-2 is coupled to the output end of sample delay optical fiber 2S, which reflect coherent light back through sample delay optical fiber 2S and back through fiber optic coupler 36-2 and into detector 25-2. Optical probes 44-1, 44-3, and 44-4 are coupled to the output end of sample delay optical fibers 1S, 3S, and 4S respectively. Low coherence light is transmitted through optical probes 44-1, 44-3, and 44-4, and is incident on measurement locations L-1, L-3, and L-4 on the object 42 and reflected back into optical probes 44-1, 44-3, and 44-4 respectively, back through sample delay optical fibers 1S, 3S, and 4S respectively, and back through fiber optic couplers 36-1, 36-3, and 36-4 respectively, and into corresponding detectors 24-1, 24-3 and 24-4 respectively.

The associated m optical fiber interferometer configurations shown in FIGS. 7A-7B show configurations that have a matched pair of optical fiber stretchers 16R and 16S having m optical fibers each in the reference and sample branches respectively of each of the associated m optical fiber interferometers which preferably operate in a push-pull mode. An associated m optical fiber interferometer may also be constructed having only one common optical fiber stretcher having m optical fibers located in the reference branch of each of the m independent interferometers similar in structure to the first associated two optical fiber interferometer 20A shown in FIG. 2A. As in the case of the first associated two optical fiber interferometer 20A, the path lengths of all the fibers in the sample branch 16S are required to be closely matched to the path lengths of the fibers in each of the respective reference branches. This could be practical if the object needs to be located a long distance away from the instrument. It is also to be understood that m associated optical fiber autocorrelators may be constructed having structures similar to the associated two and three optical fiber autocorrelators that are shown in FIG. 4A to FIG. 5B. Associated m hybrid optical fiber interferometers may also be constructed with m coupled interferometers similar to those in FIG. 6A-FIG. 6B.

Other components may be added to the m coupled fiber optic interferometers 70A and 70B shown in FIG. 7A and FIG. 7B respectively. Optional visible light sources and optional wavelength division multiplexers may be added as described with respect to FIG. 2A-FIG. 6B to provide a visible indicator on the object at each measurement location. Also, circulators may be added to any of the interferometers and the respective detectors may be respective balanced detectors as described above.

Additionally, multiple interferometers may share the same light source. In order to have n interferometers share the same light source, a 1 by n optical coupler would be used to couple a light from the light source into the input puts of the n fiber optic couplers. All of the interferometers may use the same center wavelength low coherence light sources, or the light sources may be all different center wavelengths or a combination of the two. The optical probes could be mounted together in a line, grid, or circle, or be separate from each other at various locations of the object. This could be useful on a film production line to be able to measure the film thickness at different downstream locations in the machine simultaneously. Different optical probes may be set up to simultaneously measure the object at the same location, one probe measuring from the front side, and one optical probe measuring from the back side of the object.

In some applications where ultimate accuracy is not required, it may not be necessary to have a built in coherent light interferometer to provide a built in distance scale using the $j^{th}$ interferometer of the first m coupled fiber interferometer 70A for calibrating the scanning distance of each of the respective m interferometers in real time. In these cases, an external calibration, a previous calibration, or extra reference reflections built into the optical probe may be sufficient.

An example alternative to supplying a coherent interferometer as a built in reference scale is to focus one of the optical probes (44-1 . . . 44-m) onto a known calibration sample instead of the object. The calibration sample, also called a reference test object, is preferably a sample with multiple optical interfaces and known constant optical distances between each of its optical interfaces. FIG. 8A shows an example reference test object 72 which could be used as the calibration sample in an m coupled fiber interferometer as shown in FIG. 7A. The example reference test object 72 is comprised of four optical flat plates 75 having fixed air gaps 78 between them. In order to ensure that the gaps and optical thicknesses of the individual layers remain constant, the reference test object 72 is preferably placed in an isothermal environment. When using the reference test object 72 as a real time interferometer calibration, the $j^{th}$ optical probe 44-$j$, where $1 \leq j \leq m$, of the first associated m optical fiber interferometer shown in FIG. 7A would be collimated or focused onto the reference test object 72 instead of measurement location L-$j$ on the object. Low coherence light that passes through the optical probe 44-$j$ is reflected off of each of the front and back surfaces of the optical flat plates 75 which are called reference surfaces 81$r$ . . . 88$r$ in order from left to right respectively.

Figure 8B:
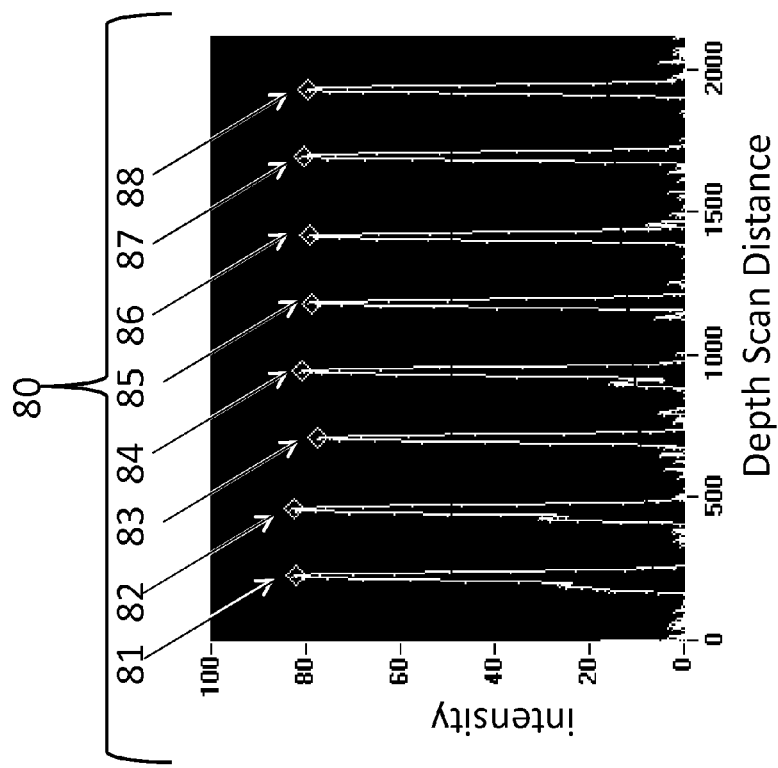
FIG. 8B shows an interferometer depth scan of the reference test object shown in FIG. 8A.
Figure 8A:
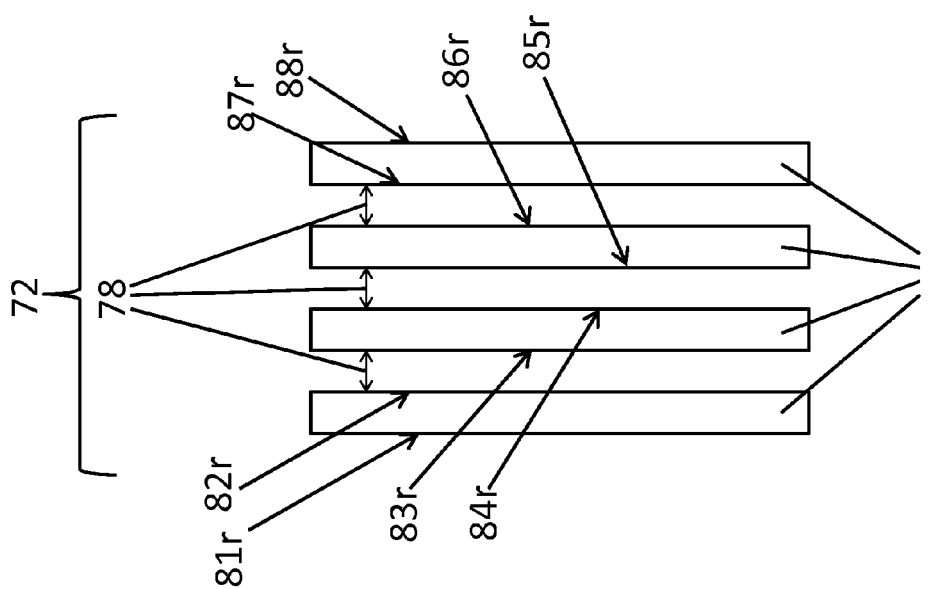
FIG. 8A shows an example reference test object which could be used for calibration of associated m optical fiber interferometers.

FIG. 8B. shows an interferogram 80 of a measured signal that would be obtained from the jth detector 26-$j$ in the $j^{th}$ interferometer of the reference test object 72 shown in FIG. 8A during operation of the coupled interferometers. The x axis (horizontal axis) shows the depth scan distance in units of microns. The y axis shows the log intensity of the interference signal detected by the jth detector in relative units. Constructive interference occurs between the two branches of the $j^{th}$ interferometer when the path lengths of the two branches of the $j^{th}$ interferometer are the same and when they differ by an amount equal to distances between optical interfaces in the reference test object 72. Constructive interference occurs at the measured locations called $1^{st}$ . . . $8^{th}$ reference peaks 81 . . . 88 in FIG. 8B, which correspond to the locations of the $1^{st}$ . . . $8^{th}$ reference peaks 81$r$ . . . 88$r$ shown in FIG. 8A. Time based sampling would be utilized in this case and a calibration curve of distance versus time may be obtained from the measured locations of the reference test object 72.

Figure 13:
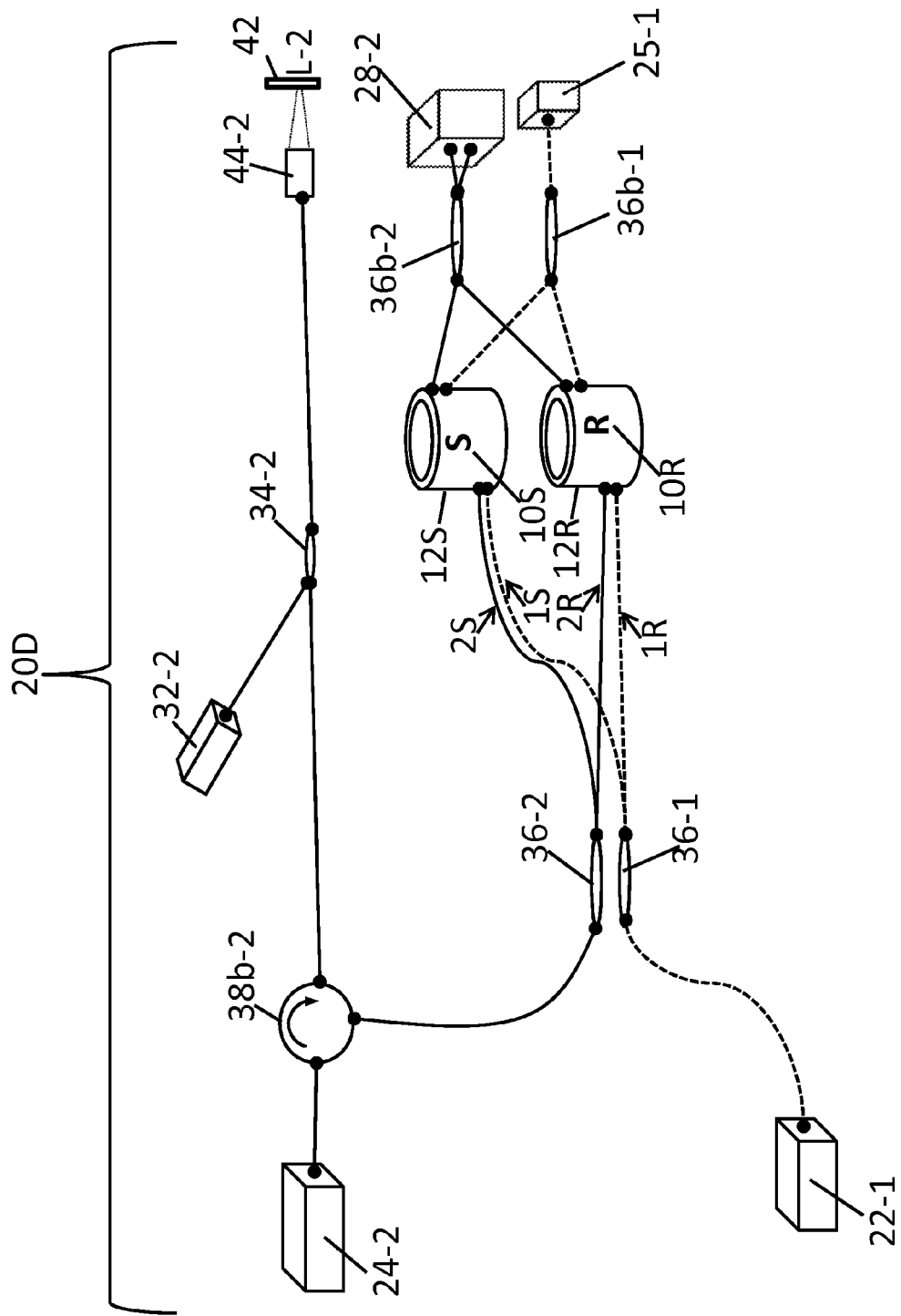
FIG. 13 shows a schematic of an alternate embodiment of an associated two optical fiber interferometer embodiment of the present invention.

The associated interferometer embodiments shown in FIG. 2A-FIG. 7B which share one or two common optical fiber stretching elements are all shown as Michelson interferometer configurations. Other interferometer configurations are possible and FIG. 13 shows an example showing an alternative associated two optical fiber interferometer 20D in a Mach-Zehnder configuration. Most of the components are the same as that shown in FIG. 4B and components sharing the same numbers are the same as in FIG. 4B and have the same function. In the Mach-Zehnder configuration, light only is transmitted through the reference and sample delay optical fibers of the respective reference and sample optical fiber stretchers 10R and 10S once, and the reflectors 48R-1, 48S-1, 48R-2 and 48S-2 shown in FIG. 4B are replaced with optical fiber couplers 36b-1 and 36b-2, which recombine the light transmitted along reference delay optical fibers 1R, 1S, 2R, and 2S to cause interference. As described above, the respective reference and sample optical fiber stretchers 10R and 10S simultaneously vary the optical path length of light of the same wavelength transmitted along the first reference and second reference delay optical fibers 1R and 2R by the same amount and the optical path length of light of the same wavelength transmitted along the first sample and second sample delay optical fibers 1S and 2S by the same amount. The reference and sample optical fiber stretchers also have uniform reference and sample outer surfaces which define reference and sample perimeters and are constructed the same way as described above with reference to the earlier Figures.

The details of the alternative Mach Zehnder associated two optical fiber interferometer 20D shown in FIG. 13 are described below. Interferometer 20D is a dual interferometer comprised of a coherent light interferometer, the components of which having suffix 1, coupled together with a low coherence light interferometer in an autocorrelation mode, the components of which having suffix 2. In the coherent light interferometer, coherent light of wavelength $\lambda_c$ from coherent light source 22-1 is coupled into fiber optic coupler 36-1, which divides the coherent light into reference and sample coherent light portions transmitted along the first reference delay fiber 1R and the sample delay fiber 1S, which are wound around the reference and sample optical fiber stretchers 10R and 10S respectively. After passing through the reference and sample optical fiber stretchers 10R and 10S, the reference and sample coherent light portions transmitted along first reference delay fiber 1R and first sample delay fiber 1S are recombined as they pass through first output fiber optic coupler 36b-1. This recombined interfering coherent light is input into coherent light detector 25-1. First low coherence light of center wavelength $\lambda_1$ from first low coherence light source 24-2 is input into the first port of a first primary circulator 38b-2, and is transmitted through the second port of the first primary circulator 38b-2, and is coupled into a first optical probe 44-2 and focused onto a first measurement location L-2 of an object 42. A portion of the first low coherence light is reflected back from one or more optical interfaces of the object 42 and back through the first optical probe 44-2, back through the second port of the primary circulator 38b-2, and through its third port into a second fiber optic coupler 36-2, where it is divided into first reference and first sample low coherence light portions. The first reference and the first sample low coherence light portions are coupled to the input ends of the second reference delay optical fiber 2R and the second sample delay optical fiber 2S, which are wound around the reference and sample optical fiber stretchers 10R and 10S respectively. After passing through the reference and sample optical fiber stretchers 10R and 10S, the reference and sample low coherence light portions transmitted along second reference delay fiber 2R and second sample delay fiber 2S are recombined as they pass through second output fiber optic coupler 36b-2. This recombined interfering light is input into a low coherence light detector shown as a first balanced detector 28-2. In the first balanced detector 28-2, the two output branches of second output fiber optic coupler 36b-2 are connected to the two inputs of the first balanced detector 28-2. First balanced detector 28-2 may be a standard first low coherence light detector 26-2 which uses only one of the output optical fibers of second output fiber optic coupler 36b-2. As with the Michelson interferometer configurations, it is preferred that the reference and sample optical fiber stretchers are operated in the push pull mode.

Although FIG. 13 is shown as having two optical fiber coupled interferometers it is to be understood that there could be three, four, or in general m coupled interferometers, with all of the low coherence interferometers being configured as autocorrelators input into Mach-Zehnder interferometers such as that shown as suffix 2 in FIG. 13. Each of the m coupled Mach-Zehnder interferometers would share common reference and sample fiber optic stretchers.

Figure 10:
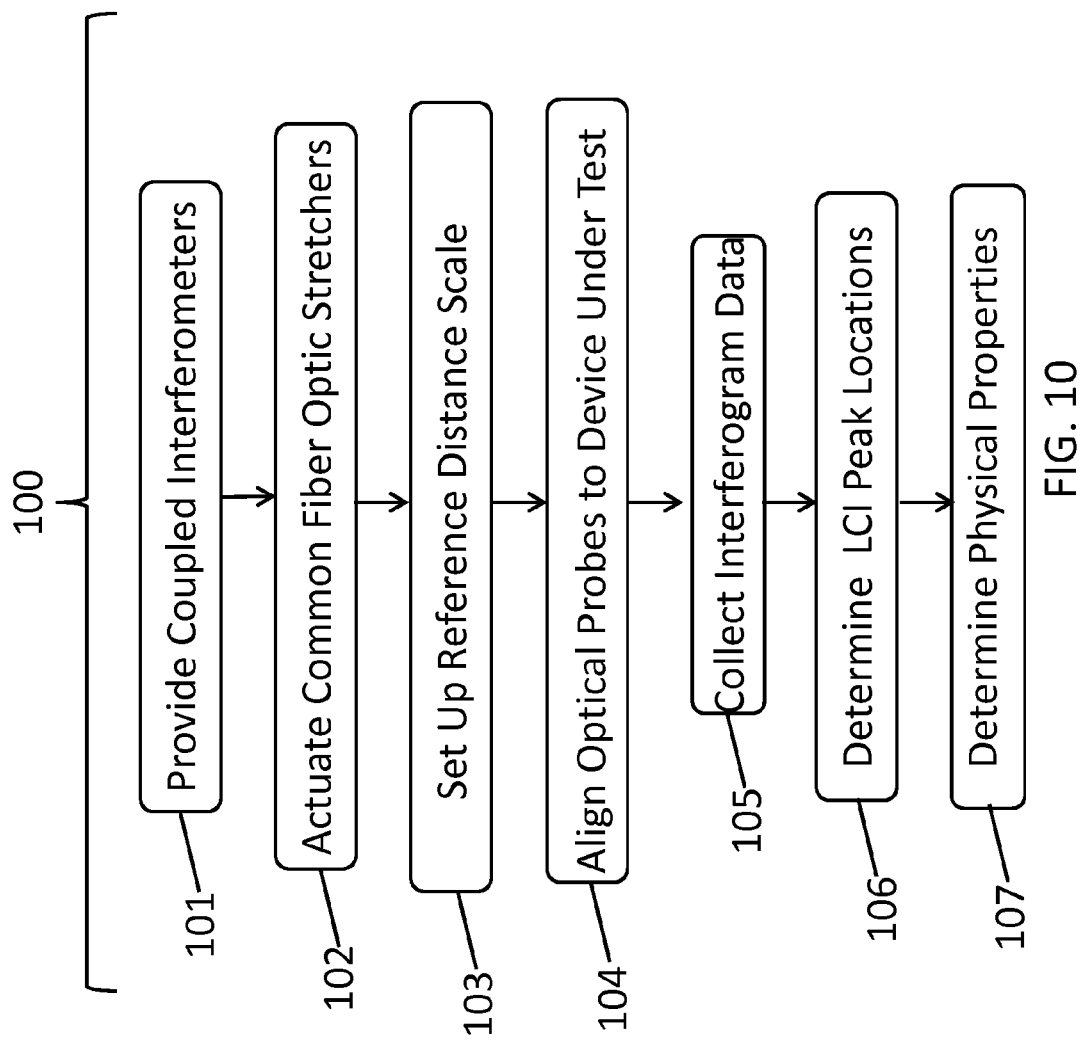
FIG. 10 shows a flow chart detailing the steps used for measuring a physical property of an object according to an embodiment of the present invention.

The present invention also includes methods of utilizing the various apparatuses described in the Figures. FIG. 10 shows a flow chart depicting methods 100 of measuring one or more physical properties of an object using apparatuses of the present invention. The first step 101 may be to provide at least two coupled optical fiber interferometers which share a common reference optical fiber stretcher in the reference branches of the coupled fiber optic interferometers, and also share a common sample optical fiber stretcher in the sample branches of the coupled fiber optic interferometers as described with reference to the embodiments shown in FIG. 2B-FIG. 7B. The common reference optical fiber stretcher has a reference outer surface defining a uniform reference perimeter with at least two reference delay optical fibers wound together around its reference outer surface in a single layer and also comprises a reference actuator for temporally varying its reference perimeter. The common sample optical fiber stretcher has a sample outer surface defining a uniform sample perimeter and at least two sample delay optical fibers wound together around its sample outer surface in a single layer and also comprises a sample actuator for temporally varying its sample perimeter. In the preferred embodiment, each of the reference delay optical fibers are interleaved with each other as they are wound together around the reference outer surface of the reference optical fiber stretcher in a single layer, and each of the sample delay optical fibers are interleaved with each other as they are wound together around the sample outer surface of the sample optical fiber stretcher in a single layer. Also, the lengths of the reference delay optical fibers which are interleaved and wound together around the reference outer surface of the reference optical fiber stretcher and the lengths of the sample delay optical fibers being interleaved and wound together around the sample outer surface of the sample optical fiber stretcher are preferably the same. The two or more coupled fiber optic interferometers may be in either the standard Michelson configuration, autocorrelator configuration or hybrid configuration as described with reference to FIG. 2B-7B. Alternatively, the common sample optical fiber stretcher may be replaced with optical fibers of the equivalent length of those in the common reference optical fiber stretcher as shown in the embodiment shown in FIG. 2A.

In Step 101 coherent light of wavelength $\lambda_c$ from a coherent light source is optionally provided to a provided first fiber optic coupler which divides the optional coherent light into reference and sample coherent light portions. The reference and sample coherent light portions are coupled to the input ends of the first reference delay optical fiber and the first sample delay optical fiber respectively.

In Step 101, first low coherence light of center wavelength $\lambda_1$ is also provided from a first low coherence light source to a second fiber optic coupler which divides the first low coherence light into first reference and first sample low coherence light portions. The first reference and first sample low coherence light portions are coupled to the input ends of the second reference delay optical fiber and the second sample delay optical fiber respectively. A second reference reflector coupled to the output end of the second reference delay optical fiber is also provided in Step 101. A portion of the first reference low coherence light portion reaching the second reference reflector is reflected back through the second reference delay optical fiber and back through the second fiber optic coupler into a first low coherence light detector. A first optical probe is also provided which is coupled to the output end of the second sample delay optical fiber.

In Step 102, the reference actuator of the reference optical fiber stretcher and the sample actuator of the sample optical fiber stretcher are continually actuated with periodic reference and sample waveforms respectively having the same period. The periodic reference waveform applied to the reference actuator causes the optical path length of light of the same wavelength transmitted along the first reference delay optical fiber and the second reference delay optical fiber to simultaneously vary by the same amount with the period of the reference waveform, while the periodic sample waveform applied to the sample actuator causes the optical path length of light of the same wavelength transmitted along the first sample delay optical fiber and the second sample delay optical fiber to simultaneously vary by the same amount with the same period. It is preferred that the periodic reference and sample waveforms are out of phase with each other so that a periodic optical path difference is produced between the reference and sample branches of the two or more coupled fiber optic interferometers. It is further preferred that the periodic optical path delay between the reference and sample branches of the two or more coupled fiber optic interferometers varies by a distance sufficient to determine one or more physical properties of the object. The preferred embodiment uses the push-pull mode of operation as shown in FIG. 9. When operating in the push-pull mode, the relative optical delay between the sample and reference branches of the interferometer is alternately monotonically increased and monotonically decreased over the distance sufficient to determine the one of more physical properties of the object. Also, the sample branch is monotonically increasing in optical path while the reference branch is decreasing in optical path and vice versa.

In Step 103, the reference distance scale is set up. In the preferred embodiment, one of the coupled fiber interferometers set up during Step 101 provides coherent light of wavelength $\lambda_c$ from a coherent light source to a first fiber optic couple where the coherent light is divided into reference and sample coherent light portions. The reference and sample coherent light portions are coupled to the input ends of a first reference delay optical fiber and a first sample delay optical fiber respectively. First reference and first sample reflectors are also provided which are coupled to the output ends of the first reference delay and first sample delay optical fibers respectively. The first reference reflector reflects a portion of the reference coherent light portion back through the first reference delay optical fiber and back through the first fiber optic coupler into a provided coherent light detector, and the first sample reflector reflects a portion of the sample coherent light portion back through the first sample delay optical fiber, and back through the first fiber optic coupler, and into the coherent light detector, and the coherent light interference signal is detected. Since the wavelength of the coherent light source is a constant, the coherent light interference signal may be used as a precise distance scale.

Figure 11:
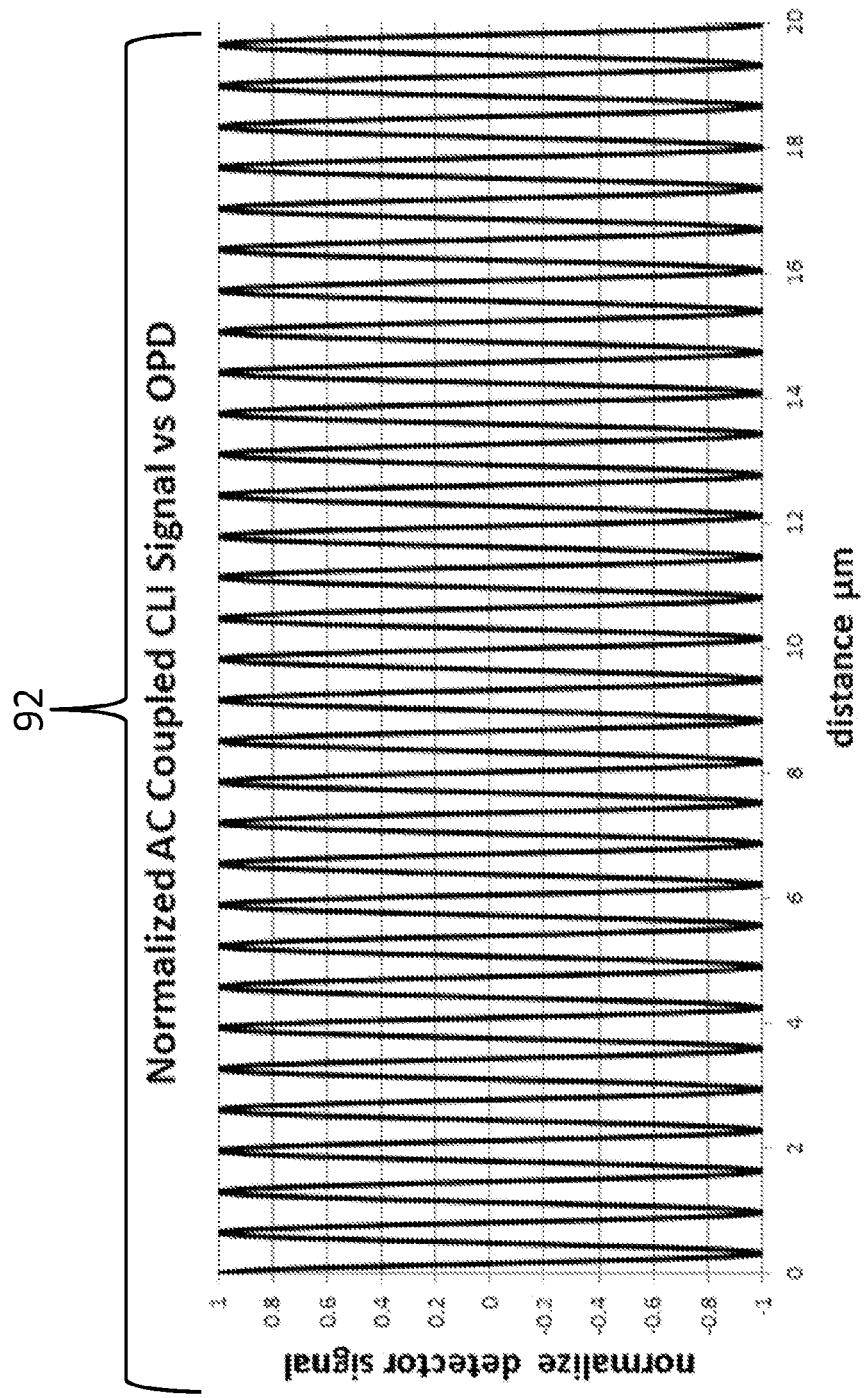
FIG. 11 shows an example coherent light interference signal for a 1310 nm laser diode.

FIG. 11 shows an example coherent light interferogram 92 for a 1310 nm laser diode as a function of delay in microns. The observed signal is sinusoidal with a constant period as a function of scan distance and will remain sinusoidal over the coherence length of the laser which is many millimeters or meters in path length difference. The interferogram 92 shown in FIG. 11 has a period of 655 nm ($\lambda c/2$) and zero crossings occur every 327.5 nm ($\lambda c/4$). The coherent light interferometer signal may be used to trigger data acquisition of the low coherence light interferometer signal at constant distance intervals. Usually the zero crossings or a subset of the zero crossings are used for this purpose.

In Step 104, one or more optical probes are set up, focused, and aligned with an object so that interferometric signals from each of the optical interfaces in the object may be observed. The first optical probe carrying the first sample low coherence light portion is focused and aligned onto a first measurement location of the object. A portion of the first sample low coherence light portion is reflected back from one or more optical interfaces of the object, back through the first optical probe, back through the second sample delay optical fiber, and back through the second fiber optic coupler and into the first low coherence light detector. The optical probe is aligned by observing the intensity of the peaks in the low coherence light interference signal (see FIG. 12) and adjusting the orientation of the optical probe so that the intensity of the peaks in the interference signal is a maximum.

Figure 12:
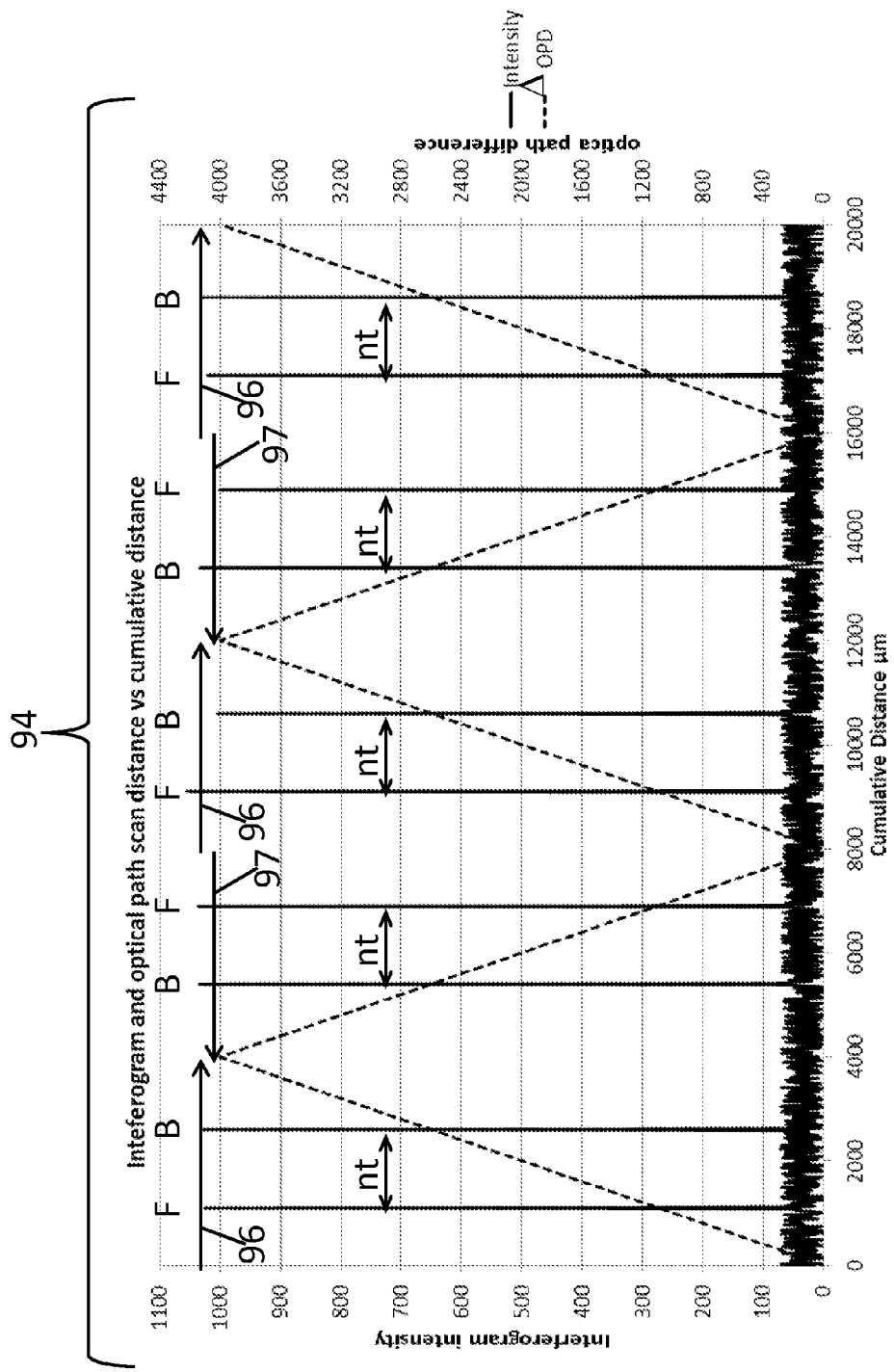
FIG. 12 shows an interferogram for an object along with the optical path difference between the two branches of the interferometer as a function of cumulative scan distance.

FIG. 12 shows an example interferogram 94 for an object (solid line) along with the optical path difference between the two branches of the interferometer (dashed line) as a function of cumulative scan distance. In this case a standard 1 mm thick microscope slide having an index of refraction n=1.5 is the object. FIG. 12 also shows the optical path difference between the two branches of the interferometer as a function of cumulative scan distance. The directional arrows 96 and 97 at the top of the Figure indicate the depth scan direction. Arrow 96 indicates the forward depth scan direction in which the scan direction is from the front to the back of the object, and arrow 97 indicates the reverse scan direction in which the scan direction is from the back to the front of the object. The scan distance for the case shown in the interferogram 94 in FIG. 12 is 4000 µm. The interferogram peaks indicative of the front and back surface of the microscope slide are labelled F and B respectively in FIG. 12. The interferogram shown is that for the first low coherence light detector after being processed by a demodulating log amplifier. The measured distances between the front F and back B surfaces of the object is indicated by the bidirectional arrows labelled nt in FIG. 12. Data for five successive scans are shown.

In Step 105, the coherent light and low coherence light interferograms are collected by the coherent light detector and the first low coherence light detector. In preferred embodiments, the coherent light interferometer data is used to trigger data acquisition of the low coherence light detector signal as described above. The data is obtained continuously and may be stored in a computer memory or processed in real time.

In Step 106, the interferogram peak locations are determined with respect to scan distance and sorted into bins defining which surface of the object that they arise from. Interpolation algorithms may be applied to the peaks to determine the exact center of the peak location as a function of scan distance. The forward and reverse scan directions may also be sorted to correct the ordering of the peaks.

In step 107, one or more physical properties of the object are determined. In the case of the glass microscope slide data shown in FIG. 12, the optical thickness nt of the glass microscope slide may be directly determined by the difference between the distances between the sets of peaks F and B respectively indicating the front and back optical surfaces of the sample. Five successive measurements of the optical thickness nt are shown in FIG. 12 as indicated by the distance between the double arrow regions labelled nt.

Other examples of physical properties of an object that may be measured include optical distances between adjacent layers of the object, distance from a reference surface to a surface of the object, index of refraction, and physical thickness. Environmental and spatial dependent properties may also be determined by ramping one parameter or scanning over the surface of the object during measurement. As an example, the temperature coefficient of index of refraction and the thermal coefficient of expansion may be measured by varying the temperature together with the interferometer measurements.

The invention has been described in detail with particular reference to certain example embodiments thereof, but it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

PARTS LIST

L-1 Measurement Location
L-2 Measurement Location
L-3 Measurement Location
L-m Measurement Location
mR $m^{th}$ Reference Delay Optical Fiber
mS $m^{th}$ Sample Delay Optical Fiber
R Reference Branch
S Sample Branch
First Delay Optical Fiber
1R First Reference Delay Optical Fiber
1S First Sample Delay Optical Fiber
1S-P First Sample Path Matching Optical Fiber
1 Second Delay Optical Fiber
2R Second Reference Delay Optical Fiber
2S Second Sample Delay Optical Fiber
2S-P Second Sample Path Matching Optical Fiber
2 Third Delay Optical Fiber
3R Third Reference Delay Optical Fiber
3Sa Third Sample Delay Optical Fiber
4 Fourth Delay Optical Fiber
5 Piezoelectric Cylinder
6 Piezoelectric Cylinder Outer Surface
7 Piezoelectric Cylinder Inner Surface
10 Optical Fiber Stretcher
10R Reference Optical Fiber Stretcher
10S Sample Optical Fiber Stretcher
12R Reference Outer Surface
12S Sample Outer Surface
13 Optical Fiber Stretcher
13R Reference Optical Fiber Stretcher
13S Sample Optical Fiber Stretcher
14 Optical Fiber Stretcher
16R Reference Optical Fiber Stretcher
16S Sample Optical Fiber Stretcher
20A Associated Two Optical Fiber Interferometer
20B Associated Two Optical Fiber Interferometer
20C Associated Two Optical Fiber Interferometer
20D Alternative Associated Two Optical Fiber Interferometer
22-1 Coherent Light Source
24-1 Light Source
24-2 Light Source
24-3 Light Source
24-m Light Source
25-1 Coherent Light Detector
26-1 Detector
26-2 Detector
26-3 Detector
26-m Detector
28-2 First Balanced Detector
28-3 Second Balanced Detector
30A Associated Three Optical Fiber Interferometer
30B Associated Three Optical Fiber Interferometer
32-2 First Visible Light Source
32-3 Second Visible Light Source
34-2 First Wavelength Division Multiplexer
34-3 Second Wavelength Division Multiplexer
36-1 First Fiber Optic Coupler
36-2 Second Fiber Optic Coupler
36-3 Third Fiber Optic Coupler
36-m mth Fiber Optic Coupler
36*b*-1 First Output Fiber Optic Coupler
36*b*-2 Second Output Fiber Optic Coupler
38-2 First Circulator
38-3 Second Circulator
38*b*-2 First Primary Circulator
38*b*-3 Second Primary Circulator
40A Associated Two Optical Fiber Autocorrelator
40B Associated Two Optical Fiber Autocorrelator
42 Object
44-1 Optical Probe
44-2 Optical Probe
44-3 Optical Probe
44-m Optical Probe
48R-1 First Reference Reflector
48R-2 Second Reference Reflector
48R-3 Third Reference Reflector
48R-m mth Reference Reflector
48S-1 First Sample Reflector
48S-2 Second Sample Reflector
48S-3 Third Sample Reflector
50A Associated Three Optical Fiber Autocorrelator
50B Associated Three Optical Fiber Autocorrelator
60A Associated Three Optical Fiber Hybrid Interferometer
60B Associated Three Optical Fiber Hybrid Interferometer 70A Associated m Optical Fiber Interferometer
70B Associated m Optical Fiber Interferometer
72 Reference Test Object
75 Optical Flat Plate
78 Air Gap
80 Reference Test Object Interferogram
81 $1^{st}$ Reference Peak
81r $1^{st}$ Reference Surface
82 $2^{nd}$ Reference Peak
82r $2^{nd}$ Reference Surface
83 $3^{rd}$ Reference Peak
83r $3^{rd}$ Reference Surface
84 $4^{th}$ Reference Peak
84r $4^{th}$ Reference Surface
85 $5^{th}$ Reference Peak
85r $5^{th}$ Reference Surface
86 6th Reference Peak
86r $6^{th}$ Reference Surface
87 7th Reference Peak
87r $7^{th}$ Reference Surface
88 $8^{th}$ Reference Peak
88r $8^{th}$ Reference Surface
90 Actuator Voltage Versus Time Graph
92 Coherent Light Interferogram
94 Device Under Test Interferogram
96 Forward Depth Scan
97 Reverse Depth Scan
100 Flow Chart
101 Step
102 Step
103 Step
104 Step
105 Step
106 Step
107 Step

We claim:

1. An interferometer apparatus comprising:
   a) an a reference optical fiber stretcher comprising a reference outer surface defining a reference perimeter, first and second reference delay optical fibers wound around the reference outer surface, and a reference actuator configured to temporally vary the reference perimeter of the reference outer surface;
   b) a sample optical fiber stretcher comprising a sample outer surface defining a sample perimeter, first and second sample delay optical fibers wound around the sample outer surface, and a sample actuator configured to temporally vary the sample perimeter of the sample outer surface;
   c) a first fiber optic coupler receiving coherent light of wavelength $\lambda_c$ from a coherent light source and transmitting a first portion of the coherent light into an input end of the first reference delay optical fiber and transmitting a second portion of the coherent light into an input end of the first sample delay optical fiber;
   d) a second fiber optic coupler receiving first low coherence light of center wavelength $\lambda_1$ from a first low coherence light source and transmitting a first portion of the first low coherence light into an input end of the second reference delay optical fiber and transmitting a second portion of the first low coherence light into an input end of the second sample delay optical fiber;
   e) a first reference reflector coupled to an output end of the first reference delay optical fiber and reflecting coherent light back through the first reference delay optical fiber, and back through the first fiber optic coupler into a coherent light detector;
   f) a first sample reflector coupled to an output end of the first sample delay optical fiber and reflecting coherent light back through the first sample delay optical fiber, and back through the first fiber optic coupler and into the coherent light detector;
   g) a second reference reflector coupled to an output end of the second reference delay optical fiber and reflecting first low coherence light back through the second reference delay optical fiber, and back through the second fiber optic coupler into a first low coherence light detector; and
   h) a first optical probe coupled to the output end of the second sample delay optical fiber and configured to transmit first low coherence light to a first location on an object comprising at least one optical interface, and receive first low coherence light reflected back from the at least one optical interface, and transmit the reflected first low coherence light back through the first optical probe, back through the second sample delay optical fiber, and back through the second fiber optic coupler and into the first low coherence light detector.

2. The interferometer apparatus of claim 1, wherein the reference and sample optical fiber stretchers are comprised of piezoelectric cylinders having equal perimeters and functioning as the respective reference and sample actuators.

3. The interferometer apparatus of claim 2, wherein the first and second reference delay optical fibers are wound together around the reference outer surface of the reference optical fiber stretcher in an interleaved arrangement, and the first and second sample delay optical fibers are wound together around the sample outer surface of the sample optical fiber stretcher in an interleaved arrangement, and wherein the lengths of the first and second reference delay optical fibers and the lengths of the first and second sample delay optical fibers are equal.

4. The interferometer apparatus of claim 3, wherein the first and second reference delay optical fibers are wound together around the reference outer surface of the reference optical fiber stretcher in a single layer, and the first and second sample delay optical fibers are wound together around the sample outer surface of the sample optical fiber stretcher in a single layer.

5. The interferometer apparatus of claim 4, wherein adjacent interleaved delay optical fibers are in contact with each other.

6. The interferometer apparatus of claim 2, wherein the reference and sample actuators are operated in a push-pull mode.

7. The interferometer apparatus of claim 1, wherein the first low coherence light detector is a first balanced detector, the interferometer apparatus further comprising a first circulator comprised of a first port coupled to the first low coherence light source, a second port coupled to the second fiber optic coupler, and a third port coupled to a first input port of the first balanced detector, a second input port of the first balanced detector configured to receive the first low coherence light reflected back from the at least one optical interface at the first location on the object combined with the light reflected back from the second reference reflector and passing back through the second fiber optic coupler.

8. The interferometer apparatus of claim 1, further comprising a first visible light source and a first wavelength division multiplexer combining light from the first low coherence light source with light from the first visible light source.

9. The interferometer apparatus of claim 1, wherein $\lambda_c$ is equal to $\lambda_1$.

10. The interferometer apparatus of claim 9, wherein $\lambda_c$ is equal to 1310 nm and the reference and sample delay optical fibers are communication grade single mode optical fibers.

11. The interferometer apparatus of claim 1, further comprising:
  a) the reference optical fiber stretcher further comprised of a third reference delay optical fiber wound around the reference outer surface, and the sample optical fiber stretcher further comprised of a third sample delay optical fiber wound around the sample outer surface;
  b) a third fiber optic coupler receiving second low coherence light of center wavelength $\lambda_2$ from a second low coherence light source and transmitting a first portion of the second low coherence light into an input end of the third reference delay optical fiber and transmitting a second portion of the second low coherence light into an input end of the third sample delay optical fiber;
  c) a third reference reflector coupled to an output end of the third reference delay optical fiber and reflecting second low coherence light back through the third reference optical fiber, and back through the third fiber optic coupler and into a second low coherence light detector; and
  d) a second optical probe coupled to the output end of the third sample delay optical fiber and configured to transmit second low coherence light to a second location on the object and receive second low coherence light reflected back from the at least one optical interface, and transmit the reflected second low coherence light back through the second optical probe, back through the third sample delay optical fiber and back through the third fiber optic coupler and into the second low coherence light detector.

12. The interferometer apparatus of claim 11, wherein the second low coherence light detector is a second balanced detector, the interferometer apparatus further comprising a second circulator comprised of a first port coupled to the second low coherence light source, a second port coupled to the third fiber optic coupler, and a third port coupled to a first input port of the second balanced detector, a second input port of the second balanced detector configured to receive the second low coherence light reflected back from the at least one optical interface at the second location on the object combined with the light reflected back from the third reference reflector and passing back through the third fiber optic coupler.

13. The interferometer apparatus of claim 11, wherein $\lambda_c$, $\lambda_1$, and $\lambda_2$ are equal.

14. The interferometer apparatus of claim 11, further comprising a second visible light source and a second wavelength division multiplexer combining light from the second low coherence light source with light from the second visible light source.

15. The interferometer apparatus of claim 11, wherein the first, second, and third reference delay optical fibers are wound together around the reference outer surface of the reference optical fiber stretcher in an interleaved arrangement, and the first, second, and third sample delay optical fibers are wound together around the sample outer surface of the sample optical fiber stretcher in an interleaved arrangement, and wherein the lengths of the first, second, and third reference delay optical fibers and the lengths of the first, second and third sample delay optical fibers are equal.

16. The interferometer apparatus of claim 15, wherein the first, second, and third reference delay optical fibers are wound together around the reference outer surface of the reference optical fiber stretcher in a single layer, and the first, second, and third sample delay optical fibers are wound together around the sample outer surface of the reference optical fiber stretcher in a single layer.

17. The interferometer apparatus of claim 16, wherein adjacent interleaved delay optical fibers are in contact with each other.

18. The interferometer apparatus of claim 11, wherein the reference and sample actuators are operated in a push-pull mode.

19. The interferometer apparatus of claim 13, wherein the first and second low coherence light sources share a common emitter.

20. The interferometer apparatus of claim 1, further comprising:
  a) the reference optical fiber stretcher further comprised of a third reference delay optical fiber wound around the reference outer surface, and the sample optical fiber stretcher further comprised of a third sample delay optical fiber wound around the sample outer surface;
  b) a first primary optical circulator receiving second low coherence light of center wavelength $\lambda_2$ from a second low coherence light source at a first port and transmitting the second low coherence light through a second port and coupling the second low coherence light into a second optical probe configured to transmit second low coherence light onto a second location on the object comprising at least one optical interface, and receive low coherence light reflected back from the at least one optical interface, and transmit the received second low coherence light back through the optical probe, back through the second port of the first primary optical circulator and through its third port into a third fiber optic coupler and transmitting a first portion of the received second low coherence light into an input end of the third reference delay optical fiber and transmitting a second portion of the received second low coherence light into an input end of the third sample delay optical fiber;
  c) a third reference reflector coupled to the output end of the third reference delay optical fiber and reflecting second low coherence light back through the third reference optical fiber, and back through the third fiber optic coupler and into a second low coherence light detector; and
  d) a second sample reflector coupled to the output end of the third sample delay optical fiber and reflecting second low coherence light back through the third sample delay optical fiber, and back through the third fiber optic coupler and into a second low coherence light detector.

21. An apparatus comprising m associated interferometers where m is an integer greater than 1, each of the m associated interferometers having a reference branch and a sample branch, each of the m associated interferometers further comprising;
  a) a common reference optical fiber stretcher comprising a reference outer surface defining a reference perimeter, m reference delay optical fibers wound around the reference outer surface, and a reference actuator configured to temporally vary the perimeter of the reference outer surface;
  b) a common sample optical fiber stretcher comprising a sample outer surface defining a sample perimeter, m sample delay optical fibers wound around the sample outer surface, and a sample actuator configured to temporally vary the perimeter of the sample outer surface;

c) a fiber optic coupler receiving coherent or low coherence light from a coherent or low coherence light source and transmitting a first portion of the coherent or low coherence light into an input end of a distinct one of the m reference delay optical fibers and transmitting a second portion of the coherent or low coherence light into an input end of a distinct one of the m sample delay optical fibers; wherein the $j^{th}$ fiber optic coupler, where j is an integer with 1≤j≤m, receives coherent light of wavelength $\lambda_C$ from a coherent light source and transmits a first portion of the coherent light into an input end of the $j^{th}$ reference delay optical fiber and transmits a second portion of the coherent light into an input end of the $j^{th}$ sample delay optical fiber; and the remaining m−1 fiber optic couplers receive low coherence light from a low coherence light source and transmit a first portion of the low coherence light into an input end of the corresponding remaining one of the m−1 reference delay optical fibers and transmit a second portion of the low coherence light into an input end of the corresponding remaining one of the m−1 sample delay optical fibers;

d) a reference reflector coupled to an output end of each of the distinct one of the m reference delay optical fibers and reflecting coherent or low coherence light back through the distinct one of the m reference delay optical fibers and back through the corresponding distinct one of the m fiber optic couplers and into a corresponding detector;

e) a sample reflector coupled to the output end of the $j^{th}$ sample delay optical fiber and reflecting coherent light back through the $j^{th}$ sample delay optical fiber and back through the $j^{th}$ fiber optic coupler and into the $j^{th}$ detector; and f) an optical probe coupled to the output end of each of the distinct one of the remaining m−1 sample delay optical fibers, and configured to transmit low coherence light to a location on an object comprising at least one optical interface, and receive low coherence light reflected back from the at least one optical interface, and transmit the reflected low coherence light back through the optical probe, back through the distinct one of the remaining m−1 sample delay optical fibers, and back through the corresponding distinct one of the m−1 fiber optic couplers and into the corresponding detector.

22. The apparatus of claim 21, wherein the m−1 low coherence light sources have the same center wavelength equal to $\lambda_1$.

23. The apparatus of claim 22, wherein $\lambda_1$ is equal to $\lambda_c$.

24. The apparatus of claim 21, wherein the reference and sample optical fiber stretchers are comprised of piezoelectric cylinders having equal perimeters and functioning as the respective reference and sample actuators.

25. The apparatus of claim 24, wherein the m reference delay optical fibers are wound together around the reference outer surface of the reference optical fiber stretcher in an interleaved arrangement, and the m sample delay optical fibers are wound together around the sample outer surface of the sample optical fiber stretcher in an interleaved arrangement, and wherein the lengths of the m reference delay optical fibers and the lengths of the m sample delay optical fibers are equal.

26. The apparatus of claim 25, wherein the m reference delay optical fibers are wound together around the reference outer surface of the reference optical fiber stretcher in a single layer, and the m sample delay optical fibers are wound together around the sample outer surface of the sample optical fiber stretcher in a single layer.

27. The apparatus of claim 26, wherein adjacent interleaved delay optical fibers are in contact with each other.

28. The apparatus of claim 24, wherein the reference and sample actuators are operated in a push-pull mode.

* * * * *